United States Patent
Liu et al.

(10) Patent No.: US 11,973,578 B2
(45) Date of Patent: Apr. 30, 2024

(54) REFERENCE SIGNAL CONFIGURATION METHOD AND APPARATUS, AND SEQUENCE CONFIGURATION METHOD AND APPARATUS

(71) Applicant: HUAWEI TECHNOLOGIES CO., LTD., Guangdong (CN)

(72) Inventors: Yong Liu, Shanghai (CN); Mingxin Gong, Tianjin (CN); Bingyu Qu, Beijing (CN); Yongxing Zhou, Beijing (CN); Xiaoyan Bi, Shanghai (CN); Lu Rong, Shenzhen (CN); Su Huang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 346 days.

(21) Appl. No.: 17/199,050

(22) Filed: Mar. 11, 2021

(65) Prior Publication Data

US 2021/0203551 A1    Jul. 1, 2021

Related U.S. Application Data

(63) Continuation of application No. PCT/CN2019/102057, filed on Aug. 22, 2019.

(30) Foreign Application Priority Data

Sep. 14, 2018  (CN) .................. 201811084471.X
Sep. 28, 2018  (CN) .................. 201811146964.1
Oct. 11, 2018  (CN) .................. 201811186140.7

(51) Int. Cl.
*H04J 13/18*    (2011.01)
*H04L 5/00*    (2006.01)
(Continued)

(52) U.S. Cl.
CPC ............ *H04J 13/18* (2013.01); *H04L 5/0048* (2013.01); *H04L 27/262* (2013.01); *H04L 41/0806* (2013.01); *H04W 72/51* (2023.01)

(58) Field of Classification Search
None
See application file for complete search history.

(56) References Cited

U.S. PATENT DOCUMENTS

2010/0172235 A1    7/2010  Liu et al.
2010/0322178 A1*  12/2010  Li .................... H04L 5/0051
                                                       370/329

(Continued)

FOREIGN PATENT DOCUMENTS

AU    2011204052 A1    7/2012
CN     101931485 A    12/2010
(Continued)

OTHER PUBLICATIONS

Ericsson, "Benefits of resource specific DMRS mapping", May 2018, 3GPP, R1-1806231, pp. 1-4.*

(Continued)

*Primary Examiner* — Adnan Baig
(74) *Attorney, Agent, or Firm* — Fish & Richardson P.C.

(57) ABSTRACT

This disclosure discloses signal configuration methods and apparatuses. In an implementation, a method comprises: generating at least two reference signals of a same type corresponding to at least two antenna ports indicated to a terminal device, wherein the at least two reference signals comprise a first reference signal and a second reference signal, wherein a first sequence of the first reference signal is obtained based on a first initialization factor determined based on an index of a first code division multiplexing (CDM) group, and wherein a second sequence of the second reference signal different from the first sequence is obtained based on a second initialization factor determined based on (Continued)

an index of a second CDM group; and transmitting the at least two reference signals.

38 Claims, 17 Drawing Sheets

(51) Int. Cl.
*H04L 27/26* (2006.01)
*H04L 41/0806* (2022.01)
*H04W 72/51* (2023.01)

(56) References Cited

U.S. PATENT DOCUMENTS

| | | | |
|---|---|---|---|
| 2011/0228735 | A1 | 9/2011 | Lee et al. |
| 2012/0176885 | A1* | 7/2012 | Lee ................. H04L 5/0007 370/209 |
| 2013/0107694 | A1 | 5/2013 | Hu et al. |
| 2014/0302887 | A1* | 10/2014 | Bashar ............. H04W 76/11 455/550.1 |
| 2019/0165908 | A1* | 5/2019 | Takeda .................. H04L 5/14 |
| 2019/0190637 | A1* | 6/2019 | Lomayev ............ H04B 7/0413 |

FOREIGN PATENT DOCUMENTS

| | | |
|---|---|---|
| CN | 102202027 A | 9/2011 |
| CN | 102340382 A | 2/2012 |
| CN | 103259635 A | 8/2013 |
| CN | 103841644 A | 6/2014 |
| CN | 105187181 A | 12/2015 |
| EP | 2665221 A2 | 11/2013 |
| EP | 2797275 A1 | 10/2014 |
| JP | 2020503897 A | 2/2020 |
| WO | 2011156939 A1 | 12/2011 |
| WO | 2018126399 A1 | 7/2018 |
| WO | 2018128453 A1 | 7/2018 |
| WO | 2019018973 A1 | 1/2019 |

OTHER PUBLICATIONS

Hitachi, DL DMRS Enhancement for COMP, Feb. 2012, 3GPP, R1-120245, pp. 1-4.*
Office Action issued in Japanese Application No. 2021-514319 dated May 31, 2022, 9 pages (with English translation).
Ericsson, "On high PAPR in rank 2 transmissions with FDM of DMRS ports," 3GPP TSG RAN WG1 Meeting #93, R1-1806233, Busan, Korea, May 21-25, 2018, 2 pages.
Ericsson, ST-Ericsson, "Details about UL DMRS configuration and signaling, " 3GPP TSG RAN WG1 Meeting #69, R1-122980, Prague, Czech Republic, May 21-25, 2012, 5 pages.
Extended European Search Report issued in European Application No. 19859340.2 dated Feb. 9, 2022, 20 pages.
Hitachi Ltd., "DL DMRS Enhancement for CoMP," 3GPP TSG RAN WG1 Meeting #68, R1-120245, Dresden, Germany, Feb. 6-10, 2012, 4 pages.
Nokia Siemens Networks, Nokia, "On Reference Signal Enhancements for UL CoMP," 3GPP TSG RAN WG1 Meeting #67, R1-114324, San Francisco, USA, Nov. 14-18, 2011, 6 pages.
3GPP TS 38.211 V15.2.0 (Jun. 2018), "3rd Generation Partnership Project; Technical Specification Group Radio Access Network; NR; Physical channels and modulation (Release 15)," Jun. 2018, 96 pages.
3GPP TS 36.213 V15.2.0 (Jun. 2018), "3rd Generation Partnership Project; Technical Specification Group Radio Access Network; Evolved Universal Terrestrial Radio Access (E-UTRA); Physical layer procedures (Release 15)," Jun. 2018, 541 pages.
Huawei, HiSilicon, "Feature lead summary #2 of CSI-RS," 3GPP TSG RAN WG1 Ad Hoc Meeting, R1-1801096, Vancouver, Canada, Jan. 22-26, 2018, 13 pages.
PCT International Search Report and Written Opinion issued in International Application No. PCT/CN2019/102057 dated Nov. 25, 2019, 15 pages (with English translation).
Qualcomm Incorporated, "Maintenance for DMRS," 3GPP TSG RAN WG1 Meeting #92, R1-1802828, Athens, Greece, Feb. 26-Mar. 2, 2018, 5 pages.
Office Action in Japanese Appln. No. 2021-514319, dated Dec. 6, 2022, 6 pages (with English translation).
Ericsson, "Benefits of resource specific DMRS mapping," 3GPP TSG RAN WG1 Meeting #93, R1-1806231, Busan, Korea, May 21-25, 2018, 4 pages.
Partial Supplementary European Search Report issued in European Application No. 19859340.2 dated Oct. 7, 2021, 16 pages.
Office Action issued in Chinese Application No. 202011382010.8 dated Nov. 17, 2021, 6 pages.
Huawei, "Introduction of uplink capacity enhancements in 36.212," 3GPP TSG RAN WG1 Meeting #88, R1-1704151, Athens, Greece, Feb. 13-17, 2017, 16 pages.
Office Action in Chinese Appln. No. 201811186140.7, dated Mar. 4, 2023, 9 pages.

* cited by examiner

REFERENCE SIGNAL CONFIGURATION METHOD AND APPARATUS, AND SEQUENCE CONFIGURATION METHOD AND APPARATUS

CROSS-REFERENCE TO RELATED APPLICATIONS

This application is a continuation of International Application No. PCT/CN2019/102057, filed on Aug. 22, 2019, which claims priority to Chinese Patent Application No. 201811084471.X, filed on Sep. 14, 2018 and Chinese Patent Application No. 201811146964.1, filed on Sep. 28, 2018 and Chinese Patent Application No. 201811186140.7, filed on Oct. 11, 2018. All of the aforementioned patent applications are hereby incorporated by reference in their entireties.

TECHNICAL FIELD

This application relates to the field of communications technologies, and in particular, to a reference signal configuration method and apparatus, and a sequence configuration method and apparatus.

BACKGROUND

In a multi-input multi-output (multi-input multi-output) system, each transmit antenna (for example, a logical antenna or a physical antenna) has an independent data channel. A receive end device (for example, a network device or a terminal) usually performs channel estimation on each transmit antenna based on a pre-known reference signal, and restores, based on a channel estimation result, a data signal transmitted on a data channel. Therefore, how to configure a reference signal or how to configure a sequence used to generate a reference signal is crucial.

SUMMARY

Embodiments of this application provide a reference signal configuration method and apparatus, and a sequence configuration method and apparatus, to help reduce a peak-to-average power ratio (peak-to-average power ratio, PAPR), thereby improving transmission performance of a system.

According to a first aspect, an embodiment of this application provides a reference signal configuration method, including: generating and sending at least two reference signals. The at least two reference signals are reference signals corresponding to at least two antenna ports allocated by a network device to a same terminal, the at least two reference signals are reference signals of a same type, the at least two reference signals include a first reference signal and a second reference signal, and a sequence of the first reference signal is different from a sequence of the second reference signal. Optionally, a sequence of a reference signal is a sequence used to obtain the reference signal, and may also be referred to as a generation sequence of the reference signal or a local sequence of the reference signal.

The method may be performed by the network device or the terminal. Optionally, the reference signal may be a demodulation reference signal (demodulation reference signal, DMRS), a channel state information reference signal (channel state information reference signal, CSI-RS), or the like.

In this technical solution, different reference signals corresponding to the antenna ports allocated by the network device to the terminal may have different sequences. This helps implement that the reference signals that are generated by the network device and the terminal and that are mapped to a same resource unit are different. In other words, this helps implement that different reference signals mapped to a time domain symbol are different. This increases randomness of sequence values or sequence mapping, that is, helps avoid a problem of sequence repetition in frequency domain. Therefore, a PAPR can be reduced, thereby improving transmission performance of a system.

Optionally, the sequence of the first reference signal and the sequence of the second reference signal are generated at the same time. "The same time" herein may be understood as a same time point or a same time period. The time period is less than or equal to a scheduling periodicity. For example, the time period may be one or more time domain symbols, one or more mini-slots, one or more slots, or one subframe.

Optionally, both the sequence of the first reference signal and the sequence of the second reference signal are sequences generated based on a reference signal level, or sequences generated based on a time domain symbol level.

In a possible design, the generating at least two reference signals includes: generating the at least two reference signals based on M sequences, where the M sequences include the sequence of the first reference signal and the sequence of the second reference signal, M is an integer greater than or equal to 2, and M is a quantity of code division multiplexing groups occupied by the antenna ports allocated by the network device to the terminal or a quantity of antenna ports allocated by the network device to the terminal.

Optionally, the M sequences are generated at the same time. For explanations of "the same time" herein, refer to the foregoing description.

According to a second aspect, an embodiment of this application provides a reference signal configuration method, including: receiving at least two reference signals. The at least two reference signals are reference signals corresponding to at least two antenna ports allocated by a network device to a same terminal, the at least two reference signals are reference signals of a same type, the at least two reference signals include a first reference signal and a second reference signal, and a sequence of the first reference signal is different from a sequence of the second reference signal. A sequence of a reference signal is a sequence used to obtain the reference signal, and may also be referred to as a generation sequence of the reference signal or a local sequence of the reference signal. For beneficial effects of this solution, refer to the first aspect. Details are not described herein again.

When the method provided in the first aspect is performed by the network device, the method may be performed by the terminal. When the method provided in the first aspect is performed by the terminal, the method may be performed by the network device.

In a possible design, the method further includes: generating the at least two reference signals based on M sequences, where the M sequences include the sequence of the first reference signal and the sequence of the second reference signal, M is an integer greater than or equal to 2, and M is a quantity of code division multiplexing groups occupied by the antenna ports allocated by the network device to the terminal or a quantity of antenna ports allocated by the network device to the terminal.

Optionally, the M sequences are generated at the same time. For explanations of "the same time" herein, refer to the foregoing description.

The technical solution provided in the second aspect corresponds to the method provided in the first aspect. Therefore, for explanations of related content and beneficial effects in the second aspect, refer to the first aspect.

Based on any technical solution provided in the first aspect and the second aspect, the following provides several possible designs.

In a possible design, for either of the first reference signal and the second reference signal, a sequence of the reference signal is obtained according to a formula $\hat{r}_m(n) = f(n_{CDM\_m}) gr(n)$, $\hat{r}_m(n)$ represents an $n^{th}$ element in the sequence of the reference signal, $r(n)$ represents an $n^{th}$ element in a reference sequence, $n \geq 0$, n is an integer, $f(n_{CDM\_m})$ represents a function related to $n_{CDM\_m}$, and $n_{CDM\_m}$ represents an index of a code division multiplexing group to which an antenna port corresponding to the reference signal belongs, an offset value corresponding to the code division multiplexing group, or a scrambling factor corresponding to the code division multiplexing group.

For example, $$f(n_{CDM\_m}) = -1^{\left\lfloor \frac{k \cdot n_{CDM\_m}}{4^{(n_{CDM\_m}+1) \bmod 2}} \right\rfloor}, f(n_{CDM\_m}) = -1^{\left\lfloor \frac{k \cdot n_{CDM\_m}}{4^{n_{CDM\_m}-1}} \right\rfloor},$$

$$f(n_{CDM\_m}) = -1^{\left[\frac{k \cdot n_{CDM\_m}}{4^{(n_{CDM\_m}+1) \bmod 2}}\right]}, \text{ or } f(n_{CDM\_m}) = -1^{\left[\frac{k \cdot n_{CDM\_m}}{4^{n_{CDM\_m}-1}}\right]},$$

where k represents an index of a frequency domain unit to which $\hat{r}_m(n)$ is mapped.

For another example, when M=2, $f(n_{CDM\_m}) = -1^{CDM\_m}$; or when M=3, $$f(n_{CDM\_m}) = e^{j\frac{2}{3}\pi CDM\_m} \text{ or } f(n_{CDM\_m}) = e^{-j\frac{2}{3}\pi CDM\_m},$$

where M is a quantity of code division multiplexing groups occupied by the antenna ports allocated by the network device to the terminal. In other words, sequences corresponding to different code division multiplexing groups generate different phase rotations based on a same reference sequence, so that different code division multiplexing groups correspond to different sequences.

In another possible design, an antenna port corresponding to the first reference signal and an antenna port corresponding to the second reference signal belong to different code division multiplexing groups, and the different code division multiplexing groups correspond to different orthogonal cover codes OCCs. In other words, different code division multiplexing groups are set to correspond to different OCCs, so that the different code division multiplexing groups correspond to different sequences.

For example, if a system supports two code division multiplexing groups, and the two code division multiplexing groups include a first code division multiplexing group and a second code division multiplexing group, an OCC corresponding to each frequency domain unit in the first code division multiplexing group is a matrix a, and an OCC corresponding to each frequency domain unit in the second code division multiplexing group is −a; or an OCC corresponding to each frequency domain unit in the first code division multiplexing group is a matrix a, an OCC corresponding to one of two adjacent frequency domain units in the second code division multiplexing group is the matrix a, and an OCC corresponding to the other frequency domain unit is −a.

For another example, if a system supports three code division multiplexing groups, and the three code division multiplexing groups include a first code division multiplexing group, a second code division multiplexing group, and a third code division multiplexing group, an OCC corresponding to each frequency domain unit in the first code division multiplexing group is a matrix a, an OCC corresponding to each frequency domain unit in the second code division multiplexing group is a*exp (j*x), and an OCC corresponding to each frequency domain unit in the third code division multiplexing group is a*exp (j*y), where x+y=2π or x+y=−2π, and j is an imaginary unit; or an OCC corresponding to each frequency domain unit in the first code division multiplexing group is a matrix a, an OCC corresponding to one of two adjacent frequency domain units in the second code division multiplexing group is the matrix a, an OCC corresponding to the other frequency domain unit is a*exp (j*x), an OCC corresponding to one of two adjacent frequency domain units in the third code division multiplexing group is the matrix a, and an OCC corresponding to the other frequency domain unit is a*exp (j*y), where x+y=2π, or x+y=−2π, and j is an imaginary unit.

According to a third aspect, an embodiment of this application provides a reference signal configuration method, including: generating and sending at least two reference signals, where the at least two reference signals are reference signals corresponding to at least two antenna ports allocated by a network device to a same terminal, the at least two reference signals are reference signals of a same type, the at least two reference signals include a first reference signal and a second reference signal, and a sequence of the first reference signal is different from a sequence of the second reference signal. The method may be performed by the network device or the terminal. Optionally, a sequence of a reference signal is a sequence including elements included in the reference signal.

Optionally, both the sequence of the first reference signal and the sequence of the second reference signal are sequences generated based on a reference signal level, or sequences generated based on a time domain symbol level.

In a possible design, the generating at least two reference signals includes: generating the at least two reference signals based on one sequence (which may also be referred to as a mother sequence). Based on this, that the sequence of the first reference signal is different from the sequence of the second reference signal may include: A set including locations of modulation symbols included in the first reference signal in the mother sequence is different from a set including locations of modulation symbols included in the second reference signal in the mother sequence.

According to a fourth aspect, an embodiment of this application provides a reference signal configuration method, including: receiving at least two reference signals, where the at least two reference signals are reference signals corresponding to at least two antenna ports allocated by a network device to a same terminal, the at least two reference signals are reference signals of a same type, the at least two reference signals include a first reference signal and a second reference signal, and a sequence of the first reference signal is different from a sequence of the second reference signal. The method may be performed by the network device or the terminal. A sequence of a reference signal is a sequence including elements included in the reference signal.

In a possible design, the method further includes: generating the at least two reference signals based on one sequence (which may also be referred to as a mother sequence).

The technical solution provided in the fourth aspect corresponds to the method provided in the third aspect. Therefore, for explanations of related content and beneficial effects in the fourth aspect, refer to the third aspect.

According to a fifth aspect, an embodiment of this application provides a sequence configuration method, including: generating and sending configuration information, where the configuration information is used to configure a sequence corresponding to each of M code division multiplexing groups that are occupied by at least two antenna ports and that are allocated by a network device to a terminal, and M is an integer greater than or equal to 2.

According to a sixth aspect, an embodiment of this application provides a sequence configuration method, including: receiving configuration information, where the configuration information is used to configure a sequence corresponding to each of M code division multiplexing groups that are occupied by at least two antenna ports and that are allocated by a network device to a terminal, and M is an integer greater than or equal to 2; and configuring the sequence corresponding to each code division multiplexing group based on the configuration information.

Based on the fifth aspect or the sixth aspect, a sequence corresponding to a code division multiplexing group is a sequence "used to obtain a reference signal corresponding to each antenna port in the code division multiplexing group", for example, the local sequence described above. Optionally, one code division multiplexing group corresponds to one sequence.

Based on the fifth aspect or the sixth aspect, in a possible design, the configuration information is specifically used to configure a generation parameter of the sequence corresponding to each code division multiplexing group, and the generation parameter includes an index of the code division multiplexing group, an offset value corresponding to the code division multiplexing group, or a scrambling factor corresponding to the code division multiplexing group.

Based on the fifth aspect or the sixth aspect, in a possible design, the configuration information may be, for example, but is not limited to, one or a combination or at least two of radio resource control (radio resource control, RRC) signaling, medium access control (medium access control, MAC) signaling, and downlink control information (downlink control information, DCI). For example, the configuration information may be carried in DCI.

According to a seventh aspect, an embodiment of this application provides a sequence configuration method, including: generating and sending configuration information, where the configuration information is used to configure a sequence corresponding to each of at least two antenna ports allocated by a network device to a terminal.

According to an eighth aspect, an embodiment of this application provides a sequence configuration method, including: receiving configuration information, where the configuration information is used to configure a sequence corresponding to each of at least two antenna ports allocated by a network device to a terminal; and configuring the sequence corresponding to each antenna port based on the configuration information.

Based on the seventh aspect or the eighth aspect, a sequence corresponding to an antenna port is a sequence used to "obtain a reference signal corresponding to the antenna port". Optionally, one antenna port corresponds to one sequence.

Based on the seventh aspect or the eighth aspect, in a possible design, the configuration information is specifically used to configure a generation parameter of the sequence corresponding to each code division multiplexing group, and the generation parameter includes an index of the code division multiplexing group, an offset value corresponding to the code division multiplexing group, or a scrambling factor corresponding to the code division multiplexing group.

Based on the seventh aspect or the eighth aspect, in a possible design, the configuration information may be implemented through, for example, but not limited to, one or a combination of at least two of RRC signaling, MAC signaling, and DCI. For example, the configuration information may be carried in DCI.

The sequence configuration methods provided in the fifth aspect to the eighth aspect provide a basis for the reference signal configuration methods provided in the first aspect to the second aspect. Therefore, for beneficial effects that can be achieved by the sequence configuration methods, refer to the descriptions in the first aspect or the second aspect. Certainly, the sequence configuration methods may be further applied to another scenario.

According to a ninth aspect, an embodiment of this application provides a reference signal configuration method, including: generating indication information, where the indication information is used to indicate a first release of a reference signal; and sending the indication information to at least one terminal in a plurality of terminals scheduled in a same scheduling periodicity, where the plurality of terminals all support the first release, and the at least one terminal also supports a release other than the first release. This helps implement that all terminals scheduled in a same scheduling periodicity use a same reference signal release, thereby helping resolve a compatibility problem of the terminals that are scheduled in the same scheduling periodicity and that support different releases of reference signals.

According to a tenth aspect, an embodiment of this application provides a reference signal configuration method, including: receiving indication information, where the indication information is used to indicate a first release of a reference signal; and determining, based on the indication information, that a release of a reference signal transmitted in a current scheduling periodicity is the first release. The method may be performed by a terminal. Optionally, the terminal supports reference signals of at least two releases. Optionally, the reference signals of the at least two releases are reference signals of a same type. For beneficial effects that can be achieved by the method, refer to the ninth aspect. Details are not described herein again.

Based on the ninth aspect or the tenth aspect, in a possible design, the indication information may be implemented through, for example, but not limited to, one or a combination of at least two of RRC signaling, MAC signaling, and DCI. For example, the indication information may be carried in DCI.

According to an eleventh aspect, an embodiment of this application provides a reference signal configuration method, including: receiving capability information sent by a terminal, where the capability information is used to indicate whether the terminal supports release switching of a reference signal, and the terminal supports reference signals of at least two releases, and determining, based on the capability information, whether to indicate the terminal to perform release switching of the reference signal. The method may be performed by a network device. Optionally, the terminal supports reference signals of at least two releases. Optionally, the reference signals of the at least two releases are reference signals of a same type. In other words, in this application, the terminal can report release switching capability information of the reference signal to the network device. This helps the network device indicate a reference signal release to the terminal through signaling, thereby helping resolve a compatibility problem of terminals that are scheduled in a same scheduling periodicity and that support different releases of reference signals.

According to a twelfth aspect, an embodiment of this application provides a reference signal configuration method, including: sending, by a terminal, capability information, where the capability information indicates whether the terminal supports release switching of a reference signal, so that a network device determines whether to indicate the terminal to perform release switching of the reference signal. Optionally, the terminal supports reference signals of at least two releases. Optionally, the reference signals of the at least two releases are reference signals of a same type. For beneficial effects that can be achieved by the method, refer to the eleventh aspect. Details are not described herein again.

Based on the eleventh aspect or the twelfth aspect, in a possible design, the capability information may be implemented through, for example, but not limited to, one or a combination of at least two of RRC signaling, MAC signaling, and DCI. For example, the capability information may be carried in DCI.

According to a thirteenth aspect, an embodiment of this application provides a reference signal configuration method, including: for a first terminal and a second terminal that are scheduled in a same scheduling periodicity, generating, by a network device, a first reference signal of the first terminal and a second reference signal of the second terminal, where a release of the first reference signal is different from a release of the second reference signal, and the first reference signal and the second reference signal non-code-division multiplex a time-frequency resource; and sending, by the network device, the first reference signal to the first terminal and sending the second reference signal to the second terminal in the scheduling periodicity. In this technical solution, when reference signals of any two terminals scheduled by the network device in a same scheduling periodicity have different releases, a manner of multiplexing time-frequency resources by the reference signals of the two terminals does not include a code-division multiplexing manner. In this way, this helps schedule, in a same scheduling periodicity, terminals that support different releases of reference signals, thereby resolving a compatibility problem of the terminals that support the different releases of reference signals and that are scheduled in the same scheduling periodicity.

According to a fourteenth aspect, an embodiment of this application provides a reference signal configuration method, including: for at least two terminals scheduled in a first scheduling periodicity, generating, by a network device, a corresponding reference signal for each terminal, where the reference signals of the at least two terminals scheduled in the first scheduling periodicity have a same release, the release is different from a release of reference signals of at least two terminals in a second scheduling periodicity, and the reference signals of the at least two terminals scheduled in the second scheduling periodicity have the same release; and sending, by the network device in the first scheduling periodicity, corresponding reference signals to the at least two terminals scheduled in the first scheduling periodicity. In this technical solution, reference signals of at least two terminals scheduled by the network device in a same scheduling periodicity have a same release, and reference signals transmitted in different scheduling periodicities have different releases, to resolve a compatibility problem of terminals that support different releases of reference signals.

According to a fifteenth aspect, an embodiment of this application provides a reference signal configuration apparatus. The reference signal configuration apparatus may be configured to perform the reference signal configuration method provided in any one of the foregoing aspects (for example, any one of the first aspect to the fourth aspect, or the ninth aspect to the fourteenth aspect) or possible designs.

In a possible design, the reference signal configuration apparatus may be divided into function modules based on the reference signal configuration method provided in any one of the foregoing aspects or possible designs. For example, each function module may be obtained through division based on each corresponding function, or two or more functions may be integrated into one processing module.

In another possible design, the reference signal configuration apparatus includes a processor and a transceiver. The processor may be configured to perform steps other than sending and receiving. The transceiver is configured to perform receiving and/or sending steps. Alternatively, in some implementations, the reference signal configuration apparatus includes a transceiver, configured to perform sending and/or receiving steps.

For example, the reference signal configuration apparatus includes a processor and a transceiver. The processor is configured to generate at least two reference signals, where the at least two reference signals are reference signals corresponding to at least two antenna ports allocated by a network device to a same terminal, the at least two reference signals are reference signals of a same type, the at least two reference signals include a first reference signal and a second reference signal, and a sequence of the first reference signal is different from a sequence of the second reference signal. The transceiver is configured to send the at least two reference signals.

For example, the reference signal configuration apparatus includes a transceiver. The transceiver is configured to receive at least two reference signals, where the at least two reference signals are reference signals corresponding to at least two antenna ports allocated by a network device to a same terminal, the at least two reference signals are reference signals of a same type, the at least two reference signals include a first reference signal and a second reference signal, and a sequence of the first reference signal is different from a sequence of the second reference signal.

For example, the reference signal configuration apparatus includes a processor and a transceiver. The processor generates indication information, where the indication information is used to indicate a first release of a reference signal. The transceiver is configured to send the indication information to at least one terminal in a plurality of terminals scheduled in a same scheduling periodicity, where the plurality of terminals all support the first release, and the at least one terminal also supports a release other than the first release.

For example, the reference signal configuration apparatus includes a processor and a transceiver. The transceiver is configured to receive indication information, where the indication information is used to indicate a first release of a reference signal. The processor is configured to determine, based on the indication information, that a release of a reference signal transmitted in a current scheduling periodicity is the first release.

For example, the reference signal configuration apparatus includes a processor and a transceiver. The transceiver is configured to receive capability information sent by a terminal, where the capability information is used to indicate whether the terminal supports release switching of a reference signal, and the terminal supports reference signals of at least two releases. The processor is configured to determine, based on the capability information, whether to indicate the terminal to perform release switching of the reference signal.

For example, the reference signal configuration apparatus includes a transceiver. The transceiver is configured to send capability information, where the capability information indicates whether the terminal supports release switching of a reference signal, so that a network device determines whether to indicate the terminal to perform release switching of the reference signal. The reference signal configuration apparatus may be specifically a terminal.

For example, the reference signal configuration apparatus includes a processor and a transceiver. The processor is configured to: for a first terminal and a second terminal that are scheduled in a same scheduling periodicity, generate a first reference signal of the first terminal and a second reference signal of the second terminal, where a release of the first reference signal is different from a release of the second reference signal, and the first reference signal and the second reference signal non-code-division multiplex a time-frequency resource. The transceiver is configured to send the first reference signal to the first terminal and sending the second reference signal to the second terminal in the scheduling periodicity. The reference signal configuration apparatus may be specifically a network device.

For example, the reference signal configuration apparatus includes a processor and a transceiver. The processor is configured to: for at least two terminals scheduled in a first scheduling periodicity, generate a corresponding reference signal for each terminal, where the reference signals of the at least two terminals scheduled in the first scheduling periodicity have a same release, the release is different from a release of reference signals of at least two terminals in a second scheduling periodicity, and the reference signals of the at least two terminals scheduled in the second scheduling periodicity have the same release. The transceiver is configured to send, in the first scheduling periodicity, corresponding reference signals to the at least two terminals scheduled in the first scheduling periodicity. The reference signal configuration apparatus may be specifically a network device.

According to a sixteenth aspect, an embodiment of this application provides a reference signal configuration apparatus. The reference signal configuration apparatus includes a memory and a processor. The memory is configured to store a computer program. When the computer program is executed by the processor, any reference signal configuration method provided above is performed. For example, the apparatus may be a network device, a terminal, or a chip.

According to a seventeenth aspect, an embodiment of this application provides a sequence configuration apparatus. The sequence configuration apparatus may be configured to perform the sequence configuration method provided in any one of the foregoing aspects (for example, any one of the fifth to the eighth aspects) or possible designs.

In a possible design, the sequence configuration apparatus may be divided into function modules based on the sequence configuration method provided in any one of the foregoing aspects or possible designs. For example, each function module may be obtained through division based on each corresponding function, or two or more functions may be integrated into one processing module.

In another possible design, the sequence configuration apparatus includes a processor and a transceiver. The processor may be configured to perform steps other than sending and receiving. The transceiver is configured to perform receiving and/or sending steps. Alternatively, in some implementations, the sequence configuration apparatus includes a transceiver, configured to perform sending and/or receiving steps.

For example, the processor is configured to generate configuration information, where the configuration information is used to configure a sequence corresponding to each of M code division multiplexing groups that are occupied by at least two antenna ports and that are allocated by a network device to a terminal, and M is an integer greater than or equal to 2. The transceiver is configured to send the configuration information.

For example, the transceiver is configured to receive configuration information, where the configuration information is used to configure a sequence corresponding to each of M code division multiplexing groups that are occupied by at least two antenna ports and that are allocated by a network device to a terminal, and M is an integer greater than or equal to 2. The processor is configured to configure the sequence corresponding to each code division multiplexing group based on the configuration information.

For example, the processor is configured to generate configuration information, where the configuration information is used to configure a sequence corresponding to each of at least two antenna ports allocated by a network device to a terminal. The transceiver is configured to send the configuration information.

For example, the transceiver is configured to receive configuration information, where the configuration information is used to configure a sequence corresponding to each of at least two antenna ports allocated by a network device to a terminal. The processor is configured to configure the sequence corresponding to each antenna port based on the configuration information.

According to an eighth aspect, an embodiment of this application provides a sequence configuration apparatus. The sequence configuration apparatus includes a memory and a processor. The memory is configured to store a computer program. When the computer program is executed by the processor, any sequence configuration method provided above is performed. In an example, the apparatus may be a network device, a terminal, or a chip.

According to a nineteenth aspect, an embodiment of this application provides a processor. The processor is configured to perform the method (including the reference signal configuration method or the sequence configuration method) provided in any one of the foregoing aspects or possible designs.

For example, the processor is configured to: generate at least two reference signals, and output the at least two reference signals. For related descriptions of the at least two reference signals, refer to the first aspect or the third aspect. Details are not described herein again.

For another example, the processor is configured to input at least two reference signals. For related descriptions of the at least two reference signals, refer to the second aspect or the fourth aspect. Details are not described herein again.

Regarding that the processor performs the method provided in any aspect or any possible design, steps performed by the processor may be obtained through inference based on the foregoing two examples and with reference to the method. Details are not described herein again. Specifically, the sending step in the method is replaced with an output step of the processor, and/or the receiving step in the method is replaced with an input step, and the like.

In a specific implementation process, the processor may be configured to perform, for example, but not limited to, baseband-related processing, and the receiver and the transmitter may be respectively configured to perform, for example, but not limited to, radio frequency receiving and sending. The foregoing components may be separately disposed on chips that are independent of each other, or at least some or all of the foregoing components may be disposed on a same chip. For example, the receiver and the transmitter may be disposed on a receiver chip and a transmitter chip that are independent of each other, or may be integrated as a transceiver and then disposed on a transceiver chip. For another example, the processor may be further classified into an analog baseband processor and a digital baseband processor. The analog baseband processor and the transceiver may be integrated into a same chip, and the digital baseband processor may be disposed on an independent chip. With continuous development of integrated circuit technologies, more and more components can be integrated on a same chip. For example, the digital baseband processor and a plurality of application processors (for example, but not limited to a graphics processor and a multimedia processor) may be integrated on a same chip. Such a chip may be referred to as a system on chip (system on chip). Whether the components are independently disposed on different chips or are integrated and disposed on one or more chips usually depends on specific requirements of a product design. A specific implementation form of the foregoing components is not limited in the embodiments of this application.

An embodiment of this application further provides a computer-readable storage medium. The computer-readable storage medium stores a computer program. When the computer program runs on a computer, the computer is enabled to perform the reference signal configuration method provided in any one of the foregoing aspects or possible designs, for example, any reference signal configuration method provided in any one of the first aspect to the fourth aspect, the ninth aspect to the fourteenth aspect, or possible designs of these aspects.

An embodiment of this application further provides a computer-readable storage medium. The computer-readable storage medium stores a computer program. When the computer program runs on a computer, the computer is enabled to perform the sequence configuration method provided in any one of the foregoing aspects or possible designs, any sequence configuration method provided in any one of the fifth aspect to the eighth aspect or possible designs of these aspects.

An embodiment of this application further provides a computer program product. When the computer program product runs on a computer, the reference signal configuration method provided in any one of the foregoing aspects or possible designs, for example, any reference signal configuration method provided in any one of the first aspect to the fourth aspect, the ninth aspect to the fourteenth aspect, or possible designs of these aspects, is performed.

An embodiment of this application further provides a computer program product. When the computer program product runs on a computer, the sequence configuration method provided in any one of the foregoing aspects or possible designs, any sequence configuration method provided in any one of the fifth aspect to the eighth aspect or possible designs of these aspects, is performed.

This application further provides a communications chip. The communications chip stores an instruction, and when the instruction runs on a network device/a terminal, the network device is enabled to perform the foregoing corresponding reference signal configuration method, for example, any reference signal configuration method provided in any one of the first aspect to the fourth aspect, the ninth aspect to the fourteenth aspect, or possible designs of these aspects.

This application further provides a communications chip. The communications chip stores an instruction, and when the instruction runs on a network device/a terminal, the network device is enabled to perform the foregoing corresponding sequence configuration method, any sequence configuration method provided in any one of the fifth aspect to the eighth aspect or possible designs of these aspects.

Another aspect of the present invention provides a reference signal obtaining method, including:
  determining an initialization factor of a reference signal, where a value of the initialization factor may be determined according to the following formulas; and
  obtaining the reference signal based on the initialization factor.

Correspondingly, the present invention further provides a communications apparatus, including:
  a determining module, configured to determine an initialization factor of a reference signal; and
  an obtaining module, configured to obtain the reference signal based on the initialization factor.

Correspondingly, the present invention further provides a communications apparatus, including:
  a processor, configured to perform the foregoing reference signal obtaining method.

Correspondingly, the present invention further provides a communications apparatus, including:
  a memory, configured to store a computer program; and
  a processor, configured to read the computer program stored in the memory, to perform the foregoing reference signal obtaining method.

Correspondingly, the present invention further provides a computer-readable storage medium, where the computer-readable storage medium stores a computer program, and when the computer program runs on a computer, the computer is enabled to perform the foregoing reference signal obtaining method.

Correspondingly, the present invention further provides a computer program product. When the computer program product runs on a computer, the foregoing reference signal obtaining method is enabled to be performed.

Correspondingly, the present invention further provides a communications chip, where the communications chip stores an instruction, and when the instruction runs on a communications apparatus, the communications apparatus is enabled to perform the foregoing reference signal obtaining method.

In a specific implementation process, the initialization factor may be:

$$c_{init\_m} = (2^{19}(N_{symb}^{slot} n_{s,f}^{\mu} + l + 1)(2N_{ID}^{nSCID} + 1) + f(n_{CDM\_m})) \bmod 2^{31} \quad \text{(formula 1)}$$

or $$c_{init\_m} = (2^{(17+n_{CDM\_m})}(N_{symb}^{slot} n_{s,f}^{\mu} + l + 1)(2N_{ID}^{nSCID} + 1) + f(n_{CDM\_m})) \bmod 2^{31} \quad \text{(formula 2)}.$$

More specifically, when the initialization factor is obtained through calculation by using the foregoing formula 1 or formula 2, $$f(n_{CDM\_m})=2N_{ID}^{nSCID}+n_{SCID}+n_{CDM\_m}*2^{17}, \text{ or}$$

$$f(n_{CDM\_m})=4N_{ID}^{nSCID}+n_{SCID}*2^{18}+n_{CDM\_m}, \text{ or}$$

$$f(n_{CDM\_m})=8N_{ID}^{nSCID}+n_{SCID}*2^{2}+n_{CDM\_m}, \text{ or}$$

$$f(n_{CDM\_m})=N_{ID}^{nSCID}+n_{SCID}*2^{16}+n_{CDM\_m}*2^{17}, \text{ or}$$

$$f(n_{CDM\_m})=8N_{ID}^{nSCID}+n_{SCID}*2n_{CDM\_m}, \text{ or}$$

$$f(n_{CDM\_m})=N_{ID}^{nSCID}+n_{SCID}*2^{18}+n_{CDM\_m}*2^{16}.$$

In a specific implementation process, the initialization factor may alternatively be:

$$c_{init\_m}(2^{(Y)}(N_{symb}^{slot}n_{s,f}^{\mu}+l+1)(2N_{ID}^{nSCID}+1)+2N_{ID}^{nSCID}+n_{SCID}+n_{CDM\_m}*2^{X}) \bmod 2^{31} \quad \text{(formula 3)}.$$

Y is any positive integer greater than or equal to $\log_2(n_{CDM\_m}*2^{X})+1$, and X is any positive integer greater than or equal to $\log_2(2N_{ID}^{nSCID})$.

In a specific implementation process, the initialization factor may alternatively be:

$$c_{init\_m}(2^{17}(f(n_{CDM\_m}))+2N_{ID}^{nSCID}+n_{SCID}) \bmod 2^{31} \quad \text{(formula 4)}.$$

More specifically, when the initialization factor is obtained through calculation by using the foregoing formula 4, $$f(n_{CDM\_m})=(N_{symb}^{slot}n_{s,f}^{\mu}+l+1+n_{CDM\_m})(2N_{ID}^{nSCID}+1), \text{ or}$$

$$f(n_{CDM\_m})=(N_{symb}^{slot}n_{s,f}^{\mu}+1+(l+n_{CDM\_m}) \bmod N_{symb}^{slot})(2N_{ID}^{nSCID}+1).$$

In the foregoing formula, $c_{init\_m}$ is the initialization factor, $n_{CDM\_m}$ represents an index of a code division multiplexing group to which an antenna port corresponding to a reference signal belongs, an offset value corresponding to the code division multiplexing group, a scrambling factor corresponding to the code division multiplexing group, or other information that can be used to identify the code division multiplexing group, $N_{symb}^{slot}$ is a quantity of symbols (symbol) in a slot (slot), $n_{s,f}^{\mu}$ is an index of a subframe or a slot (slot), l is an index of a symbol (symbol), $n_{SCID}$ is a scrambling factor, and $N_{ID}^{nSCID}$ is a sequence scrambling identifier (ID).

In a specific implementation process, a value of $n_{SCID}$ may be, for example, but not limited to, 0 or 1. In this case, the value of $n_{SCID}$ may be indicated by using one bit (bit) in DCI. A value range of $N_{ID}^{nSCID}$ may be, for example, but is not limited to, 0 to 65535. The parameter may be configured through, for example, but not limited to, RRC signaling. There is a correspondence between $n_{CDM\_m}$ and a DMRS port (port).

For meanings and value ranges of the foregoing parameters, refer to definitions in this specification and the prior art (for example, but not limited to various communications standards such as LTE and 5G standards). For example, in the LTE standard or the 5G standard, $c_{init\_m}$ is an initialization factor of a reference signal sequence, and $N_{symb}^{slot}$ is a quantity of symbols in a slot, for example, but not limited to, a quantity of symbols in a slot that carries the reference signal. For example, in the LTE standard, $N_{symb}^{slot}$ may be equal to 6 or 7. $n_{s,f}^{\mu}$ is an index of a subframe, for example, but not limited to, an index of a subframe that carries the reference signal, or $n_{s,f}^{\mu}$ is an index of a slot, for example, but not limited to, an index of a slot that carries the reference signal, and l is an index of a symbol, for example, but not limited to, an index of a symbol that carries the reference signal. For example, l may be equal to 0 to 5 or 0 to 6 in the LTE standard.

It is not difficult to understand that the foregoing formulas may be replaced with or combined with another formula (for example, but not limited to a formula for generating an initialization factor that is to be described below) that has a same function and that is mentioned in this specification.

In a specific implementation process, the reference signal may be obtained with reference to the prior art. For example, the reference signal may be obtained in the following manner.

The reference signal sequence is obtained, and the reference signal sequence may be generated according to the following formula.

$$r(n) = \frac{1}{\sqrt{2}}(1 - 2 \cdot c(2n)) + j\frac{1}{\sqrt{2}}(1 - 2 \cdot c(2n+1)), \quad \text{(formula 5)}$$

where $$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2$$

c(n) is a binary gold sequence, and a length of the binary gold sequence may be, for example, but is not limited to $M_{PN}$, where n=0, 1, ..., $M_{PN}-1$, $N_C=1600$, and $$x_1(0) = 1, x_1(n) = 0, n = 1, 2, \ldots, 30$$

$$c_{init\_m} = \sum_{i=0}^{30} x_2(i) * 2^i$$

In a specific implementation process, the reference signal is a DMRS or a CSI-RS.

The obtaining the reference signal may be obtaining the reference signal in various manners, for example, but not limited to, obtaining the reference signal through calculation according to a preset formula, or finding the reference signal through table lookup. More specifically, the preset formula is, for example, but not limited to, a sequence generation formula of the reference signal, and the formula is a formula related to the initialization factor. For example, but not limited to, a parameter in the preset formula includes the initialization factor. In a specific implementation process, for the preset formula, refer to, for example, but not limited to, a reference signal sequence generation formula mentioned in an existing LTE standard or a 5G standard. In addition, as described in this specification, $n_{CDM\_m}$ represents an index of a code division multiplexing group to which an antenna port corresponding to a reference signal belongs, an offset value corresponding to the code division multiplexing group, a scrambling factor corresponding to the code division multiplexing group, or other information that can be used to identify the code division multiplexing group.

If a device for performing the foregoing method is a transmit end device, the foregoing method may further include: sending the reference signal. More specifically, before the reference signal is sent, other processing may be further performed. For example, but not limited to, processing is performed through an OCC code, and then the reference signal is sent on a time-frequency resource corresponding to the reference signal.

If the device for performing the foregoing method is a receive end device, the foregoing method may further include: performing, by the receive end device, data demodulation based on the reference signal and a reference signal from a transmit end device. It is not difficult to understand that in this case, the reference signal is a DMRS. Specifically, the reference signal generated by the receive end device and the reference signal generated by the transmit end device are a same reference signal. In this way, after the reference signal generated by the transmit end device is sent by the transmit end device and transmitted on a channel, the reference signal is received by the receive end device, so that the receive end device can perform data demodulation based on the reference signal that is received from the transmit end device and the reference signal that is obtained by the receive end device based on the initialization factor. For a process of performing data demodulation based on the reference signal that is from the transmit end device and the reference signal that is obtained by the receive end device based on the initialization factor, refer to the prior art. Details are not described in this specification. For example, but not limited to, the receive end device may determine, based on the reference signal that is from the transmit end device and the reference signal that is obtained by the receive end device based on the initialization factor, for example, a channel parameter (for example, but not limited to, an equivalent channel matrix), and perform data demodulation based on the channel parameter. Before data demodulation is performed, other processing may further need to be performed on the reference signal that is from the transmit end device and the reference signal that is obtained by the receive end device based on the initialization factor.

According to another aspect, the transmit end device may be a network device, and the receive end device may be a terminal. In this way, the transmit end device sends the reference signal to the receive end device, and the receive end device performs data demodulation based on the reference signal that is received from the transmit end device and the reference signal that is generated by the receive end device. This corresponds to a downlink communication process.

According to still another aspect, the transmit end device may be a terminal, and the receive end device may be a network device. In this way, the transmit end device sends the reference signal to the receive end device, and the receive end device performs data demodulation based on the reference signal that is received from the transmit end device and the reference signal that is generated by the receive end device. This corresponds to an uplink communication process.

It is not difficult to understand that the communications apparatus may be the transmit end device, or may be the receive end device. In addition, the transmit end device and the receive end device may further include components such as a transceiver module or a transceiver.

For related content of the foregoing components such as the modules, the processor, the memory, and the transceiver, refer to descriptions of other parts in this specification.

It may be understood that any apparatus, processor, computer-readable storage medium, computer program product, communications chip, or the like provided above is configured to perform a corresponding method provided in the foregoing descriptions. Therefore, for beneficial effects that can be achieved by any apparatus, processor, computer-readable storage medium, computer program product, communications chip, or the like, refer to beneficial effects in the corresponding method. Details are not described herein again.

It should be noted that, the foregoing components that are provided in the embodiments of this application and that are configured to store the computer instruction or the computer program, for example, but not limited to, the foregoing memory, computer-readable storage medium, and communications chip, are all non-transitory (non-transitory).

DESCRIPTION OF EMBODIMENTS

Usually, one antenna port corresponds to one reference signal. One reference signal corresponds to a sequence obtained after a plurality of modulation symbols (or referred to as constellation symbols) are arranged in a specific sequence. In addition, the embodiments of this application are also applicable to a scenario in which one reference signal includes one modulation symbol.

A process of configuring the reference signal may include: generating one or more sequences, where each sequence includes a plurality of modulation symbols; and then generating a reference signal based on the one or more sequences. For example, all modulation symbols in the generated sequence are sequentially used as modulation symbols in a reference signal, or some modulation symbols in the generated sequence are sequentially used as modulation symbols in a reference signal. In addition, for a transmit end device, the transmit end device may further map the generated reference signal to a time-frequency resource, and send the reference signal mapped to the time-frequency resource. For a receive end device, the receive end device may further receive a reference signal on a corresponding time-frequency resource.

In a downlink transmission scenario, the transmit end device may be a network device, and the receive end device may be a terminal. In an uplink transmission scenario, the transmit end device may be a terminal, and the receive end device may be a network device.

In 5G new radio (new radio (new radio, NR)) R15, for a CSI-RS and a DMRS in a cyclic prefix (cyclic prefix, CP) orthogonal frequency division multiplexing (orthogonal frequency division multiplexing, OFDM) waveform, a rule with which configuration of a reference signal complies may include: DMRS ports allocated by a network device to a same terminal use a unique sequence, and CSI-RS ports corresponding to CSI-RS resources allocated by the network device to the same terminal use a unique sequence. A sequence used by an antenna port may also be referred to as a sequence corresponding to the antenna port, that is, a sequence used to obtain a reference signal corresponding to the antenna port.

Figure 1:
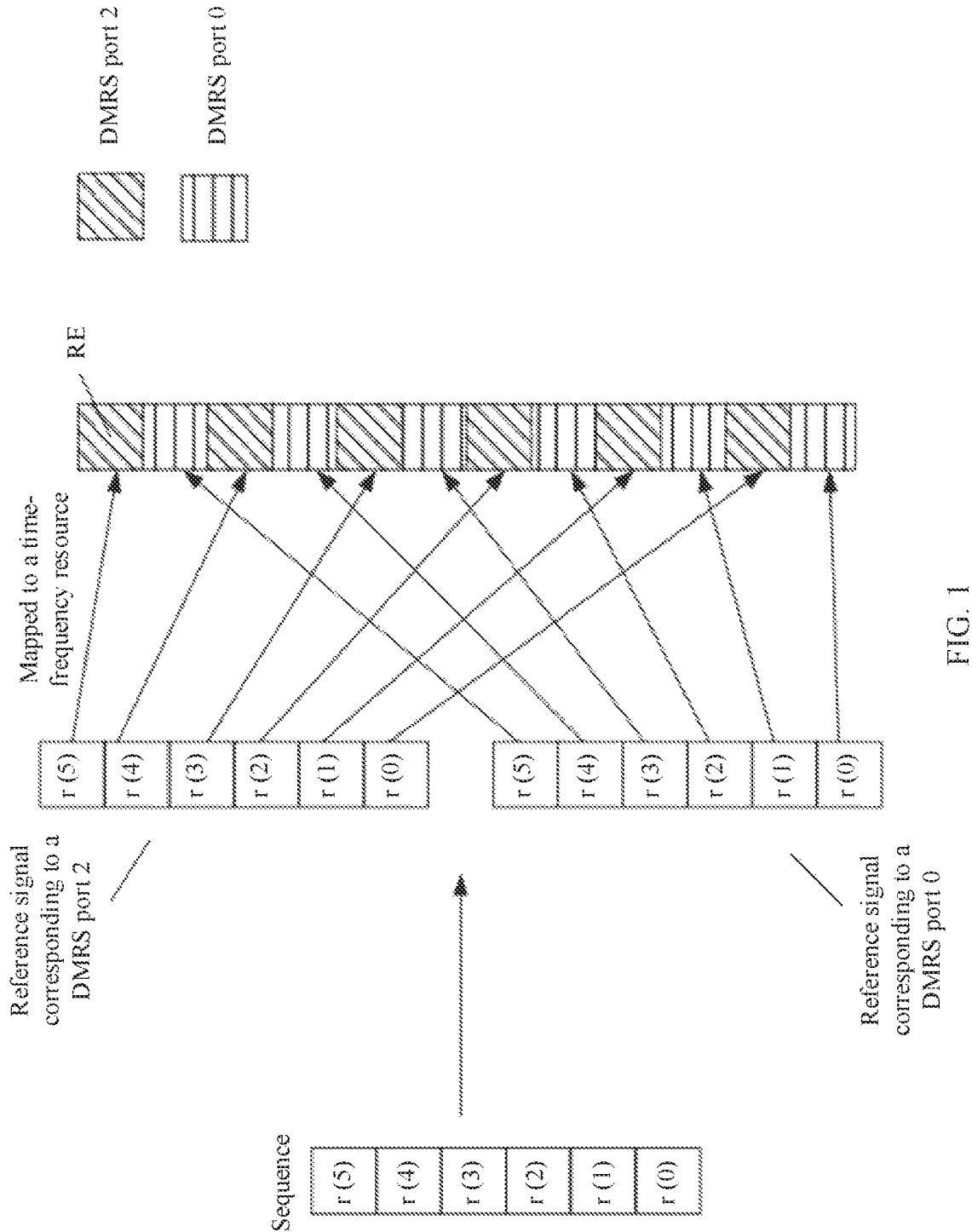
FIG. 1 is a schematic diagram of a process of configuring a reference signal according to 5G NR R15.

FIG. 1 is a schematic diagram of a process of configuring a reference signal according to 5G NR R15. In FIG. 1, "R15 2-ports (port) DMRS (port 0, 2) type 1 (type 1)" is used as an example for description. A time-frequency resource in FIG. 1 represents a time-frequency resource corresponding to one time domain symbol in one resource block (resource block, RB), and each small box in the time-frequency resource represents one resource element (resource element, RE). Referring to FIG. 1, it can be learned that DMRS ports allocated by a network device to a terminal are a DMRS port 0 and a DMRS port 2, an RE indicated by a shadow with oblique lines in FIG. 1 is an RE to which a reference signal corresponding to the DMRS port 0 is mapped, and an RE represented by a shadow with horizontal lines is an RE to which a reference signal corresponding to the DMRS port 2 is mapped. Sequences corresponding to the DMRS port 0 and the DMRS port 2 are both sequences including modulation symbols r(0) to r(5). The sequence may be used as the reference signal corresponding to the DMRS port 0, and may be used as the reference signal corresponding to the DMRS port 2. The network device/terminal may map all modulation symbols in the sequence to a time-frequency resource in sequence. The modulation symbols are in a one-to-one correspondence with REs.

It can be learned from FIG. 1 that, the reference signal is configured based on existing 5G NR R15, so that two reference signals mapped to a same time domain symbol are completely the same, and sequence repetition in frequency domain causes a PAPR to be increased. As a result, system transmission performance is affected.

Based on this, the embodiments of this application provide a reference signal configuration method and apparatus, and a sequence configuration method and apparatus.

The technical solutions provided in the embodiments of this application can be applied to various communications systems. The technical solutions provided in the embodiments of this application may be applied to a 5G communications system such as a 5G NR system, a future evolved system, a plurality of communications convergence systems, or the like, or may be applied to an existing communications system or the like. Application scenarios of the technical solutions provided in this application may include a plurality of types, for example, machine to machine (machine to machine, M2M), macro-micro communication, enhanced mobile broadband (enhanced mobile broadband, eMBB), ultra-reliable low-latency communication (ultra reliable & low latency communication, uRLLC), and massive machine-type communications (massive machine type communication, mMTC). The scenarios may include but are not limited to a scenario of communication between terminals, a scenario of communication between network devices, a scenario of communication between a network device and a terminal, and the like. The following provides descriptions by using an example in which the technical solutions are applied to a scenario in which a network device communicates with a terminal.

Figure 2:
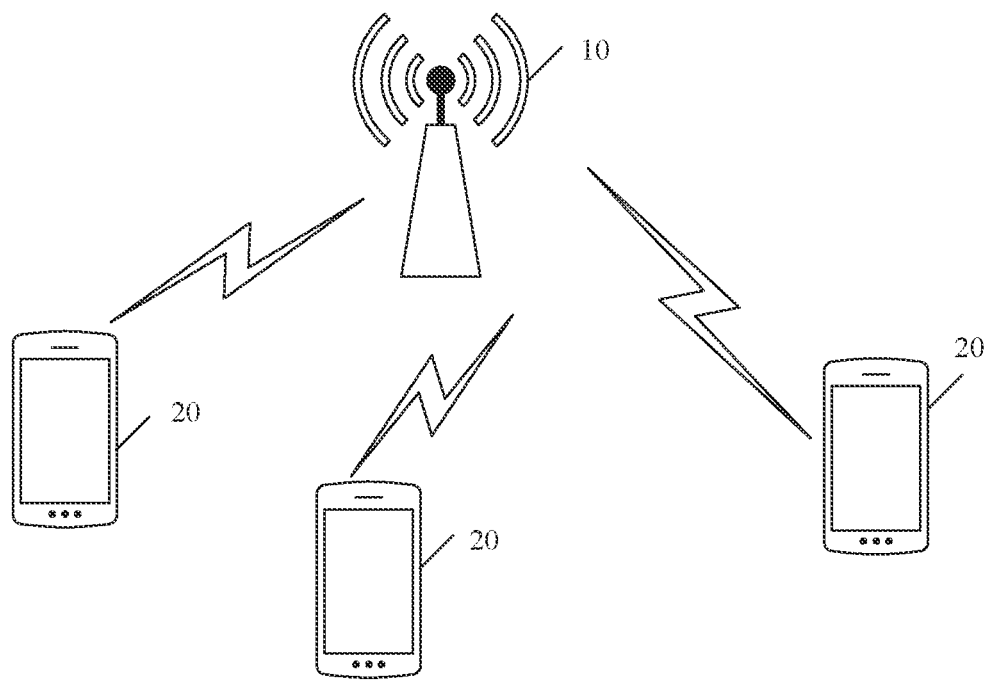
FIG. 2 is a schematic diagram of a communications system applicable to an embodiment of this application.

FIG. 2 is a schematic diagram of a communications system applicable to an embodiment of this application. The communications system may include one or more network devices 10 (only one network device is shown) and one or more terminals 20 connected to each network device 10. FIG. 2 is merely a schematic diagram, and does not constitute a limitation on an application scenario of the technical solutions provided in this application.

The network device 10 may be a transmission reception point (transmission reception point, TRP), a base station, a relay station, an access point, or the like. The network device 10 may be a network device in a 5G communications system or a network device in a future evolved network; or may be a wearable device, a vehicle-mounted device, or the like. In addition, the network device 10 may be a base transceiver station (base transceiver station. BTS) in a global system for mobile communications (global system for mobile communication. GSM) or code division multiple access (code division multiple access, CDMA) network, or may be an NB (NodeB) in wideband code division multiple access (wideband code division multiple access. WCDMA), or may be an eNB or an eNodeB (evolutional NodeB) in long term evolution (long term evolution, LTE). The network device 10 may alternatively be a radio controller in a cloud radio access network (cloud radio access network, CRAN) scenario.

The terminal 20 may be user equipment (user equipment, UE), an access terminal, a UE unit, a UE station, a mobile station, a mobile console, a remote station, a remote terminal, a mobile device, a UE terminal, a wireless communications device, a UE agent, a UE apparatus, or the like. The access terminal may be a cellular phone, a cordless phone, a session initiation protocol (session initiation protocol, SIP) phone, a wireless local loop (wireless local loop, WLL) station, a personal digital assistant (personal digital assistant, PDA), a handheld device with a wireless communication function, a computing device or another processing device connected to a wireless modem, a vehicle-mounted device, a wearable device, a terminal in a 5G network, a terminal in a future evolved public land mobile network (public land mobile network, PLMN) network, or the like.

Optionally, each network element (for example, the network device 10 and the terminal 20) in FIG. 2 may be implemented by one device, or may be jointly implemented by a plurality of devices, or may be a function module in a device. This is not specifically limited in the embodiments of this application. It may be understood that the foregoing function may be a network element in a hardware device, or may be a software function running on dedicated hardware, or may be a virtualization function instantiated on a platform (for example, a cloud platform).

Figure 3:
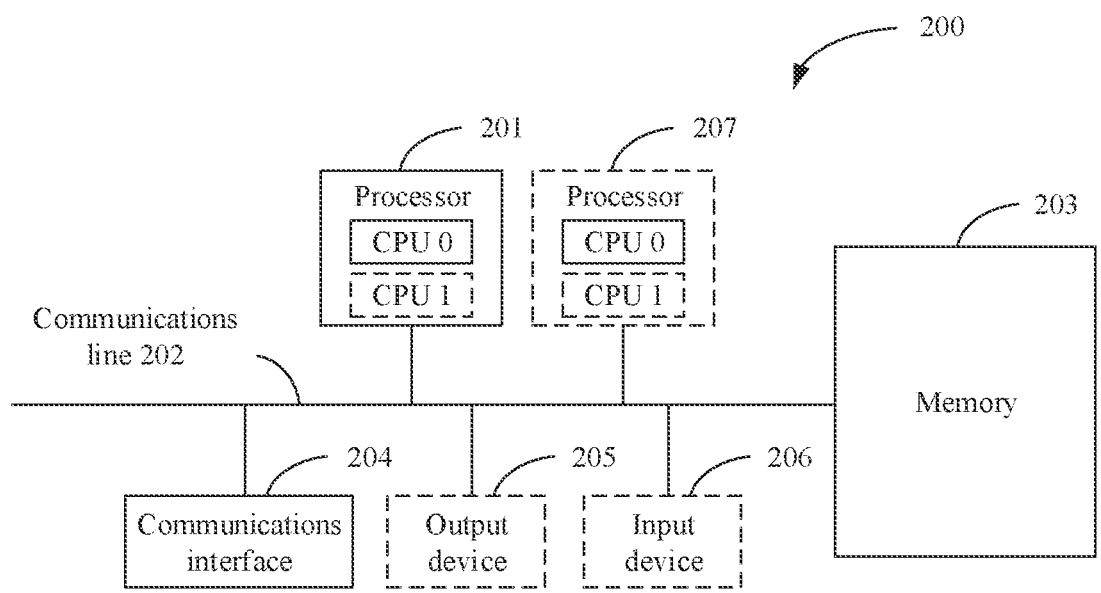
FIG. 3 is a schematic diagram of a hardware structure of a communications device applicable to an embodiment of this application.

For example, each network element in FIG. 2 may be implemented by using the communications device 200 in FIG. 3. FIG. 3 is a schematic diagram of a hardware structure of a communications device applicable to an embodiment of this application. The communications device 200 includes at least one processor 201, a communications line 202, a memory 203, and at least one communications interface 204.

The processor 201 may be a general-purpose central processing unit (central processing unit, CPU), a microprocessor, an application-specific integrated circuit (application-specific integrated circuit. ASIC)), or one or more integrated circuits configured to control program execution in the solutions of this application.

The communications line 202 may include a path, to transmit information between the foregoing components.

The communications interface 204, which uses any apparatus such as a transceiver, is configured to communicate with another device or communications network, such as the Ethernet, a RAN, or a wireless local area network (wireless local area networks, WLAN).

The memory 203 may be a read-only memory (read-only memory. ROM) or another type of static storage device that can store static information and instructions, a random access memory (random access memory, RAM) or another type of dynamic storage device that can store information and instructions, or may be an electrically erasable programmable read-only memory (electrically erasable programmable read-only memory, EEPROM), a compact disc read-only memory (compact disc read-only memory, CD-ROM) or another compact disc storage, an optical disc storage (including a compressed optical disc, a laser disc, an optical disc, a digital versatile disc, a blue-ray optical disc, and the like), or a magnetic disk storage medium or another magnetic storage device, or any other medium that can carry or store expected program code in a form of an instruction or a data structure and that can be accessed by a computer, but is not limited thereto. The memory may exist independently, and is connected to the processor through the communications line 202. Alternatively, the memory may be integrated into the processor. The memory provided in this embodiment of this application may usually be non-volatile. The memory 203 is configured to store a computer-executable instruction for executing the solutions in this application, and the processor 201 controls the execution of the computer-executable instruction. The processor 201 is configured to execute the computer-executable instruction stored in the memory 203, to implement methods provided in the following embodiments of this application.

Optionally, the computer-executable instruction in this embodiment of this application may also be referred to as application program code. This is not specifically limited in this embodiment of this application.

During specific implementation, in an embodiment, the processor 201 may include one or more CPUs, such as a CPU 0 and a CPU 1 in FIG. 3.

During specific implementation, in an embodiment, the communications device 200 may include a plurality of processors, for example, the processor 201 and a processor 207 in FIG. 3. Each of the processors may be a single-core (single-CPU) processor, or may be a multi-core (multi-CPU) processor. The processor herein may refer to one or more devices, circuits, and/or processing cores configured to process data (for example, a computer program instruction).

During specific implementation, in an embodiment, the communications device 200 may further include an output device 205 and an input device 206. The output device 205 communicates with the processor 201, and may display information in a plurality of manners. For example, the output device 205 may be a liquid crystal display (liquid crystal display, LCD), a light emitting diode (light emitting diode, LED) display device, a cathode ray tube (cathode ray tube, CRT) display device, a projector (projector), or the like. The input device 206 communicates with the processor 201, and may receive input from a user in a plurality of manners. For example, the input device 206 may be a mouse, a keyboard, a touchscreen device, a sensing device, or the like.

The communications device 200 may be a general-purpose device or a dedicated device. During specific implementation, the communications device 200 may be a desktop computer, a portable computer, a network server, a palmtop computer (personal digital assistant, PDA), a mobile phone, a tablet computer, a wireless terminal device, an embedded device, or a device having a structure similar to that in FIG. 3. A type of the communications device 200 is not limited in this embodiment of this application.

It should be noted that any technical solution provided in this embodiment of this application may be applied to a downlink transmission scenario, or may be applied to an uplink transmission scenario. When any technical solution provided in this embodiment of this application is applied to a downlink transmission scenario, a transmit end device may be a network device, and a receive end device may be a terminal. When any technical solution provided in this embodiment of this application is applied to an uplink transmission scenario, a transmit end device may be a terminal, and a receive end device may be a network device. In any one of the following embodiments, after the transmit end device (or the receive end device) is replaced with a network device, the network device in this embodiment and the network device with which the transmit end device (or the receive end device) is replaced may represent a same network device. After the transmit end device (or the receive end device) is replaced with a terminal, the terminal in this embodiment and the terminal with which the transmit end device (or the receive end device) is replaced may represent a same terminal. This is uniformly described herein, and details are not described below again.

A "resource unit" in this embodiment of this application is a basic unit for scheduling the terminal. The resource unit includes a plurality of contiguous subcarriers in frequency domain and one time interval (time interval, TI) in time domain. In different scheduling processes, sizes of resource units may be the same or different. The TI may be a transmission time interval (transmission time interval, TTI) in an LTE system, or may be a symbol-level short TTI or a short TTI that has a large subcarrier spacing and that is in a high frequency system, or may be a slot (slot) or a mini-slot (mini-slot) in a 5G system. This is not limited in this embodiment of this application. Optionally, one resource unit may include one or more RBs, one or more RB pairs (RB pair), or the like. In addition, the resource unit may be half an RB, or the like. Alternatively, the resource unit may be another time-frequency resource. This is not limited in this embodiment of this application. It should be noted that, unless otherwise specified, or when no conflict exists, the following specific examples are all described by using an example in which the resource unit is an RB in an LTE system.

A "scheduling periodicity" in this embodiment of this application is a time interval TI.

A "time domain symbol" in this embodiment of this application may include but is not limited to any one of the following: an OFDM symbol, a universal filtered multi-carrier (universal filtered multi-carrier, UFMC) signal, a filter-bank multi-carrier (filter-band multi-carrier, FBMC) symbol, a generalized frequency-division multiplexing (generalized frequency-division multiplexing, GFDM) symbol, or the like.

The term "at least one (type)" in the embodiments of this application includes one (type) or more (types). "A plurality of" means two (types) or more than two (types). For example, at least one of A, B, and C includes the following cases: only A, only B, both A and B, both A and C, both B and C, and both A, B, and C. The term "and/or" in the embodiments of this application describes only an association relationship for describing associated objects and represents that three relationships may exist. For example, A and/or B may represent the following three cases: Only A, both A and B, and only B. A term character "/" in the embodiments of this application usually indicates an "or" relationship between associated objects. In addition, in a formula, a character "/" indicates a division relationship between associated objects. For example, A/B may indicate that A is divided by B. In the embodiments of this application, the terms "first", "second", and the like are intended to distinguish between different objects but do not indicate a particular order of the objects.

The following describes the technical solutions provided in the embodiments of this application with reference to the accompanying drawings.

Figure 4:
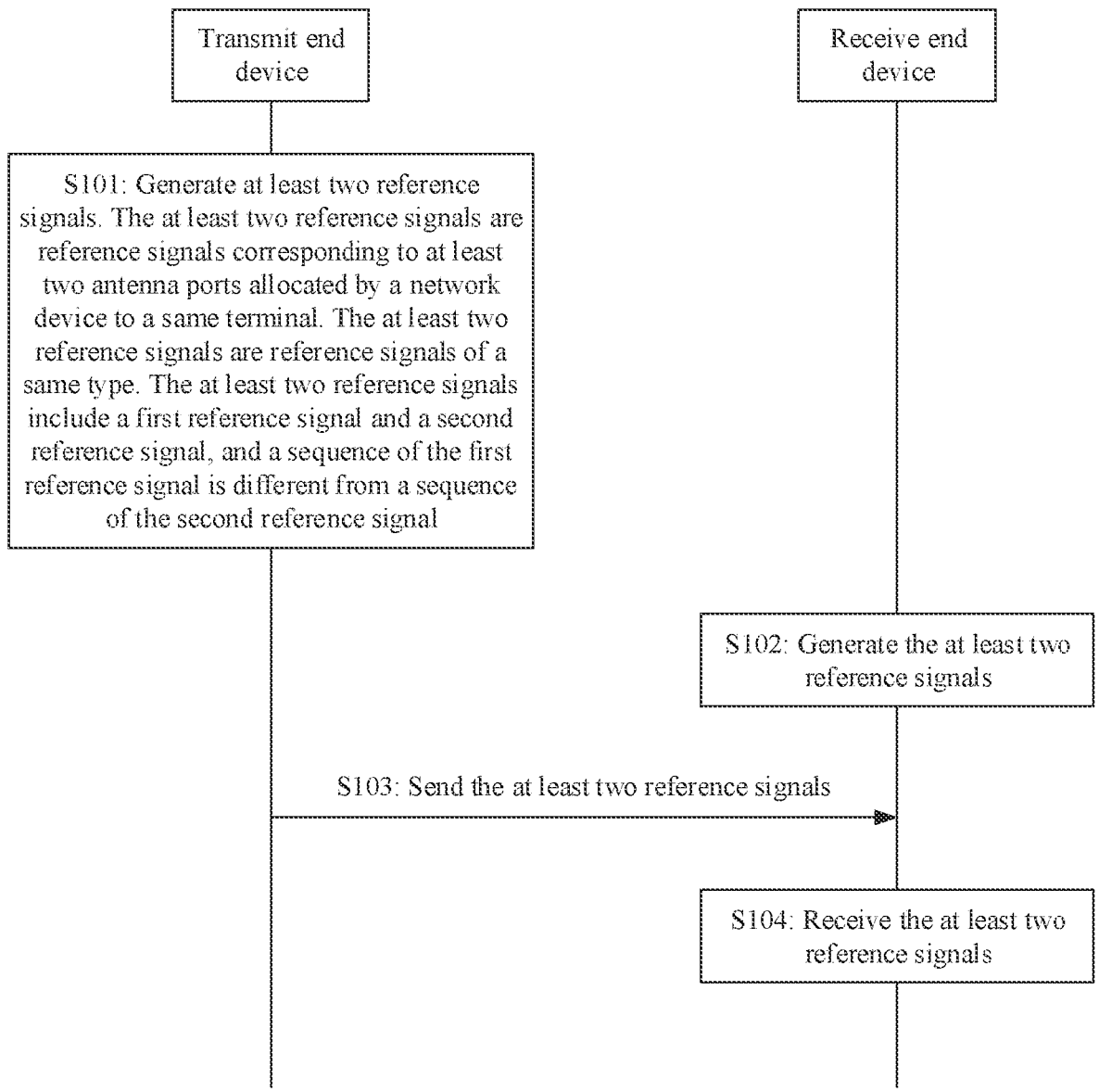
FIG. 4 is a schematic diagram of a reference signal configuration method according to an embodiment of this application.

FIG. 4 is a schematic diagram of a reference signal configuration method according to an embodiment of this application. The method includes the following steps.

S101: A transmit end device generates at least two reference signals. The at least two reference signals are reference signals corresponding to at least two antenna ports allocated by a network device to a same terminal. The at least two reference signals are reference signals of a same type. The at least two reference signals include a first reference signal and a second reference signal, and a sequence of the first reference signal is different from a sequence of the second reference signal.

It may be understood that, in one scheduling periodicity, the network device may schedule one or more terminals. For each scheduled terminal, the network device may allocate one or more antenna ports to the terminal. The terminal described in S101 may be any terminal that is in terminals scheduled by the network device in one scheduling periodicity and to which two or more antenna ports are allocated.

The at least two reference signals are the reference signals of the same type. For example, the at least two reference signals are all DMRSs or CSI-RSs. Certainly, this embodiment of this application is not limited thereto. One antenna port corresponds to one reference signal.

Figure 5:
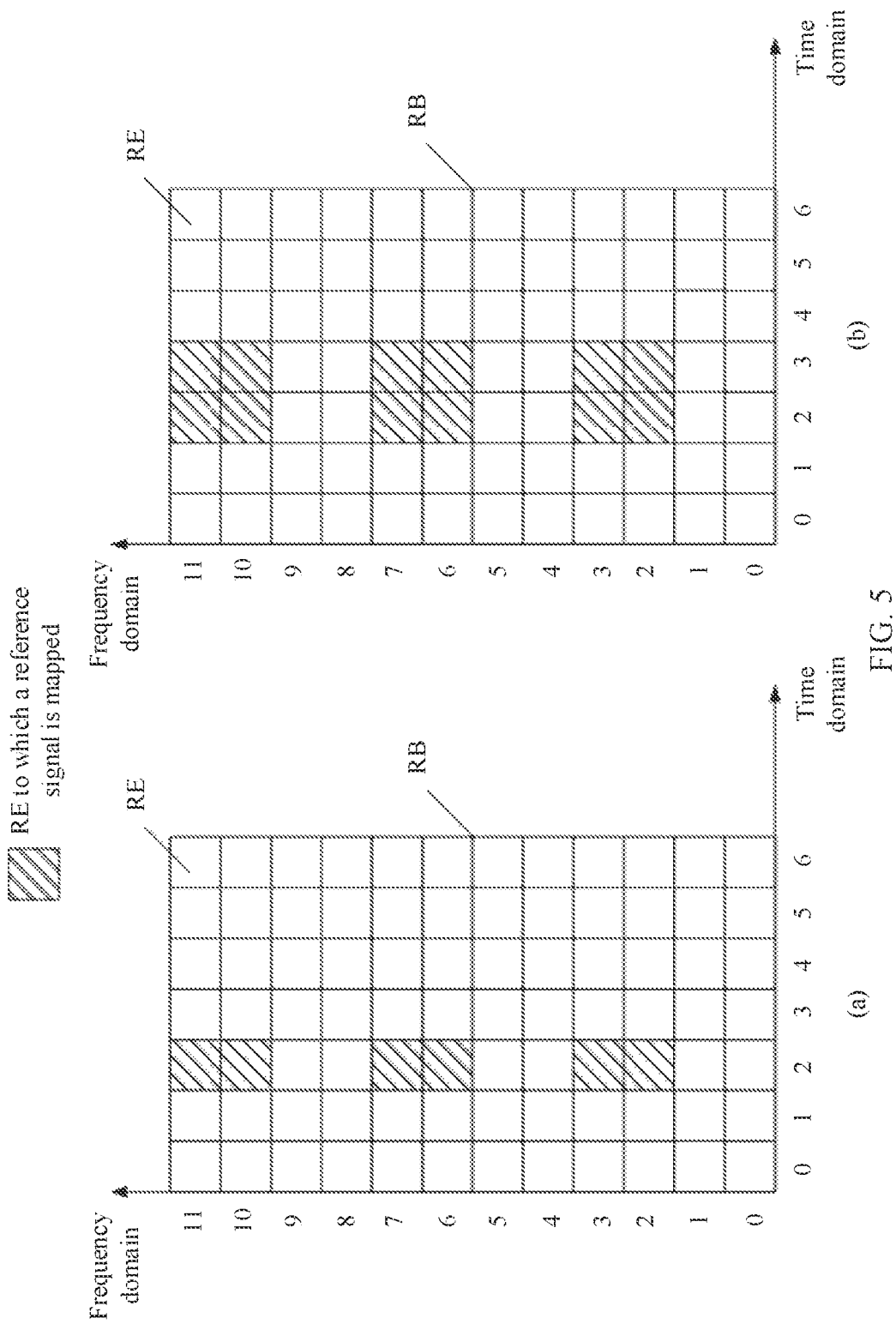
FIG. 5 is a schematic diagram of mapping a reference signal to a time-frequency resource according to an embodiment of this application.

In this embodiment of this application, one reference signal may occupy one or more time domain symbols on one resource unit. For example, FIG. 5 is a schematic diagram of mapping a reference signal to a time-frequency resource according to an embodiment of this application. A quantity of time domain symbols occupied, on one resource unit, by a reference signal shown in (a) in FIG. 5 is 1, and a number of the time domain symbol is 2. A quantity of time domain symbols occupied, on one resource unit, by a reference signal shown in (b) in FIG. 5 is 2, and numbers of the time domain symbols are 2 and 3.

In some embodiments of this application, a sequence of a reference signal is a sequence used to obtain a modulation symbol in the reference signal. The sequence of the reference signal may be referred to as a generation sequence of the reference signal or a local sequence of the reference signal. The modulation symbol in the reference signal is selected from the sequence of the reference signal. The sequence of the reference signal may be a sequence obtained after a plurality of modulation symbols are arranged in a specific sequence. This embodiment of this application is also applicable to a scenario in which a sequence of one reference signal includes one modulation symbol.

Different reference signals may have a same sequence or different sequences. That the sequence of the first reference signal is different from the sequence of the second reference signal may include: Elements included in the sequence of the first reference signal are different from elements included in the sequence of the second reference signal, and/or an order of the elements in the sequence of the first reference signal is different from an order of the elements in the sequence of the second reference signal. That the elements included in the sequence of the first reference signal are different from the elements included in the sequence of the second reference signal may be understood as that a set including modulation symbols included in the sequence of the first reference signal is different from a set including modulation symbols included in the sequence of the second reference signal.

Optionally, the sequence of the first reference signal and the sequence of the second reference signal are generated at the same time. "The same time" herein may be understood as a same time point or a same time period. The time period is less than or equal to the scheduling periodicity. The time period may be, for example, but is not limited to, one or more time domain symbols, or one or more mini-slots, or one or more slots, or one subframe.

A manner of generating a sequence of a reference signal may include, for example, but is not limited to, the following two manners.

Manner 1: The sequence of the reference signal is a sequence generated based on a reference signal level (or an antenna port level). For example, refer to a manner of generating a local sequence in an LTE system.

Based on the first manner, the sequence of the reference signal may be generated at the beginning of one scheduling periodicity. For example, in an LTE system, one scheduling periodicity is one subframe. In a 5G NR system, one scheduling periodicity may be one slot, one mini-slot, or the like.

Based on this, that the sequence of the first reference signal and the sequence of the second reference signal are generated at the same time may include: The sequence of the first reference signal and the sequence of the second reference signal are generated at the beginning of a same scheduling periodicity.

It should be noted that, based on the first manner, a length of a sequence of a reference signal (that is, a quantity of modulation symbols included in the sequence) may be greater than or equal to a length of the reference signal (that is, a quantity of modulation symbols included in the reference signal). In an example, a length of a reference signal is equal to a product of a quantity of REs that are occupied by the reference signal in a resource unit and a maximum quantity of resource units that can be supported by bandwidth. For example, assuming that the maximum quantity of resource units that can be supported by bandwidth is 20, a length of the reference signal shown in (a) in FIG. 5 is 6*20=120. In this example, a length of a sequence of the reference signal may be greater than or equal to 120. For another example, assuming that the maximum quantity of resource units that can be supported by bandwidth is 20, a length of the reference signal shown in (b) in FIG. 5 is 12*20=240. In this example, a length of a sequence of the reference signal may be greater than or equal to 240.

Optionally, assuming that a length of a sequence of a reference signal is equal to a length of the reference signal, the sequence may be directly used as a reference signal. Assuming that a length of a sequence of a reference signal is greater than a length of the reference signal, a sequence including some modulation symbols in the sequence may be used as a reference signal. For example, if a length of a sequence of a reference signal is 10, and a length of the reference signal is 8, eight values may be selected from 10 values in the sequence, and the eight values are used as a reference signal. Usually, an order of the eight values in the reference signal is consistent with an order of the eight values in the sequence of the reference signal. Certainly, this embodiment of this application is not limited thereto.

Manner 2: The sequence of the reference signal is a sequence generated based on a time domain symbol level. For example, refer to a manner of generating a local sequence in 5G NR R15.

Based on the second manner, the sequence of the reference signal may be generated at the beginning of a time domain symbol. The time domain symbol herein is a time domain symbol occupied by the reference signal. For example, with reference to the reference signal shown in (a) in FIG. 5, the sequence of the reference signal may be generated at the beginning of a time-domain symbol 2. For another example, with reference to the reference signal shown in (b) in FIG. 5, the sequence of the reference signal may be generated at the beginning of the time-domain symbol 2, and the sequence of the reference signal may be generated at the beginning of a time-domain symbol 3.

Based on this, that the sequence of the first reference signal and the sequence of the second reference signal are generated at the same time may include: The sequence of the first reference signal and the sequence of the second reference signal are generated at the beginning of a same time domain symbol.

It should be noted that, based on the second manner, a length of a sequence of a reference signal may be greater than or equal to a quantity of modulation symbols of the reference signal on a time domain symbol. For example, assuming that the maximum quantity of resource units that can be supported by bandwidth is 20, because a quantity of modulation symbols, on a time domain symbol, of the reference signal shown in (a) or (b) in FIG. 5 is 6, the length of the sequence of the reference signal may be greater than or equal to 120.

It should be noted that the first manner and the second manner are merely examples, and do not constitute a limitation on a manner of generating a sequence of a reference signal to which this embodiment of this application is applicable. For example, the second manner may be extended as follows. The sequence of the reference signal is generated based on a time domain unit, and the time domain unit is less than the scheduling periodicity. For example, assuming that one scheduling periodicity is one subframe, one time domain unit may be one slot, one mini-slot, one time domain symbol, or the like. In this case, a length of a sequence of a reference signal may be greater than or equal to a quantity of modulation symbols of the reference signal in a time domain unit.

S101 may include: generating, by the transmit end device, M sequences, and generating the at least two reference signals based on the M sequences. M is an integer greater than or equal to 2.

Specifically, the M sequences include the sequence of the first reference signal and the sequence of the second reference signal. The transmit end device generates the first reference signal based on the sequence of the first reference signal, and generates the second reference signal based on the sequence of the second reference signal.

Optionally, the M sequences are generated at the same time. For related explanations for "the M sequences are generated at the same time", refer to the foregoing explanations for "the sequence of the first reference signal and the sequence of the second reference signal are generated at the same time". Details are not described herein again.

Figure 6:
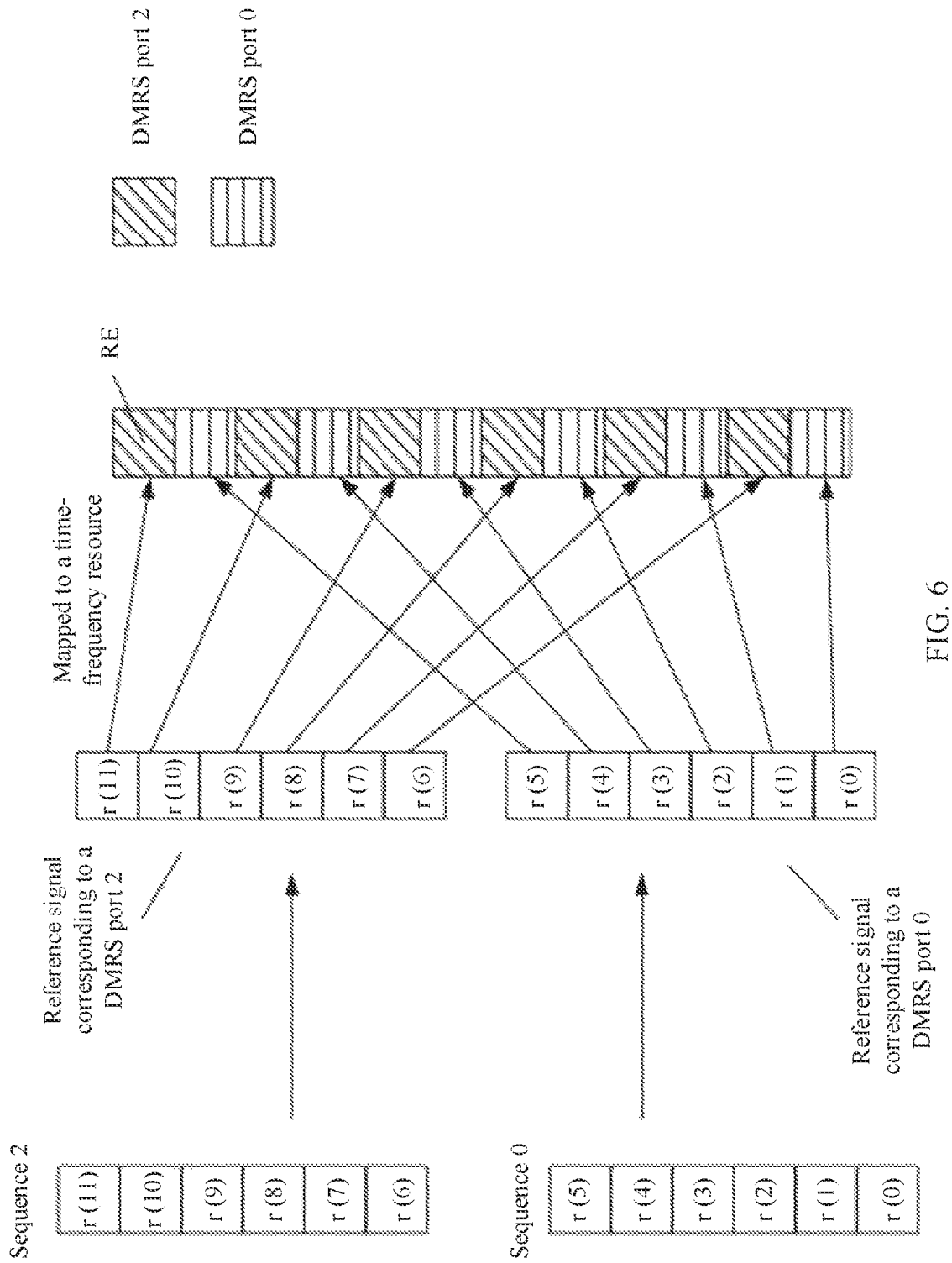
FIG. 6 is a schematic diagram of a process of configuring a reference signal according to an embodiment of this application.

FIG. 6 is a schematic diagram of a process of configuring a reference signal according to an embodiment of this application. A time-frequency resource in FIG. 6 represents a time-frequency resource corresponding to one time domain symbol in one RB. Based on FIG. 6, the transmit end device may first generate a sequence 0 and a sequence 2, where elements in the sequence 0 are sequentially modulation symbols r(0) to r(5), and elements in the sequence 2 are sequentially modulation symbols r(6) to r(11), then, use the sequence 0 as the first reference signal (that is, a reference signal corresponding to a DMRS port 0 in FIG. 6) and use the sequence 2 as the second reference signal (that is, a reference signal corresponding to a DMRS port 2 in FIG. 6), and then, sequentially map modulation symbols in the first reference signal to a time-frequency resource corresponding to the first reference signal, and sequentially map modulation symbols in the second reference signal to a time-frequency resource corresponding to the second reference signal.

Figure 8:
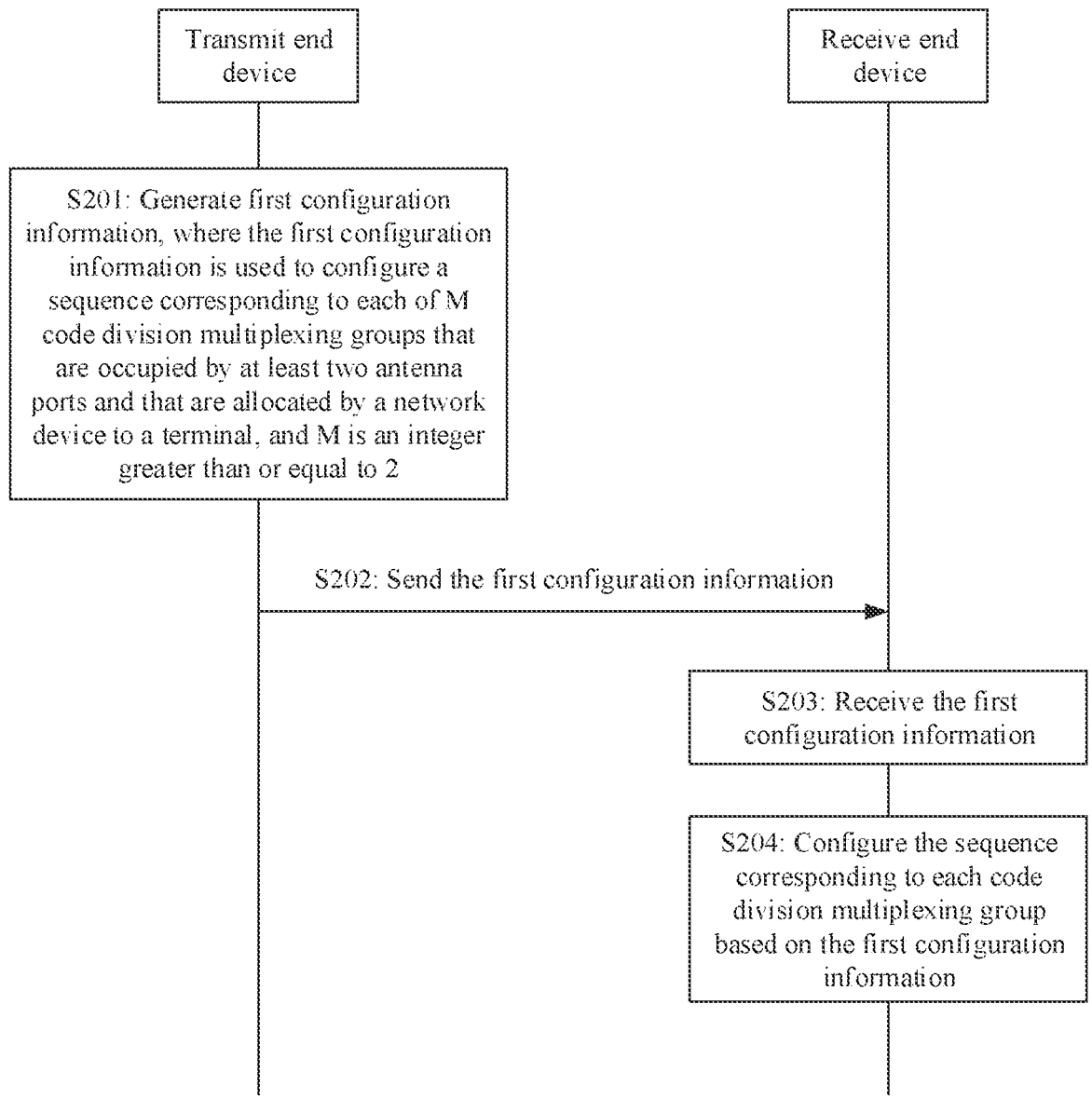
FIG. 8 is a schematic diagram of a sequence configuration method according to an embodiment of this application.
Figure 9:
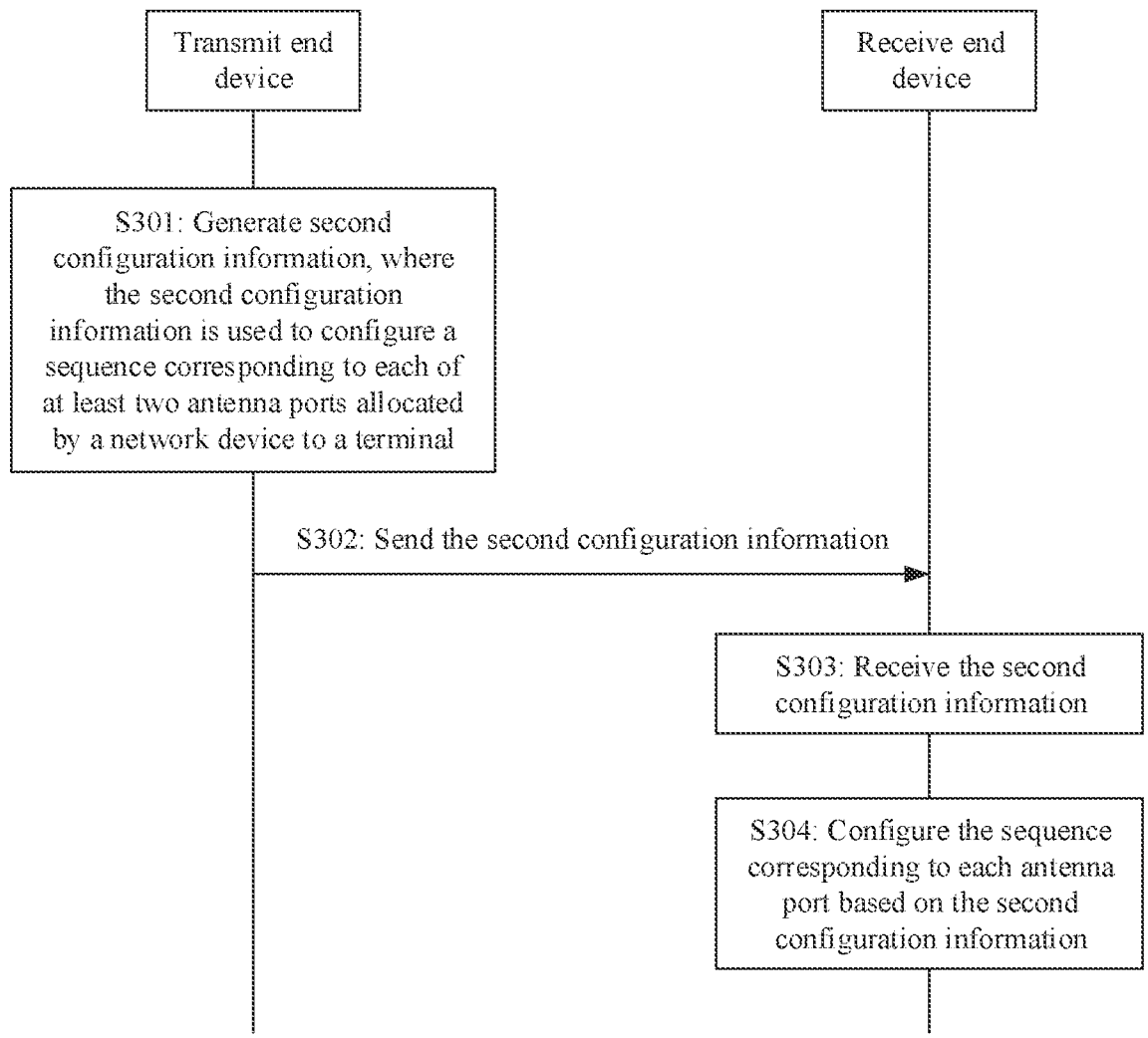
FIG. 9 is a schematic diagram of another sequence configuration method according to an embodiment of this application.

It should be noted that for a specific implementation of configuring the M sequences, refer to the following embodiment shown in FIG. 8 or FIG. 9. Certainly, this embodiment of this application is not limited thereto.

S102: A receive end device generates the at least two reference signals. For a specific implementation of S102, refer to the foregoing description of the specific implementation of S101. Details are not described herein again.

S103. The transmit end device sends the at least two reference signals to the receive end device.

A sequence of performing S102 and S103 is not limited in this embodiment of this application. For example, S102 may be performed before S103, or S103 may be performed before S102, or S102 and S103 are performed at the same time.

S104: The receive end device receives the at least two reference signals.

It may be understood that the at least two reference signals received by the receive end device are reference signals obtained after the at least two reference signals generated in S101 are transmitted on a channel. Subsequently, the receive end device may perform channel estimation and the like based on the generated at least two reference signals and the received at least two reference signals transmitted on the channel.

In the reference signal configuration method provided in this embodiment, different reference signals corresponding to the antenna ports allocated by the network device to the terminal may have different sequences. The different reference signals are reference signals of a same type. Optionally, sequences of the different reference signals are generated at the same time. This helps implement that the reference signals that are generated by the network device and the terminal and that are mapped to a same resource unit are different. In other words, this helps implement that different reference signals mapped to a time domain symbol are different. This increases randomness of sequence values or sequence mapping. Therefore, this helps avoid a problem of sequence repetition in frequency domain. Therefore, a PAPR can be reduced, thereby improving transmission performance of a system.

In some other embodiments of this application, the sequence of the reference signal is a sequence including modulation symbols that are selected from one or more locations in a mother sequence, and a quantity of selected modulation symbols is equal to a quantity of modulation symbols included in the reference signal. In other words, the sequence of the reference signal is a sequence including elements in the reference signal. Based on this, S101 may include: generating, by the transmit end device, a mother sequence, and then generating the at least two reference signals based on the mother sequence.

Optionally, the mother sequence may be generated based on a reference signal level, or may be generated based on a time domain unit (for example, a time domain symbol). It should be noted that, different from the sequence generation manner described above, if the mother sequence is generated based on a reference signal level, a length of the mother sequence is greater than a length of a reference signal. If the mother sequence is generated based on a time domain unit, a length of a sequence of a reference signal is greater than a quantity of modulation symbols of the reference signal in a time domain unit. This is to ensure that different reference signals can be generated based on the mother sequence.

In this embodiment, that the sequence of the first reference signal is different from the sequence of the second reference signal may include: A set including locations of modulation symbols included in the first reference signal in the mother sequence is different from a set including locations of modulation symbols included in the second reference signal in the mother sequence.

Figure 7:
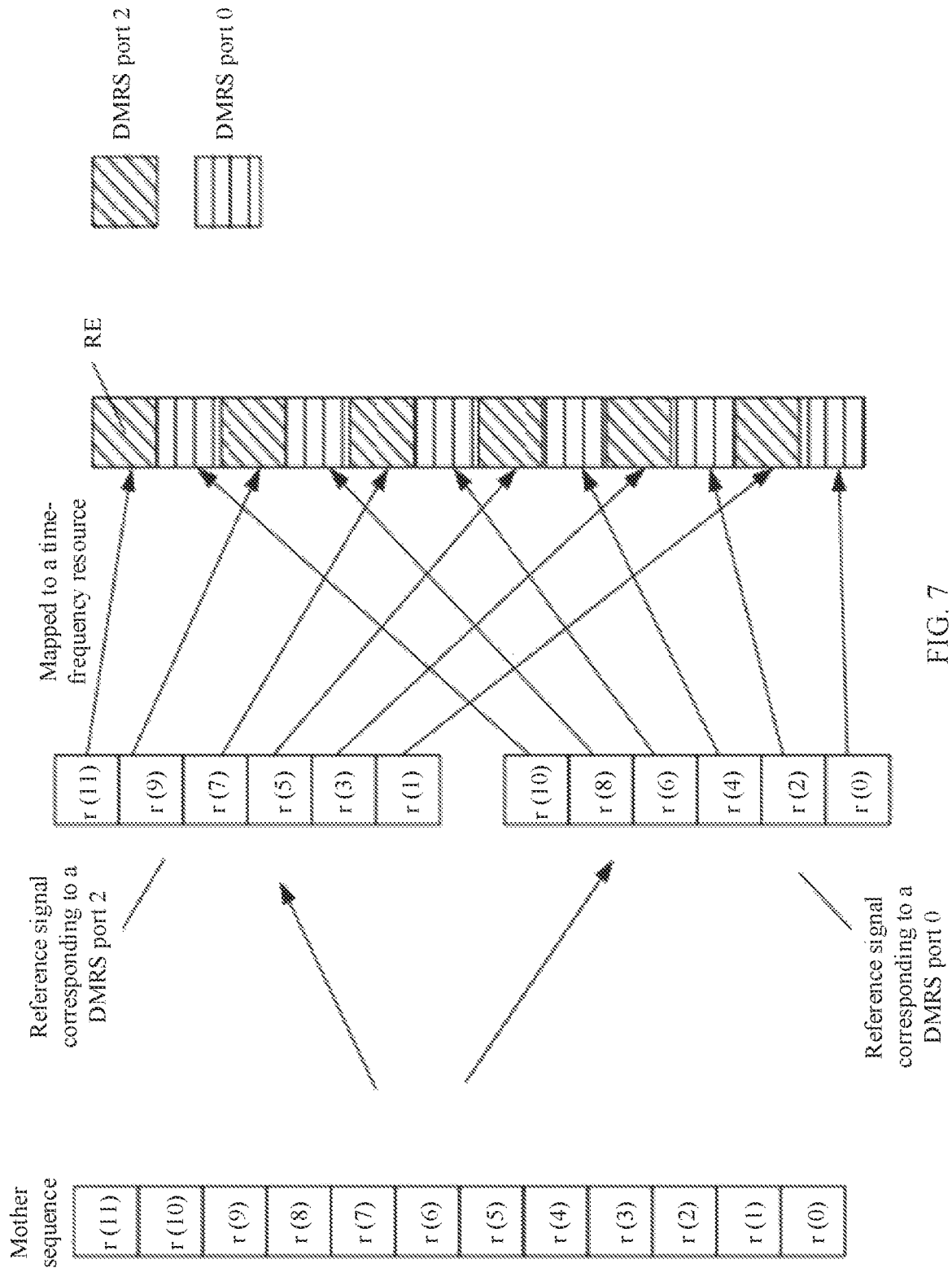
FIG. 7 is a schematic diagram of another process of configuring a reference signal according to an embodiment of this application.

FIG. 7 is a schematic diagram of a process of configuring a reference signal according to an embodiment of this application. A time-frequency resource in FIG. 7 represents a time-frequency resource corresponding to one time domain symbol in one RB. Referring to FIG. 7, it can be learned that the transmit end device may first generate the mother sequence, where elements in the mother sequence are sequentially modulation symbols r(0) to r(11), then use a sequence including elements r(0), r(2), r(4), r(6), r(8), and r(10) in the mother sequence as the first reference signal (that is, a reference signal corresponding to a DMRS port 0 in FIG. 7), and use r(1), r(3), r(5), r(7), r(9) and r(11) as the second reference signal (that is, a reference signal corresponding to a DMRS port 2 in FIG. 7), and then, sequentially map the modulation symbols in the first reference signal to a time-frequency resource corresponding to the first reference signal, and sequentially map the modulation symbols in the second reference signal to a time-frequency resource corresponding to the second reference signal.

The following describes a specific implementation of a sequence of a reference signal.

Manner 1: For either of the first reference signal and the second reference signal, a sequence of the reference signal is obtained according to a formula $c_{init\_m}=f(n_{CDM\_m})$. $f(n_{CDM\_m})$ represents a function related to $n_{CDM\_m}$, and $n_{CDM\_m}$ represents an index of a code division multiplexing group to which an antenna port corresponding to the reference signal belongs, or an offset value corresponding to the code division multiplexing group, or a scrambling factor corresponding to the code division multiplexing group. $c_{init\_m}$ represents an initialization factor of a sequence corresponding to the code division multiplexing group. For a specific example of $c_{init\_m}=f(n_{CDM\_m})$, refer to the following. Details are not described herein again.

Manner 2: For either of the first reference signal and the second reference signal, a sequence of the reference signal is obtained according to a formula $\hat{r}_m(n)=f(n_{CDM\_m})gr(n)$, $\hat{r}_m(n)$ represents an $n^{th}$ element in the sequence of the reference signal, $r(n)$ represents an $n^{th}$ element in a reference sequence, $n \geq 0$, n is an integer, $f(n_{CDM\_m})$ represents a function related to $n_{CDM\_m}$, and $n_{CDM\_m}$ represents an index of a code division multiplexing group to which an antenna port corresponding to the reference signal belongs, an offset value corresponding to the code division multiplexing group, or a scrambling factor corresponding to the code division multiplexing group.

$f(n_{CDM\_m})$ may be implemented in one of the following manners 2A to 2C.

Manner 2A: $f(n_{CDM\_m})=-1^{n_{CDM\_m}}$, $f(n_{CDM\_m})=-1^{f(n_{CDM\_m},n_{PRB})}$, $f(n_{CDM\_m})=-1^{f(n_{CDM\_m},n_{subcarrier})}$ or the like. $n_{PRB}$ is PRB index information, and $n_{subcarrier}$ is subcarrier index information. Certainly, this embodiment of this application is not limited thereto. In this case, sequences corresponding to a plurality of reference signals may also be considered as a transformation of a same reference signal sequence, for example, a transformation of mapping (that is, a transformation of "mapping" in a step of mapping to a time-frequency resource), or a transformation of a multiplexing manner (that is, a transformation of a manner of multiplexing a time-frequency resource).

Manner 2B:

$$f(n_{CDM\_m}) = -1^{\left\lfloor \frac{k \cdot n_{CDM\_m}}{4^{(n_{CDM\_m}+1)mod2}} \right\rfloor}, f(n_{CDM\_m}) = -1^{\left\lfloor \frac{k \cdot n_{CDM\_m}}{4^{n_{CDM\_m}-1}} \right\rfloor},$$

$$f(n_{CDM\_m}) = -1^{\left\lceil \frac{k \cdot n_{CDM\_m}}{4^{(n_{CDM\_m}+1)mod2}} \right\rceil}, \text{ or } f(n_{CDM\_m}) = -1^{\left\lceil \frac{k \cdot n_{CDM\_m}}{4^{n_{CDM\_m}-1}} \right\rceil},$$

where k represents an index of a frequency domain unit to which $\hat{r}_m(n)$ is mapped. A round-down operation symbol "⌊ ⌋" or a round-up operation symbol "⌈ ⌉" may be replaced with another operation symbol. This is not limited in this embodiment of this application.

The following describes the concept of frequency domain unit described in the embodiments of this application by using an example of R15 2-ports DMRS type 1 or R15 2-ports DMRS type 2.

R15 2-ports DMRS type 1 is used as an example. A frequency domain unit (or referred to as a frequency domain resource granularity) to which a reference signal is mapped is 4. In other words, one frequency domain unit includes four subcarriers. Therefore, an index of a frequency domain unit in the first RB configured for the terminal may be 0, 1, or 2. An index of a frequency domain unit in the second RB may be 3, 4, 5, . . . . For example, for the first RB, subcarriers 0 to 3 form a frequency domain unit 0, subcarriers 4 to 7 form a frequency domain unit 1, and subcarriers 8 to 11 form a frequency domain unit 2.

Figure 18:
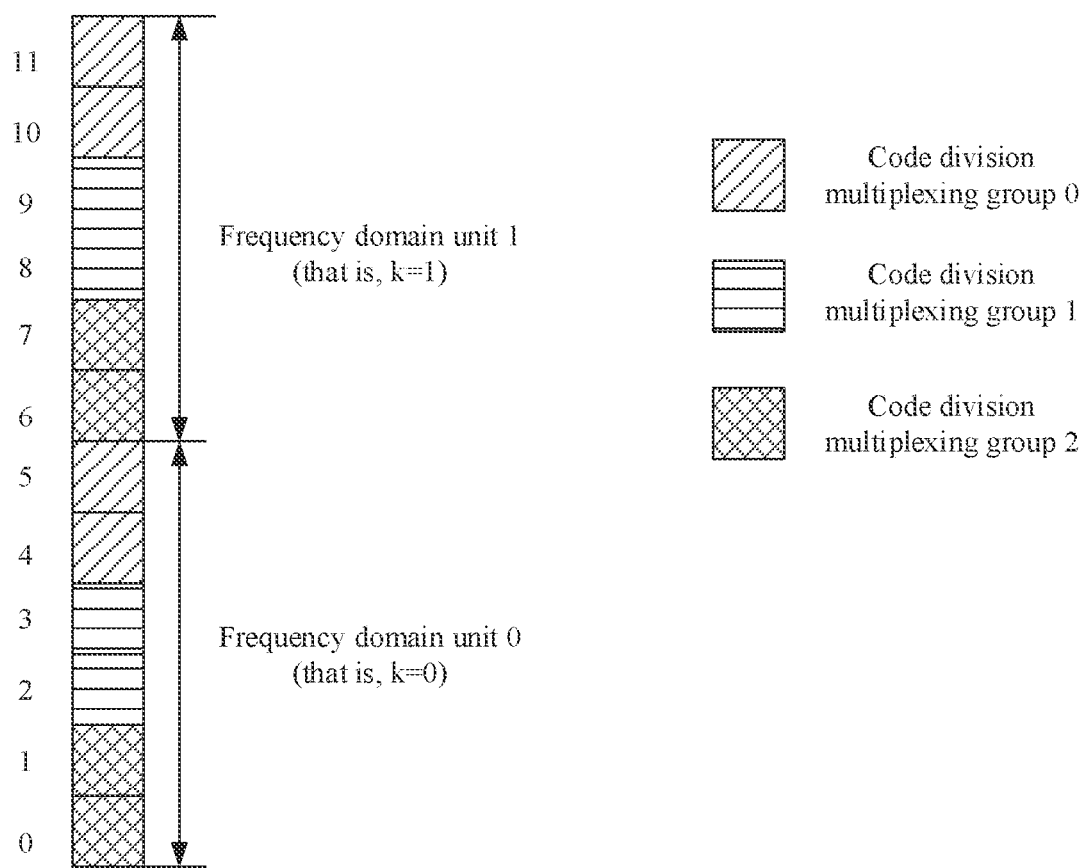
FIG. 18 is a schematic diagram of a frequency domain unit applicable to an embodiment of this application.

R15 2-ports DMRS type 2 is used as an example. A frequency domain unit to which a reference signal is mapped is 6. In other words, one frequency domain unit includes six subcarriers. Therefore, an index of a frequency domain unit in the first RB configured for the terminal may be 0 or 1. An index of a frequency domain unit in the second RB may be 2 or 3. For example, for the first RB, subcarriers 0 to 5 form a frequency domain unit 0, and subcarriers 6 to 11 form a frequency domain unit 1. FIG. 18 is a schematic diagram of a frequency domain unit applicable to an embodiment of this application.

In FIG. 18, one small box represents one RE, numbers 0 to 11 represent numbers of subcarriers, and one time domain symbol corresponds to three code division multiplexing groups (which are respectively marked as a code division multiplexing group 0, a code division multiplexing group 1, and a code division multiplexing group 2). Based on this, numbers of subcarriers corresponding to k=0 and k=1 are shown in FIG. 18.

With reference to FIG. 18, the following describes, by describing a location of a frequency domain resource of a reference signal corresponding to a code division multiplexing group, the concept of k or frequency domain unit described in this embodiment of this application. Specifically, based on FIG. 18, it can be learned that:

a frequency domain resource to which a reference signal corresponding to the code division multiplexing group 2 is mapped is a $6k^{th}$ subcarrier and a $(6k+1)^{th}$ subcarrier;

a frequency domain resource to which a reference signal corresponding to the code division multiplexing group 1 is mapped is a $(6k+2)^{th}$ subcarrier and a $(6k+3)^{th}$ subcarrier; and a frequency domain resource to which a reference signal corresponding to the code division multiplexing group 0 is mapped is a $(6k+4)^{th}$ subcarrier and a $(6k+5)^{th}$ subcarrier.

k is an integer greater than or equal to 0.

By analogy, the concept of frequency domain unit provided in this embodiment of this application may be clearly learned of.

Optionally, based on the manner 2B, $n_{CDM\_m}$ may be specifically an index of a code division multiplexing group to which an antenna port corresponding to the first reference signal or the second reference signal belongs.

Manner 2C: $f(n_{CDM\_m})$ may be determined based on a quantity M of code division multiplexing groups. M is a quantity of code division multiplexing groups occupied by the antenna ports allocated by the network device to the terminal. M is an integer greater than or equal to 2.

For example, when M=2, $\hat{r}_m(n) = -1^{CDM\_m} gr(n)$.

For another example, when M=3, $$\hat{r}_m(n) = e^{j\frac{2}{3}\pi CDM\_m} gr(n) \text{ or } \hat{r}_m(n) = e^{-j\frac{2}{3}\pi CDM\_m} gr(n).$$

j is an imaginary unit.

Certainly, this embodiment of this application is not limited thereto.

The foregoing uses M≥2 as an example for description. In an actual implementation process, when M=1, $\hat{r}_m(n)=r(n)$ or when M=1, for a specific implementation of $\hat{r}_m(n)$, refer to the prior art.

Optionally, based on the manner 2C, $n_{CDM\_m}$ may be specifically an index of a code division multiplexing group to which an antenna port corresponding to the first reference signal or the second reference signal belongs.

The manner 2C may be understood as: Sequences corresponding to different code division multiplexing groups generate different phase rotations based on a same reference sequence, so that different code division multiplexing groups correspond to different sequences.

Based on any one of the manner 2A to the manner 2C, any two code division multiplexing groups in the M code division multiplexing groups may correspond to a same cover code (orthogonal cover code, OCC). In this case, the reference sequence may be a sequence generated by a sequence generator, or may be a sequence obtained by multiplying a sequence generated by a sequence generator by the OCC.

Manner 3: An antenna port corresponding to the first reference signal and an antenna port corresponding to the second reference signal belong to different code division multiplexing groups, and the different code division multiplexing groups correspond to different OCCs.

In a specific implementation process, the receive end device and/or the transmit end device may first generate a reference sequence, and then, for each code division multiplexing group supported by a system, multiply the reference sequence by an OCC corresponding to the code division multiplexing group, to obtain a sequence corresponding to the code division multiplexing group. At least two of the M code division multiplexing groups correspond to different OCCs.

When M=2, it is assumed that the M code division multiplexing groups include a first code division multiplexing group and a second code division multiplexing group.

In this case, in an implementation, an OCC corresponding to each frequency domain unit in the first code division multiplexing group is a, and an OCC corresponding to each frequency domain unit in the second code division multiplexing group is −a (a matrix obtained by multiplying a by −1). An example may be shown in Table 1.

It should be noted that the following tables (Table 1 to Table 4D) are all described by using an example of 2-ports DMRS type 2, and in which $$a = \begin{bmatrix} +1 & -1 \\ +1 & +1 \end{bmatrix},$$

and in a, each row represents one RE, and each column represents one antenna port, and the following tables are all described by using the first RB (that is, k=0, 1) and the second RB (that is, k=2, 3) in RBs allocated to the terminal as an example. This is uniformly described herein. Details are not described in the following again. In addition, unless otherwise specified, "a" in each embodiment based on the manner 3 represents a matrix a. The matrix a may be a one-dimensional vector, or may be a multi-dimensional matrix. This is uniformly described herein. Details are not described in the following again.

TABLE 1

| k | k = 0 | k = 1 | k = 2 | k = 3 |
|---|---|---|---|---|
| OCC corresponding to the first code division multiplexing group | $\begin{bmatrix}+1 & -1\\+1 & +1\end{bmatrix}$ | $\begin{bmatrix}+1 & -1\\+1 & +1\end{bmatrix}$ | $\begin{bmatrix}+1 & -1\\+1 & +1\end{bmatrix}$ | $\begin{bmatrix}+1 & -1\\+1 & +1\end{bmatrix}$ |
| OCC corresponding to the second code division multiplexing group | $-\begin{bmatrix}+1 & -1\\+1 & +1\end{bmatrix}$ | $-\begin{bmatrix}+1 & -1\\+1 & +1\end{bmatrix}$ | $-\begin{bmatrix}+1 & -1\\+1 & +1\end{bmatrix}$ | $-\begin{bmatrix}+1 & -1\\+1 & +1\end{bmatrix}$ |

In another implementation, an OCC corresponding to each frequency domain unit in the first code division multiplexing group is a, an OCC corresponding to one of two adjacent frequency domain units in the second code division multiplexing group is a, and an OCC corresponding to the other frequency domain unit is −a.

Specifically, 2-ports DMRS type 2 is used as an example. OCCs corresponding to frequency domain units 0 to 3 in the first code division multiplexing group are all a. OCCs corresponding to frequency domain units 0 to 3 in the second code division multiplexing group are respectively a, −a, a, and −a. An example may be shown in Table 2. Alternatively, OCCs corresponding to frequency domain units 0 to 3 in the second code division multiplexing group are respectively −a, a, −a, and a. An example may be shown in Table 2B.

TABLE 2A

| k | k = 0 | k = 1 | k = 2 | k = 3 |
|---|---|---|---|---|
| OCC corresponding to the first code division multiplexing group | $\begin{bmatrix}+1 & -1\\+1 & +1\end{bmatrix}$ | $\begin{bmatrix}+1 & -1\\+1 & +1\end{bmatrix}$ | $\begin{bmatrix}+1 & -1\\+1 & +1\end{bmatrix}$ | $\begin{bmatrix}+1 & -1\\+1 & +1\end{bmatrix}$ |
| OCC corresponding to the second code division multiplexing group | $-\begin{bmatrix}+1 & -1\\+1 & +1\end{bmatrix}$ | $\begin{bmatrix}+1 & -1\\+1 & +1\end{bmatrix}$ | $-\begin{bmatrix}+1 & -1\\+1 & +1\end{bmatrix}$ | $\begin{bmatrix}+1 & -1\\+1 & +1\end{bmatrix}$ |

TABLE 2B

| k | k = 0 | k = 1 | k = 2 | k = 3 |
|---|---|---|---|---|
| OCC corresponding to the first code division multiplexing group | $\begin{bmatrix}+1 & -1\\+1 & +1\end{bmatrix}$ | $\begin{bmatrix}+1 & -1\\+1 & +1\end{bmatrix}$ | $\begin{bmatrix}+1 & -1\\+1 & +1\end{bmatrix}$ | $\begin{bmatrix}+1 & -1\\+1 & +1\end{bmatrix}$ |
| OCC corresponding to the second code division multiplexing group | $\begin{bmatrix}+1 & -1\\+1 & +1\end{bmatrix}$ | $-\begin{bmatrix}+1 & -1\\+1 & +1\end{bmatrix}$ | $\begin{bmatrix}+1 & -1\\+1 & +1\end{bmatrix}$ | $-\begin{bmatrix}+1 & -1\\+1 & +1\end{bmatrix}$ |

When M=3, assuming that the M code division multiplexing groups include a first code division multiplexing group, a second code division multiplexing group, and a third code division multiplexing group, at least two of the three code division multiplexing groups correspond to different OCCs.

In an implementation, an OCC corresponding to each frequency domain unit in the first code division multiplexing group is a, an OCC corresponding to each frequency domain unit in the second code division multiplexing group is a*exp(j*x), and an OCC corresponding to each frequency domain unit in the third code division multiplexing group is a*exp (j*y), where x+y=2π or x+y=−2π, and j is an imaginary unit. An example may be shown in Table 3. In Table 3, an example in which x=2π/3 and y=4π/3 is used for description.

TABLE 3

| k | k = 0 | k = 1 | k = 2 | k = 3 |
|---|---|---|---|---|
| OCC corresponding to the first code division multiplexing group | $\begin{bmatrix}+1-1\\+1+1\end{bmatrix}$ | $\begin{bmatrix}+1-1\\+1+1\end{bmatrix}$ | $\begin{bmatrix}+1-1\\+1+1\end{bmatrix}$ | $\begin{bmatrix}+1-1\\+1+1\end{bmatrix}$ |
| OCC corresponding to the second code division multiplexing group | $\exp\left(j*\frac{2\pi}{3}\right)\begin{bmatrix}+1-1\\+1+1\end{bmatrix}$ | $\exp\left(j*\frac{2\pi}{3}\right)\begin{bmatrix}+1-1\\+1+1\end{bmatrix}$ | $\exp\left(j*\frac{2\pi}{3}\right)\begin{bmatrix}+1-1\\+1+1\end{bmatrix}$ | $\exp\left(j*\frac{2\pi}{3}\right)\begin{bmatrix}+1-1\\+1+1\end{bmatrix}$ |
| OCC corresponding to the third code division multiplexing group | $\exp\left(j*\frac{4\pi}{3}\right)\begin{bmatrix}+1-1\\+1+1\end{bmatrix}$ | $\exp\left(j*\frac{4\pi}{3}\right)\begin{bmatrix}+1-1\\+1+1\end{bmatrix}$ | $\exp\left(j*\frac{4\pi}{3}\right)\begin{bmatrix}+1-1\\+1+1\end{bmatrix}$ | $\exp\left(j*\frac{4\pi}{3}\right)\begin{bmatrix}+1-1\\+1+1\end{bmatrix}$ |

In another implementation, an OCC corresponding to each frequency domain unit in the first code division multiplexing group is a, an OCC corresponding to one of two adjacent frequency domain units in the second code division multiplexing group is a, an OCC corresponding to the other frequency domain unit is a*exp(j*x), an OCC corresponding to one of two adjacent frequency domain units in the third code division multiplexing group is a, and an OCC corresponding to the other frequency domain unit is a*exp(j*y). x+y=2π, and j is an imaginary unit.

Specifically, 2-ports DMRS type 2 is used as an example.

OCCs corresponding to frequency domain units 0 to 3 in the first code division multiplexing group are all a. OCCs corresponding to frequency domain units 0 to 3 in the second code division multiplexing group are respectively a, a*exp(j*x), a, and a*exp(j*x). OCCs corresponding to frequency domain units 0 to 3 in the third code division multiplexing group are respectively a, a*exp(j*y), a, and a*exp(j*y). An example may be shown in Table 4A.

Alternatively, OCCs corresponding to frequency domain units 0 to 3 in the first code division multiplexing group are all a OCCs corresponding to frequency domain units 0 to 3 in the second code division multiplexing group are respectively a*exp(j*x), a, a*exp(j*x), and a. OCCs corresponding to frequency domain units 0 to in the third code division multiplexing group are respectively a*exp(j*y), a, a*exp(j*y), and a. An example may be shown in Table 4B.

Alternatively OCCs corresponding to frequency domain units 0 to 3 in the first code division multiplexing group are all a. OCCs corresponding to frequency domain units 0 to 3 in the second code division multiplexing group are respectively a, a*exp(j*x), a, and a*exp(j*x). OCCs corresponding to frequency domain units 0 to 3 in the third code division multiplexing group are respectively a*exp(j*y), a, a*exp(j*y), and a. An example may be shown in Table 4C.

Alternatively, OCCs corresponding to frequency domain units to 3 in the first code division multiplexing group are all a. OCCs corresponding to frequency domain units 0 to 3 in the second code division multiplexing group are respectively a*exp(j*x), a, a*exp(*x), and a. OCCs corresponding to frequency domain units 0 to 3 in the third code division multiplexing group are respectively a, a*exp(j*y), a, and a*exp(j*y). An example may be shown in Table 4D.

In Table 4A to Table 4D an example in which x=2π/3 and y=4π/3 is used for description.

TABLE 4A

| k | k = 0 | k = 1 | k = 2 | k = 3 |
|---|---|---|---|---|
| OCC corresponding to the first code division multiplexing group | $\begin{bmatrix} +1 & -1 \\ +1 & +1 \end{bmatrix}$ | $\begin{bmatrix} +1 & -1 \\ +1 & +1 \end{bmatrix}$ | $\begin{bmatrix} +1 & -1 \\ +1 & +1 \end{bmatrix}$ | $\begin{bmatrix} +1 & -1 \\ +1 & +1 \end{bmatrix}$ |
| OCC corresponding to the second code division multiplexing group | $\begin{bmatrix} +1 & -1 \\ +1 & +1 \end{bmatrix}$ | $\exp\left(j*\frac{2\pi}{3}\right)\begin{bmatrix} +1 & -1 \\ +1 & +1 \end{bmatrix}$ | $\begin{bmatrix} +1 & -1 \\ +1 & +1 \end{bmatrix}$ | $\exp\left(j*\frac{2\pi}{3}\right)\begin{bmatrix} +1 & -1 \\ +1 & +1 \end{bmatrix}$ |
| OCC corresponding to the third code division multiplexing group | $\begin{bmatrix} +1 & -1 \\ +1 & +1 \end{bmatrix}$ | $\exp\left(j*\frac{4\pi}{3}\right)\begin{bmatrix} +1 & -1 \\ +1 & +1 \end{bmatrix}$ | $\begin{bmatrix} +1 & -1 \\ +1 & +1 \end{bmatrix}$ | $\exp\left(j*\frac{4\pi}{3}\right)\begin{bmatrix} +1 & -1 \\ +1 & +1 \end{bmatrix}$ | tively a*exp(j*x), a, a*exp(j*x), and a. OCCs corresponding

TABLE 4B

| k | k = 0 | k = 1 | k = 2 | k = 3 |
|---|---|---|---|---|
| OCC corresponding to the first code division multiplexing group | $\begin{bmatrix} +1 & -1 \\ +1 & +1 \end{bmatrix}$ | $\begin{bmatrix} +1 & -1 \\ +1 & +1 \end{bmatrix}$ | $\begin{bmatrix} +1 & -1 \\ +1 & +1 \end{bmatrix}$ | $\begin{bmatrix} +1 & -1 \\ +1 & +1 \end{bmatrix}$ |
| OCC corresponding to the second code division multiplexing group | $\exp\left(j*\frac{2\pi}{3}\right)\begin{bmatrix} +1 & -1 \\ +1 & +1 \end{bmatrix}$ | $\begin{bmatrix} +1 & -1 \\ +1 & +1 \end{bmatrix}$ | $\exp\left(j*\frac{2\pi}{3}\right)\begin{bmatrix} +1 & -1 \\ +1 & +1 \end{bmatrix}$ | $\begin{bmatrix} +1 & -1 \\ +1 & +1 \end{bmatrix}$ |
| OCC corresponding to the third | $\exp\left(j*\frac{4\pi}{3}\right)\begin{bmatrix} +1 & -1 \\ +1 & +1 \end{bmatrix}$ | $\begin{bmatrix} +1 & -1 \\ +1 & +1 \end{bmatrix}$ | $\exp\left(j*\frac{4\pi}{3}\right)\begin{bmatrix} +1 & -1 \\ +1 & +1 \end{bmatrix}$ | $\begin{bmatrix} +1 & -1 \\ +1 & +1 \end{bmatrix}$ |

TABLE 4B-continued

| k | k = 0 | k = 1 | k = 2 | k = 3 |
|---|---|---|---|---|
| code division multiplexing group | | | | |

TABLE 4C

| k | k = 0 | k = 1 | k = 2 | k = 3 |
|---|---|---|---|---|
| OCC corresponding to the first code division multiplexing group | $\begin{bmatrix} +1 & -1 \\ +1 & +1 \end{bmatrix}$ | $\begin{bmatrix} +1 & -1 \\ +1 & +1 \end{bmatrix}$ | $\begin{bmatrix} +1 & -1 \\ +1 & +1 \end{bmatrix}$ | $\begin{bmatrix} +1 & -1 \\ +1 & +1 \end{bmatrix}$ |
| OCC corresponding to the second code division multiplexing group | $\begin{bmatrix} +1 & -1 \\ +1 & +1 \end{bmatrix}$ | $\exp\left(j*\frac{2\pi}{3}\right)\begin{bmatrix} +1 & -1 \\ +1 & +1 \end{bmatrix}$ | $\begin{bmatrix} +1 & -1 \\ +1 & +1 \end{bmatrix}$ | $\exp\left(j*\frac{2\pi}{3}\right)\begin{bmatrix} +1 & -1 \\ +1 & +1 \end{bmatrix}$ |
| OCC corresponding to the third code division multiplexing group | $\exp\left(j*\frac{4\pi}{3}\right)\begin{bmatrix} +1 & -1 \\ +1 & +1 \end{bmatrix}$ | $\begin{bmatrix} +1 & -1 \\ +1 & +1 \end{bmatrix}$ | $\exp\left(j*\frac{4\pi}{3}\right)\begin{bmatrix} +1 & -1 \\ +1 & +1 \end{bmatrix}$ | $\begin{bmatrix} +1 & -1 \\ +1 & +1 \end{bmatrix}$ |

TABLE 4D

| k | k = 0 | k = 1 | k = 2 | k = 3 |
|---|---|---|---|---|
| OCC corresponding to the first code division multiplexing group | $\begin{bmatrix} +1 & -1 \\ +1 & +1 \end{bmatrix}$ | $\begin{bmatrix} +1 & -1 \\ +1 & +1 \end{bmatrix}$ | $\begin{bmatrix} +1 & -1 \\ +1 & +1 \end{bmatrix}$ | $\begin{bmatrix} +1 & -1 \\ +1 & +1 \end{bmatrix}$ |
| OCC corresponding to the second code division multiplexing group | $\exp\left(j*\frac{2\pi}{3}\right)\begin{bmatrix} +1 & -1 \\ +1 & +1 \end{bmatrix}$ | $\begin{bmatrix} +1 & -1 \\ +1 & +1 \end{bmatrix}$ | $\exp\left(j*\frac{2\pi}{3}\right)\begin{bmatrix} +1 & -1 \\ +1 & +1 \end{bmatrix}$ | $\begin{bmatrix} +1 & -1 \\ +1 & +1 \end{bmatrix}$ |
| OCC corresponding to the third code division multiplexing group | $\begin{bmatrix} +1 & -1 \\ +1 & +1 \end{bmatrix}$ | $\exp\left(j*\frac{4\pi}{3}\right)\begin{bmatrix} +1 & -1 \\ +1 & +1 \end{bmatrix}$ | $\begin{bmatrix} +1 & -1 \\ +1 & +1 \end{bmatrix}$ | $\exp\left(j*\frac{4\pi}{3}\right)\begin{bmatrix} +1 & -1 \\ +1 & +1 \end{bmatrix}$ |

It should be noted that, during specific implementation, at least two code division multiplexing groups in the M code division multiplexing groups correspond to different OCCs. There may be another implementation. For example, "two adjacent frequency domain units" in any one of the foregoing embodiments may be replaced with "two adjacent groups of frequency domain units, where each group of frequency domain units includes at least two frequency domain units". In addition, the foregoing uses M≥2 as an example for description. In an actual implementation process, when M=1, for an implementation of an OCC corresponding to one code division multiplexing group refer to the prior art.

In addition, it should be noted that the foregoing specific examples are all described by using an example of R15 2-ports DMRS type 2 and OCCs corresponding to frequency domain units in the first RB and the second RB that are configured for the terminal. In an actual implementation process, based on this, a person skilled in the art may reasonably infer, without creative efforts, an OCC corresponding to a reference signal of another type, and corresponding to a case in which an index of an RB configured for the terminal is another index, and details are not described herein again.

The following describes a sequence configuration method provided in an embodiment of this application. A sequence herein is a sequence used to obtain a reference signal, for example, the M sequences in the foregoing description. Optionally, the transmit end device in this embodiment is specifically a network device, and the receive end device is specifically a terminal.

FIG. 8 is a schematic diagram of a sequence configuration method according to an embodiment of this application. The method includes the following steps.

S201: A transmit end device generates first configuration information, where the first configuration information is used to configure a sequence corresponding to each of M code division multiplexing groups that are occupied by at least two antenna ports and that are allocated by a network device to a terminal, and M is an integer greater than or equal to 2.

One code division multiplexing group includes a plurality of antenna ports, and reference signals corresponding to the plurality of antenna ports code-division multiplex (code division multiplexing, CDM) a time-frequency resource.

It should be noted that, if a sequence corresponding to a code division multiplexing group is generated based on a reference signal level, the code division multiplexing group herein may be specifically a time-domain code division multiplexing group, a frequency-domain code division multiplexing group, or a time-frequency code division multiplexing group. If a sequence corresponding to a code division multiplexing group is generated based on a time domain symbol level, the code division multiplexing group herein may be specifically a frequency-domain code division multiplexing group.

A sequence corresponding to a code division multiplexing group is a sequence "used to obtain a reference signal corresponding to each antenna port in the code division multiplexing group", for example, the local sequence described above. Optionally, one code division multiplexing group corresponds to one sequence.

For example, assuming that a system supports eight antenna ports (which are respectively marked as antenna ports 0 to 7), antenna ports 0 and 1 belong to a code division multiplexing group 0, antenna ports 2 and 3 belong to a code division multiplexing group 1, antenna ports 4 and 5 belong to a code division multiplexing group 2, and antenna ports 6 and 7 belongs to a code division multiplexing group 3, code division multiplexing groups 0 to 3 may respectively correspond to sequences 0 to 3. Based on this, if the antenna ports allocated by the network device to the terminal are the antenna ports 0 to 3, the transmit end device may configure, for a receive end device, the sequence 0 corresponding to the code division multiplexing group 0 and the sequence 1 corresponding to the code division multiplexing group 1.

It may be understood that in a specific implementation process, the terminal may not need to first obtain the antenna ports allocated by the network device to the terminal, and then obtain the sequence corresponding to each of the M code division multiplexing groups that are occupied by the at least two antenna ports allocated by the network device to the terminal. For example, the terminal may first obtain a sequence corresponding to each code division multiplexing group supported by a system, and then after determining the antenna ports allocated by the network device to the terminal, directly send/receive a reference signal by using a sequence corresponding to each code division multiplexing group occupied by the antenna ports.

S202: The transmit end device sends the first configuration information.

Information configured by using the first configuration information is referred to as to-be-configured information. In a specific implementation process, the to-be-configured information is configured in many manners, for example, but not limited to, directly configuring the to-be-configured information, such as the to-be-configured information or an index of the to-be-configured information, or indirectly configuring the to-be-configured information by configuring other information, where there is an association relationship between the other information and the to-be-configured information. Alternatively, only a part of the to-be-configured information may be configured, and the other part of the to-be-configured information is known or agreed on in advance. For example, particular information may alternatively be configured by using a pre-agreed (for example, stipulated in a protocol) arrangement sequence of various pieces of information, to reduce configuration overheads to some extent. In addition, a common part of all the pieces of information may be further identified and configured in a unified manner, to reduce configuration overheads caused by separately configuring same information.

In addition, a specific configuration manner may also be various existing configuration manners. In a specific implementation process, a required configuration manner may be selected according to a specific requirement. The selected configuration manner is not limited in this embodiment of this application. In this way, the configuration manner in this embodiment of this application should be understood as covering various methods that can enable a to-be-configured party to learn of the to-be-configured information.

In addition, the to-be-configured information may have another equivalent form. The technical solutions provided in this embodiment of this application should be understood as covering various forms. For example, some or all features in this embodiment of this application should be understood as covering various representations of the features.

The to-be-configured information may be sent as a whole, or may be divided into a plurality of pieces of sub-information for separate sending. In addition, sending periodicities and/or sending occasions of the sub-information may be the same or may be different. A specific sending method is not limited in this application. The sending periodicities and/or the sending occasions of the sub-information may be predefined, for example, predefined according to a protocol, or may be configured by the transmit end device by sending configuration information to the receive end device.

It should be noted that a specific implementation of the second configuration information, the indication information, or the like described below may be obtained through inference based on the description of the first configuration information herein. Therefore, details are not described below again.

Optionally, the first configuration information may be implemented, for example, but not limited to, by using one or a combination of at least two of RRC signaling, MAC signaling, and DCI. For example, the first configuration information may be carried by adding an independent indication field to the RRC signaling/MAC signaling/DCI, or the first configuration information may be carried by extending a size (size) of a sequence indication field. The sequence indication field may include but is not limited to at least one of a sequence initialization field, a sequence generation field, and a scrambling ID field. The size of the sequence indication field is a quantity of bits occupied by the sequence indication field.

Optionally, the first configuration information is specifically used to configure a generation parameter of the sequence corresponding to each of the M code division multiplexing groups. The generation parameter of the sequence corresponding to each code division multiplexing group includes an index of the code division multiplexing group, an offset value corresponding to the code division multiplexing group, or a scrambling factor corresponding to the code division multiplexing group.

When the generation parameter includes the index of the code division multiplexing group:

Optionally, the first configuration information may include indexes of the M code division multiplexing groups. For example, it is assumed that the antenna ports allocated by the network device to the terminal occupy four code division multiplexing groups, and indexes of the four code division multiplexing groups may be respectively code division multiplexing groups 0 to 3. The first configuration information may include indexes 0 to 3 of the code division multiplexing groups.

Alternatively, the index of the code division multiplexing group herein may be predefined or obtained based on an implicit relationship with other configuration information such as port configuration information. In this case, the first configuration information does not need to indicate the predefined information.

When the generation parameter includes the offset value corresponding to the code division multiplexing group:

Optionally, the first configuration information may include offset values corresponding to the M code division multiplexing groups. For example, if the antenna ports allocated by the network device to the terminal occupy four code division multiplexing groups, and offset values corresponding to the four code division multiplexing groups are respectively 100, 200, 300, and 400, the first configuration information may include the offset values 100, 200, 300, and 400.

Optionally, the first configuration information may include an offset unit and an offset value corresponding to one of the M code division multiplexing groups. The offset value herein may be a greatest offset value or a smallest offset value in offset values corresponding to the M code division multiplexing groups. Specifically, whether the offset value is the greatest offset value or the smallest offset value may be predefined, for example, predefined by using a protocol, or may be indicated by sending, by the transmit end device, signaling to the receive end device. This is not limited in this embodiment of this application. For example, assuming that the antenna ports allocated by the network device to the terminal occupy four code division multiplexing groups, and offset values corresponding to the four code division multiplexing groups are respectively 100, 200, 300, and 400, the first configuration information may include an offset unit 100 and the offset value 100 (that is, the smallest offset value), or the first configuration information may include an offset unit 100 and the offset value 400 (that is, the greatest offset value). Alternatively, the offset unit or the offset value herein may be predefined. In this case, the first configuration information does not need to indicate the predefined information.

It should be noted that when the first configuration information indicates an offset unit, the receive end device may determine, based on the offset unit and a predefined correspondence between the offset unit and each offset value, offset values corresponding to code division multiplexing groups occupied by the antenna ports allocated by the network device to the terminal. For example, the correspondence may be $\Delta_m = \Delta_1 + (m-1)*a$, where $\Delta_m$ represents an offset value corresponding to an $m^{th}$ code division multiplexing group in the M code division multiplexing groups, $\Delta_1$ represents an offset value corresponding to the first code division multiplexing group in the M code division multiplexing groups, $\Delta_1$ is the smallest offset value, and a represents an offset unit. Other examples are not enumerated one by one.

When the generation parameter includes scrambling information (for example, the scrambling factor) corresponding to the code division multiplexing group:

Optionally, the first configuration information may include scrambling factors corresponding to the M code division multiplexing groups. For example, assuming that the antenna ports allocated by the network device to the terminal occupy four code division multiplexing groups, and scrambling factors corresponding to the four code division multiplexing groups are respectively 0 to 3, the first configuration information may include the scrambling factors 0 to 3.

Alternatively, the scrambling information corresponding to the code division multiplexing group herein may be predefined. In this case, the first configuration information does not need to indicate the predefined information.

S203: The receive end device receives the first configuration information.

Alternatively, the receive end device learns of the first configuration information in a manner of predefinition by using a protocol.

S204: The receive end device configures, based on the first configuration information, a sequence corresponding to each code division multiplexing group.

S204 may be implemented, for example, but not limited to, in one of the following manners.

Manner 1: The receive end device determines, based on the first configuration information, an initialization parameter of the sequence corresponding to each of the M code division multiplexing groups. Then, for each sequence, the sequence is obtained based on an initialization parameter of the sequence. Optionally, an initialization parameter of one sequence corresponds to one code division multiplexing group. The initialization parameter of the sequence is an initialization parameter used in a process of generating the sequence. For example, the initialization parameter may be an initialization factor or the like.

For example, the receive end device determines, according to a formula $c_{init\_m} = f(n_{CDM\_m})$, an initialization factor of a sequence corresponding to an $m^{th}$ code division multiplexing group in the M code division multiplexing groups. $c_{init\_m}$ represents the initialization factor of the sequence corresponding to the $m^{th}$ code division multiplexing group, and $n_{CDM\_m}$ represents information related to the $m^{th}$ code division multiplexing group. For example, the related information may be an identity (identity, ID) of the m code division multiplexing group. An ID of a code division multiplexing group may be an index of the code division multiplexing group, an offset value corresponding to the code division multiplexing group, scrambling information (for example, a scrambling factor) corresponding to the code division multiplexing group, or the like. m=1, 2, 3 . . . M.

For example, the foregoing formula $c_{init\_m} = f(n_{CDM\_m})$ may be represented as $c_{init\_m} = (2^{17}(N_{symb}^{slot} n_{s,f}^{\mu} + 1)(2N_{ID}^{n_{SCID}} + 1) + 2N_{ID}^{n_{SCID}} + n_{SCID} + n_{CDM\_m}) \mod 2^{31}$. Certainly, this embodiment of this application is not limited thereto. $N_{symb}$-

$^{slot}$ represents a quantity of symbols in a slot, $n_{s,f}^{\mu}$ is an index of the slot, l is a symbol index, $N_{ID}^{nSCID}$ is a sequence generation factor, and $n_{s,f}^{\mu}$ is a scrambling factor. The formula is determined based on an initialization factor generated in 5G NR R15. Therefore, for explanations of related content in the formula, refer to the 5G NR R15. Details are not described herein again.

Manner 2: The receive end device generates a reference sequence, and then converts (or referred to as processing or transforming) the reference sequence based on the first configuration information, to obtain the sequence corresponding to each code division multiplexing group.

Optionally, one conversion process corresponds to one code division multiplexing group. For example, an $n^{th}$ element $\hat{r}_m(n)$ in the sequence corresponding to the $m^{th}$ code division multiplexing group in the M code division multiplexing groups is obtained through conversion according to a formula $\hat{r}_m(n)=f(r(n),n_{CDM\_m})$, where r(n) represents an $n^{th}$ element in a reference sequence, and the reference sequence may be, for example, but is not limited to a sequence that is generated according to a solution provided in the prior art such as existing 5G NR R15 and that is used to obtain a reference signal. For meanings of $n_{CDM\_m}$ and m, refer to the foregoing description. It may be understood that n is an integer greater than or equal to 0. For example, the formula $\hat{r}_m(n)=f(r(n),n_{CDM\_m})$ may be specifically represented as: $\hat{r}_m(n)=f(n_{CDM\_m})gr(n)$. More specifically, $\hat{r}_m(n)=-1^{n_{CDM\_m}}gr(n)$, $\hat{r}_m(n)=-1^{f(n_{CDM\_m},n_{PRB})}gr(n)$, $\hat{r}_m(n)=-1^{f(n_{CDM\_m},n^{subcarrier})}gr(n)$, or the like. $n_{PRB}$ is PRB index information, and $n_{subcarrier}$ is subcarrier index information. Certainly, this embodiment of this application is not limited thereto. In this case, sequences corresponding to a plurality of reference signals may also be considered as a transformation of a same reference signal sequence, for example, a transformation of mapping (that is, a transformation of "mapping" in a step of mapping to a time-frequency resource), or a transformation of a multiplexing manner (that is, a transformation of a manner of multiplexing a time-frequency resource). It should be noted that only a process in which the receive end device generates the at least two reference signals is described herein. In a specific implementation process, the transmit end device may alternatively generate the at least two reference signals according to a similar method. Details are not described herein again.

The sequence configuration method provided in this embodiment is described by using an example in which a sequence corresponding to each code division multiplexing group is configured in a signaling manner. Alternatively, the sequence corresponding to each code division multiplexing group may also be predefined, for example, predefined by using a protocol. In addition, before an RRC connection is established between the terminal and the network device (for example, the terminal has not received any RRC configuration parameter), the sequence corresponding to each code division multiplexing group may be predefined. For example, the sequence corresponding to each code division multiplexing group is predefined by predefining the foregoing information carried in the first configuration information.

The sequence configuration method provided in this embodiment provides a basis for implementing the configuration method shown in FIG. 4. Therefore, for beneficial effects that can be achieved in this embodiment, refer to the beneficial effects described in the embodiment shown in FIG. 4. Certainly, the sequence configuration method provided in this embodiment may be further applied to another scenario.

FIG. 9 is a schematic diagram of a sequence configuration method according to an embodiment of this application. For explanations of related content in this embodiment, refer to the foregoing descriptions. The method includes the following steps.

S301: A transmit end device generates second configuration information, where the second configuration information is used to configure a sequence corresponding to each of at least two antenna ports allocated by a network device to a terminal.

A sequence corresponding to an antenna port is a sequence used to "obtain a reference signal corresponding to the antenna port". Optionally, one antenna port corresponds to one sequence.

For example, assuming that a system supports eight antenna ports (which are respectively marked as antenna ports 0 to 7), the antenna ports 0 to 7 may respectively correspond to sequences 0 to 7. Based on this, if the antenna ports allocated by the network device to the terminal are the antenna ports 0 to 3, the transmit end device may configure, for a receive end device, sequences 0 to 3 of reference signals corresponding to the antenna ports 0 to 3.

S302: The transmit end device sends the second configuration information.

Optionally, the second configuration information may be implemented, for example, but not limited to, by using one or a combination of at least two of RRC signaling, MAC signaling, and DCI. For example, the second configuration information may be carried by adding an independent indication field to the RRC signaling/MAC signaling/DCI, or the second configuration information may be carried by extending a size of a sequence indication field.

Optionally, the second configuration information is specifically used to configure a generation parameter of the sequence corresponding to each of the at least two antenna ports. The generation parameter of the sequence corresponding to each antenna port includes an index of the antenna port, an offset value corresponding to the antenna port, or a scrambling factor corresponding to the antenna port.

When the generation parameter includes the index of the antenna port, optionally, the second configuration information may include indexes of the antenna ports allocated by the network device to the terminal.

When the generation parameter includes the offset value corresponding to the antenna port, optionally, the second configuration information may include offset values corresponding to the antenna ports allocated by the network device to the terminal. Alternatively, the second configuration information may include an offset unit or an offset value corresponding to one of the at least two antenna ports. The offset value herein may be a greatest offset value or a smallest offset value in offset values corresponding to the at least two antenna ports. Specifically, whether the offset value is the greatest offset value or the smallest offset value may be predefined, for example, predefined by using a protocol, or may be indicated by sending, by the transmit end device, signaling to the receive end device. This is not limited in this embodiment of this application. Alternatively, the offset unit or the offset value herein may be predefined. In this case, the second configuration information does not need to indicate the predefined information.

It should be noted that when the second configuration information indicates an offset unit, the receive end device may determine, based on the offset unit and a predefined correspondence between the offset unit and each offset value, offset values corresponding to code division multiplexing groups occupied by the antenna ports allocated by the network device to the terminal. A specific example is obtained through inference with reference to the embodiment shown in FIG. 8. Details are not described herein again.

When the generation parameter includes scrambling information (for example, the scrambling factor) corresponding to the antenna port, optionally, the second configuration information may include scrambling factors corresponding to the antenna ports allocated by the network device to the terminal. Alternatively, the scrambling information corresponding to the antenna port herein may be predefined. In this case, the second configuration information does not need to indicate the predefined information.

A specific example of the second configuration information may be obtained through inference with reference to the specific example of the first configuration information. Details are not described herein again.

S303: The receive end device receives the second configuration information.

Alternatively, the receive end device learns of the second configuration information in a manner of predefinition by using a protocol.

S304: The receive end device configures, based on the second configuration information, a sequence corresponding to each antenna port.

S304 may be implemented, for example, but not limited to, in one of the following manners.

Manner 1: The receive end device determines, based on the second configuration information, an initialization parameter of the sequence corresponding to each of the at least two antenna ports. Then, for each sequence, the sequence is generated based on an initialization parameter of the sequence. Optionally, an initialization parameter of one sequence corresponds to one antenna port. The initialization parameter of the sequence may be an initialization factor or the like.

For example, the receive end device determines, according to a formula $c_{init\_m} = f(n_{p\_m})$, an initialization parameter of a sequence corresponding to an $m^{th}$ antenna port in the at least two antenna ports. $c_{init\_m}$ represents an initialization factor of the sequence corresponding to the $m^{th}$ antenna port, and $n_{p\_m}$ represents information related to the $m^{th}$ antenna port. For example, the related information may be an ID of the $m^{th}$ antenna port. The ID of the antenna port may be an index of the antenna port, an offset value corresponding to the antenna port, or the like. m=1, 2, 3, . . . , M, and M is a quantity of antenna ports allocated by the network device to the terminal.

For example, the foregoing formula $c_{init\_m} = f(n_{p\_m})$ may be represented as $c_{init\_m}(2^{17}(N_{symb}^{slot} n_{s,f}^{\mu}+l+1)(2N_{ID}^{nSCID}+1)+2N_{ID}^{nSCID}+n_{SCID}+n_{p\_m}) \mod 2^{31}$. Certainly, this embodiment of this application is not limited thereto. For explanations of parameters in the formula, refer to the foregoing description. Details are not described herein again.

Manner 2: The receive end device generates a reference sequence, and then converts (or referred to as processing or transforming) the reference sequence based on the second configuration information, to obtain the sequence corresponding to each antenna port.

Optionally, one conversion process corresponds to one antenna port. For example, an $n^{th}$ element $\hat{r}_m(n)$ in the sequence corresponding to the $m^{th}$ antenna port is obtained through conversion according to a formula $\hat{r}_m(n) = f(r(n), n_{p\_m})$. For meanings of $r(n)$, $n_{p\_m}$, and m, refer to the foregoing description.

For example, $\hat{r}_m(n) = f(r(n), n_{p\_m})$ may be specifically represented as $\hat{r}_m(n) = f(n_{p\_m})gr(n)$, for example, $\hat{r}_m(n) = -1^{n_{p\_m}} gr$ (n), $\hat{r}_m(n) = -1^{f(n_{p\_m}, n_{PRB})} gr(n)$, or $\hat{r}_m(n) = -1^{f(n_{p\_m}, n_{subcarrier})} gr(n)$. $n_{PRB}$ is PRB index information, and $n_{subcarrier}$ is subcarrier index information. Certainly, this embodiment of this application is not limited thereto. In this case, sequences corresponding to a plurality of reference signals may also be considered as a transformation of a same reference signal sequence, for example, a transformation of mapping or a transformation of a multiplexing manner.

The sequence configuration method provided in this embodiment is described by using an example in which a sequence corresponding to each antenna port is configured in a signaling indication manner. Alternatively, the sequence corresponding to each antenna port may also be predefined, for example, predefined by using a protocol. In addition, before an RRC connection is established between the terminal and the network device (for example, the terminal has not received any RRC configuration parameter), the sequence corresponding to each antenna port may be predefined. For example, the sequence corresponding to each antenna port is predefined by predefining the foregoing information carried in the second configuration information.

The sequence configuration method provided in this embodiment provides a basis for implementing the configuration method shown in FIG. 4. Therefore, for beneficial effects that can be achieved in this embodiment, refer to the beneficial effects described in the embodiment shown in FIG. 4. Certainly, the sequence configuration method provided in this embodiment may be further applied to another scenario.

In a specific implementation process, when the sequence configuration method is applied to a 5G NR system, a reference signal configured based on a sequence design manner described in existing 5G NR R15 may be referred to as a release 1, and a reference signal configured based on a sequence design manner provided in this embodiment of this application may be referred to as a release 2. In consideration of compatibility, in an implementation, a terminal that supports the release 2 may also support the release 1, and a terminal that supports the release 1 may not support the release 2.

The above is described by using an example in which the network device configures a reference signal for one terminal. In a specific implementation process, if the network device schedules (specifically, schedules in one scheduling periodicity) a plurality of terminals at the same time, some of the plurality of terminals support only the release 1, and some other terminals support the release 2, how the network device schedules the plurality of terminals becomes an urgent problem to be resolved.

Based on this, an embodiment of this application provides the following reference signal configuration method.

Figure 10:
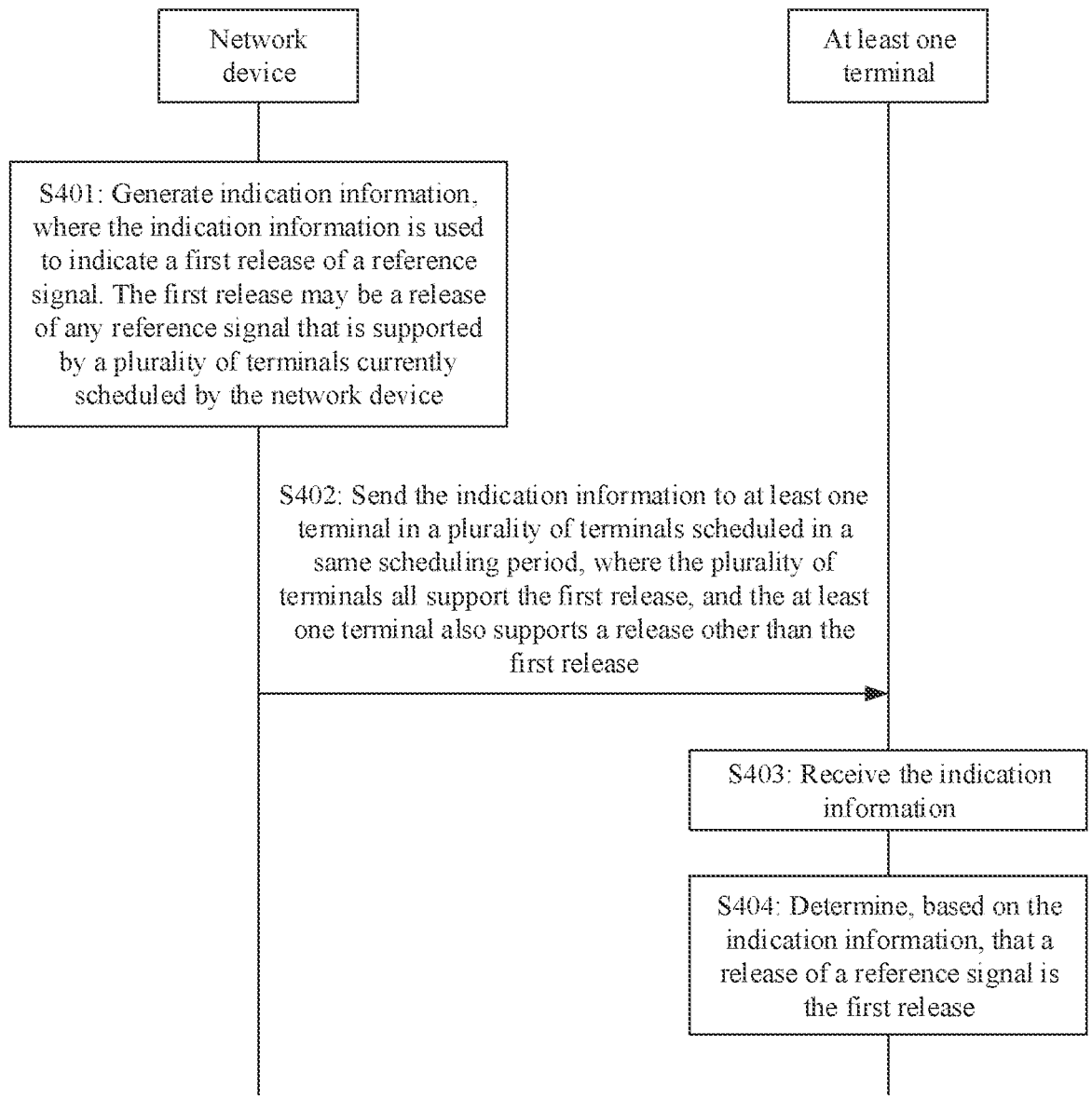
FIG. 10 is a schematic diagram of another reference signal configuration method according to an embodiment of this application.

FIG. 10 is a schematic diagram of a reference signal configuration method according to an embodiment of this application. The method includes the following steps.

S401: A network device generates indication information, where the indication information is used to indicate a first release of a reference signal.

Optionally, the first release may be a release of any reference signal supported by a plurality of terminals scheduled by the network device in a same scheduling periodicity. The reference signal may be, for example, but is not limited to, a DMRS or a CSI-RS.

In a specific implementation process, the network device may perform, in a unit of one or more scheduling periodicities, the method provided in this embodiment, for example, perform, in each scheduling periodicity or a plurality of consecutive scheduling periodicities, the method provided in this embodiment.

That the indication information is used to indicate the first release of the reference signal may be understood as: The indication information is used to indicate that a release of a reference signal (including an uplink reference signal or a downlink reference signal) transmitted in one or more scheduling periodicities is the first release. The one or more scheduling periodicities may include: a current scheduling periodicity, or a plurality of scheduling periodicities (for example, a plurality of consecutive scheduling periodicities) starting from the current scheduling periodicity, or a plurality of scheduling periodicities (for example, a plurality of consecutive scheduling periodicities) after the current scheduling periodicity.

In a possible implementation, before S401 is performed, the network device and some or all terminals scheduled by the network device have generated reference signals of at least two releases based on releases of reference signals that can be supported by the network device and some or all terminals scheduled by the network device. For example, the reference signals of at least two releases include reference signals of at least two releases that are generated based on a method (including, for example, but not limited to a method provided in 5G NR R15) provided in the prior art. For another example, the reference signals of at least two releases include a reference signal of at least one release that is generated based on a method (including, for example, but not limited to a method provided in 5G NR R15) provided in the prior art and a reference signal of one release that is generated based on the method provided above. In addition, the reference signals of the at least two releases may also include a reference signal generated based on a future release (for example, 5G NR R16 or 5G NR R17).

S402: The network device sends the indication information to at least one terminal in a plurality of terminals scheduled in a same scheduling periodicity, where the plurality of terminals all support the first release, and the at least one terminal also supports a release other than the first release.

It should be noted that the at least one terminal supports the first release and the release other than the first release. The first release and the other release herein are both releases of reference signals of a same type. Optionally, a sequence of a reference signal of the first release and a sequence of a reference signal of the other release are generated at the same time. For descriptions of "generating at the same time", refer to the foregoing description.

In a specific implementation process, the indication information may be carried in one or a combination of at least two of RRC signaling, MAC signaling, and DCI, and is sent by the network device to the terminal. For example, the indication information is carried by adding an independent indication field to the RRC signaling, the MAC signaling, or the DCI.

In an example, the first release described in this embodiment may be the foregoing release 2. The other release described in this embodiment may be the foregoing release 1. The at least one terminal in S402 may be a terminal that supports the release 2. In this example, an example in which a plurality of terminals scheduled by the network device support a total of two releases is used for description. In an extensible manner, when the plurality of terminals scheduled by the network device support a total of more than two releases, a reference signal may alternatively be configured by using the method for indicating a release of a reference signal by using signaling provided in this embodiment.

S403: The at least one terminal receives the indication information.

S404: Each of the at least one terminal determines, based on the indication information, that a release of a reference signal transmitted (including receiving and/or sending) in a current scheduling periodicity is the first release.

Subsequently, when the method is applied to a downlink transmission scenario, the network device may send a reference signal of the first release to the terminal, and the terminal receives the reference signal of the first release. When the method is applied to an uplink transmission scenario, the terminal may send a reference signal of the first release to the network device, and the network device receives the reference signal of the first release.

In the reference signal configuration method provided in this embodiment, the network device indicates, by using signaling, a release of a reference signal to terminals (for example, some or all terminals) scheduled in a same scheduling periodicity. This helps implement that all terminals scheduled in a same scheduling periodicity use reference signals of a same release, and further, this helps resolve a compatibility problem of terminals that support different releases of reference signals and that are scheduled in a same scheduling periodicity.

Figure 11:
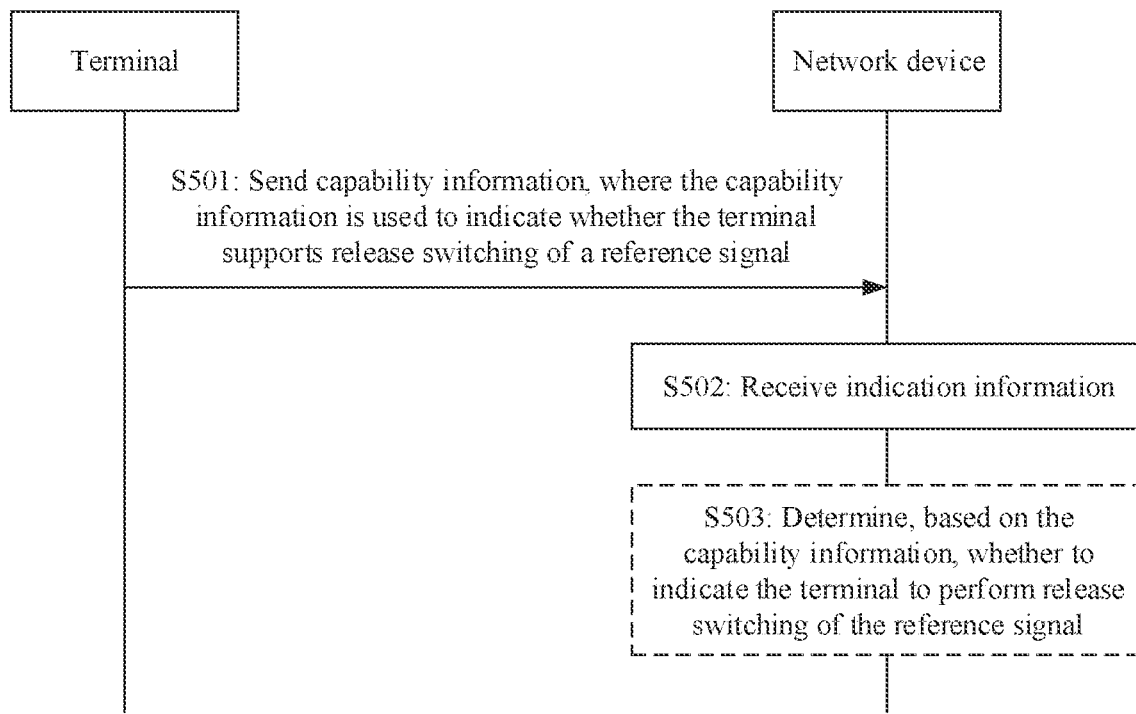
FIG. 11 is a schematic diagram of another reference signal configuration method according to an embodiment of this application.

FIG. 11 is a schematic diagram of a reference signal configuration method according to an embodiment of this application. The method includes the following steps.

S501: A terminal sends capability information to a network device, where the capability information is used to indicate whether the terminal supports release switching of a reference signal, and the terminal supports reference signals of at least two releases.

The reference signals of the at least two releases herein are reference signals of a same type. Optionally, sequences of the reference signals of the at least two releases are generated at the same time. For specific examples of the reference signals of the at least two releases, refer to the foregoing description. Certainly, this embodiment of this application is not limited thereto.

Specifically, if the terminal supports uplink reference signals of at least two releases, the capability information may be used to indicate whether the terminal supports release switching of the uplink reference signals. If the terminal supports downlink reference signals of at least two releases, the capability information may be used to indicate whether the terminal supports release switching of the downlink reference signals. In addition, if the terminal supports uplink reference signals of at least two releases and supports downlink reference signals of at least two releases, the capability information may be used to indicate whether the terminal supports release switching of the uplink reference signals and/or release switching of the downlink reference signals.

In a specific implementation process, the capability information may be carried in one or a combination of at least two of RRC signaling, MAC signaling, and DCI, and is sent by the network device to the terminal. For example, the indication information is carried by adding an independent indication field to the RRC signaling, the MAC signaling, or the DCI.

Optionally, if the terminal supports release switching of a reference signal, the capability information may further indicate that release switching of the reference signal supported by the terminal is one or more of the following switching manners: dynamic switching (for example, supporting that the indication information is carried in the DCI), semi-static switching (for example, supporting that the indication information is carried in the MAC signaling), and static switching (for example, supporting that the indication information is carried in the RRC signaling). Subsequently, the network device may further determine, based on the capability information, a release switching manner of the reference signal.

S502: The network device receives the capability information.

S503: The network device determines, based on the capability information, whether to indicate the terminal to perform release switching of the reference signal.

For example, when the capability information indicates that the terminal supports release switching of the reference signal, subsequently, when the network device needs to schedule the terminal, the network device may indicate, based on the capability information, the terminal to perform release switching of the reference signal. One of the application scenarios may be as described above. The network device indicates the first release to the terminal.

For another example, when the capability information indicates that the terminal does not support release switching of the reference signal, subsequently, when the network device needs to schedule the terminal, the network device may not indicate the terminal to perform release switching of the reference signal.

It should be noted that an operation performed by the network device based on the capability information is not limited in this embodiment of this application. In other words, S503 is an optional step.

In the reference signal configuration method provided in this embodiment, the terminal can report release switching capability information of the reference signal to the network device. This helps the network device indicate a reference signal release to the terminal through signaling, thereby helping resolve a compatibility problem of terminals that are scheduled in a same scheduling periodicity and that support different releases of reference signals.

Figure 12:
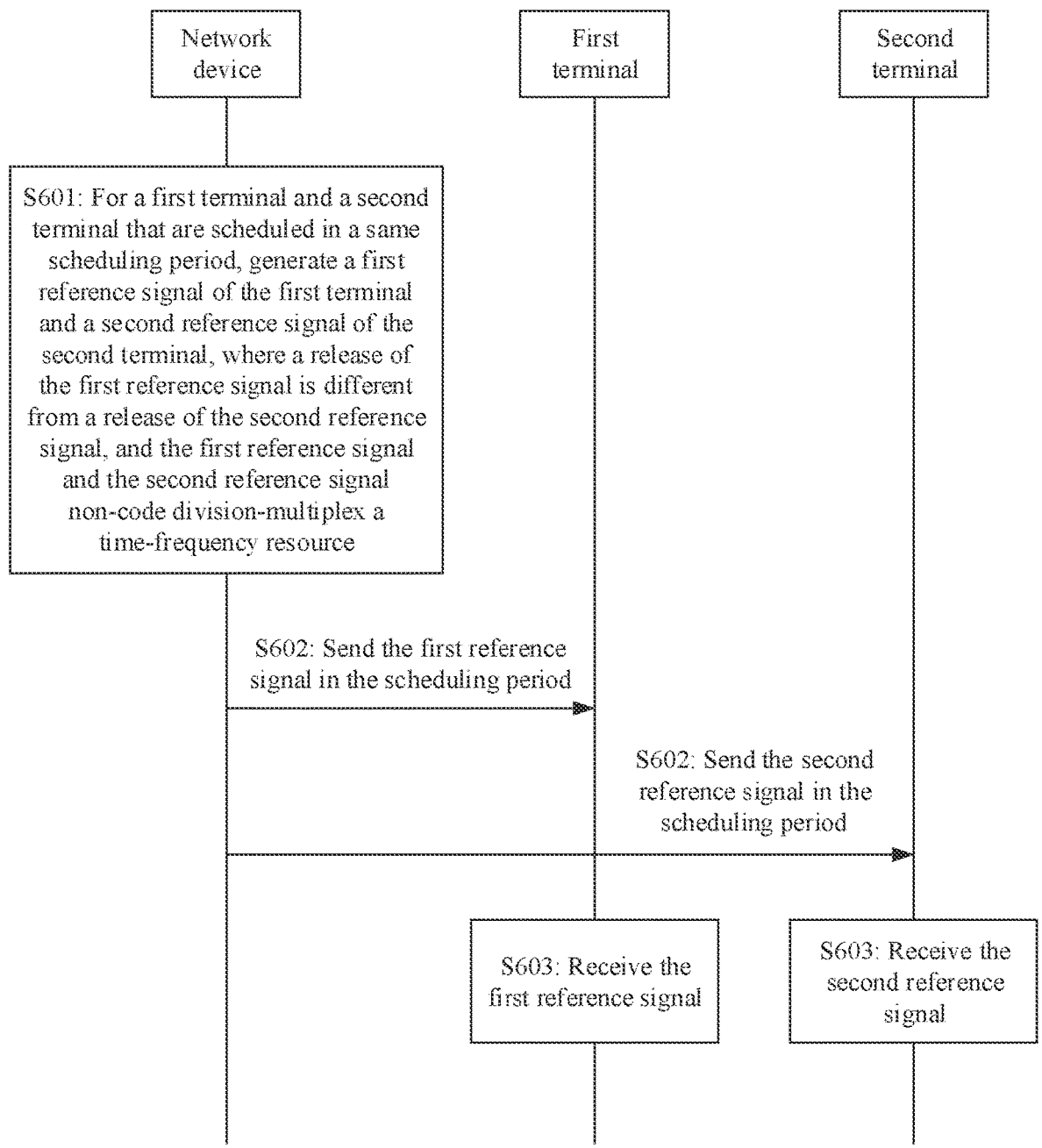
FIG. 12 is a schematic diagram of another reference signal configuration method according to an embodiment of this application.

FIG. 12 is a schematic diagram of a reference signal configuration method according to an embodiment of this application. The method includes the following steps.

S601: For a first terminal and a second terminal that are scheduled in a same scheduling periodicity, a network device generates a first reference signal of the first terminal and a second reference signal of the second terminal, where a release of the first reference signal is different from a release of the second reference signal, and the first reference signal and the second reference signal non-code-division multiplex a time-frequency resource. In other words, the first reference signal and the second reference signal cannot code-division multiplex the time-frequency resource.

The first reference signal and the second reference signal are reference signals of a same type. For example, the first reference signal and the second reference signal are both DMRSs or CSI-RSs.

Figure 13A:
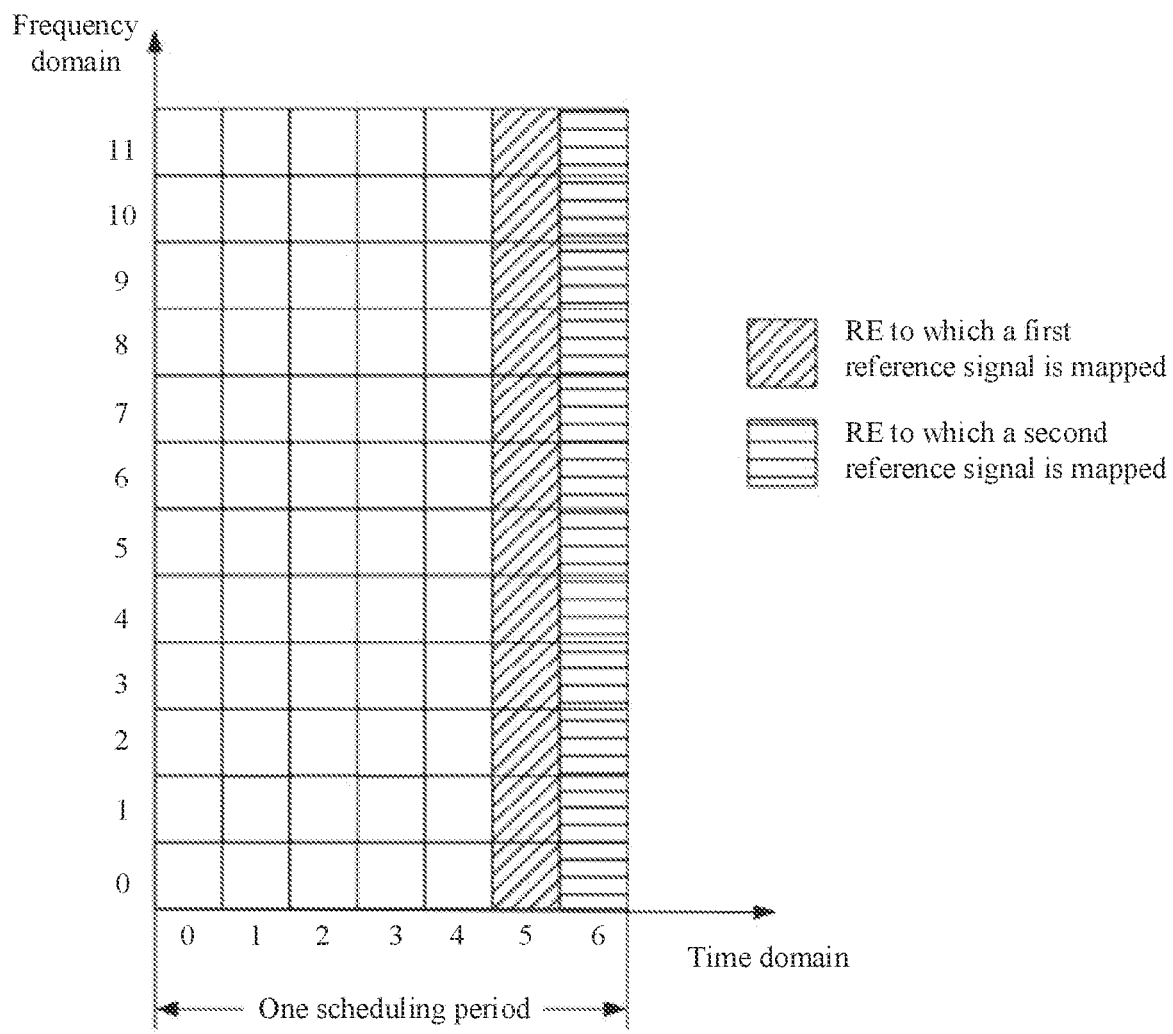
FIG. 13A is a schematic diagram of mapping reference signals of different terminals in a same scheduling periodicity to a time-frequency resource according to an embodiment of this application.

Optionally, the first reference signal and the second reference signal may time-division multiplex the time-frequency resource. FIG. 13A is a schematic diagram of mapping reference signals of different terminals in a same scheduling periodicity to a time-frequency resource according to an embodiment of this application. The different terminals herein are specifically terminals that support different releases of reference signals.

Figure 13B:
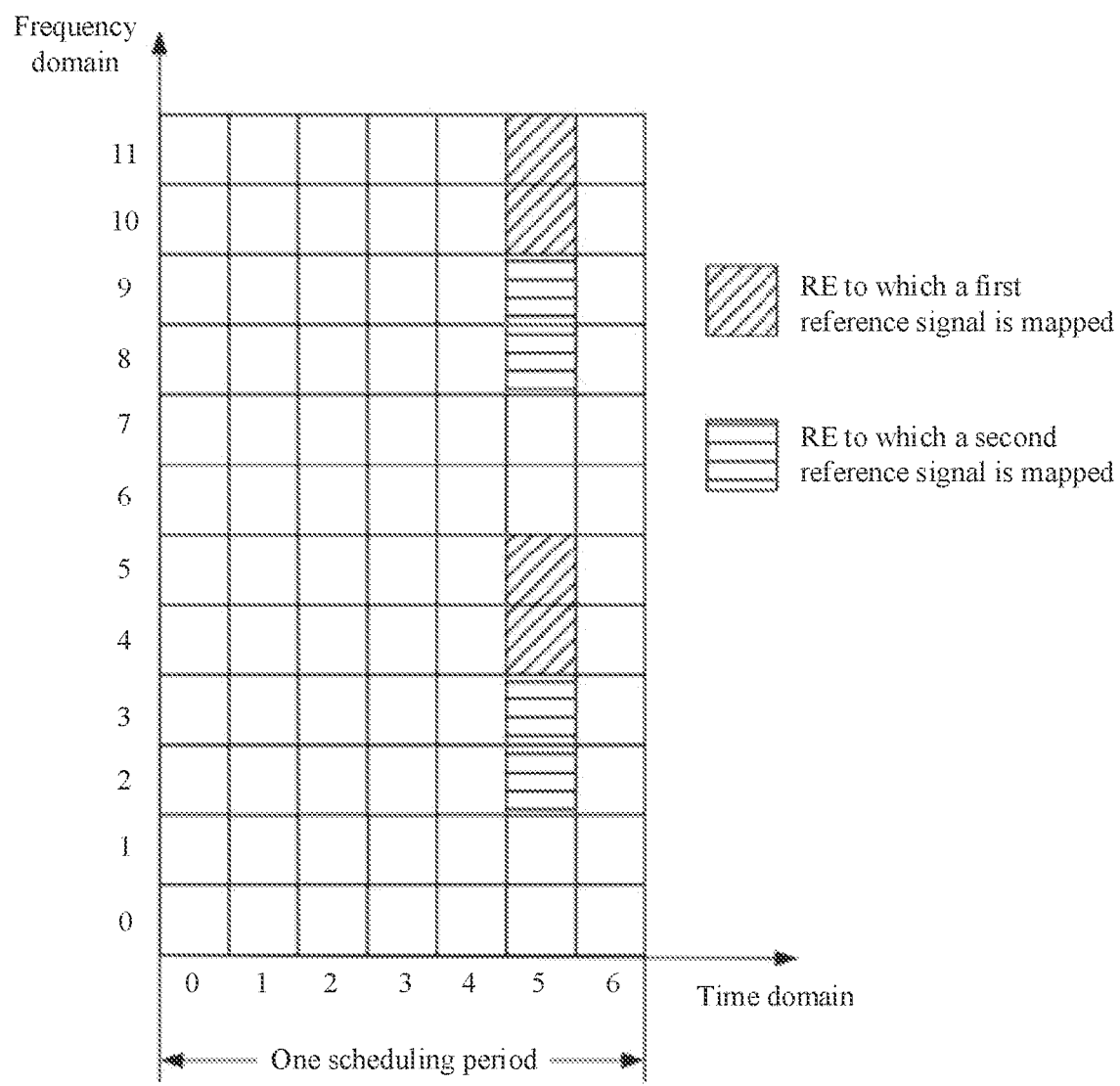
FIG. 13B is another schematic diagram of mapping reference signals of different terminals in a same scheduling periodicity to a time-frequency resource according to an embodiment of this application.

Optionally, the first reference signal and the second reference signal may frequency-division multiplex the time-frequency resource. FIG. 13B is a schematic diagram of mapping reference signals of different terminals in a same scheduling periodicity to a time-frequency resource according to an embodiment of this application. The different terminals herein are specifically terminals that support different releases of reference signals.

In FIGS. 13A and 13B, an example in which one scheduling periodicity is one slot is used for description, and a reference signal mapped to one RB is shown.

S602: The network device sends the first reference signal to the first terminal and sends the second reference signal to the second terminal in the scheduling periodicity. For example, after both the first reference signal and the second reference signal are mapped to the time-frequency resource, the first reference signal and the second reference signal that are mapped to the time-frequency resource are sent at the same time.

S603. The first terminal receives the first reference signal. The second terminal receives the second reference signal.

For either of the first terminal and the second terminal, it may be assumed that a sequence corresponding to any antenna port scheduled by the terminal is the same as a sequence corresponding to another antenna port in a code division multiplexing group in which the antenna port is located. Alternatively, it may be assumed that in the current scheduling periodicity, there is no antenna port whose corresponding sequence is different from a sequence corresponding to the antenna port.

In the reference signal configuration method provided in this embodiment, when reference signals of any two terminals scheduled by the network device in a same scheduling periodicity have different releases, a manner of multiplexing time-frequency resources by the reference signals of the two terminals may be a non-code-division multiplexing manner. In this way, this helps schedule, in a same scheduling periodicity, terminals that support different releases of reference signals, thereby resolving a compatibility problem of the terminals that support the different releases of reference signals and that are scheduled in the same scheduling periodicity.

Figure 14:
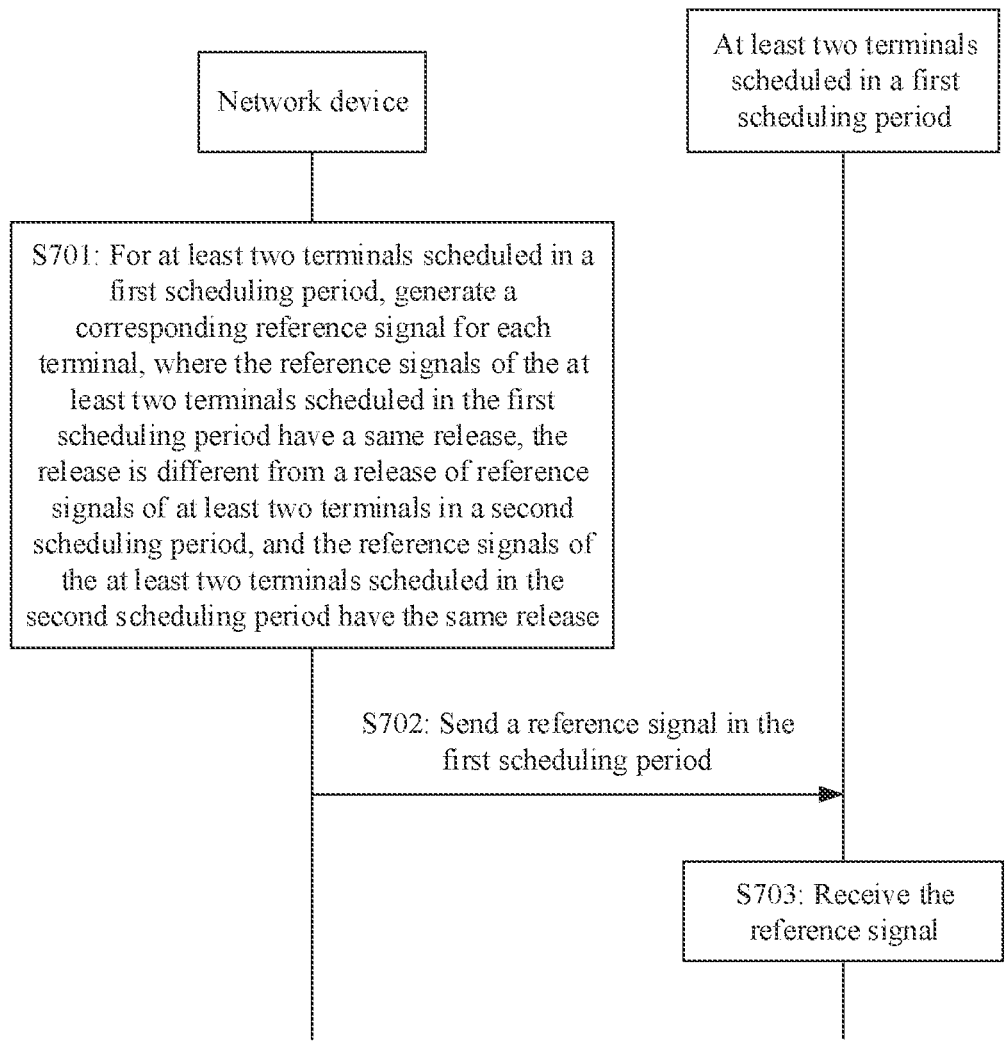
FIG. 14 is a schematic diagram of another reference signal configuration method according to an embodiment of this application.

FIG. 14 is a schematic diagram of a reference signal configuration method according to an embodiment of this application. The method includes the following steps.

S701: For at least two terminals scheduled in a first scheduling periodicity, a network device generates a corresponding reference signal for each terminal, where the reference signals of the at least two terminals scheduled in the first scheduling periodicity have a same release (for example, the reference signals of all the terminals scheduled in the first scheduling periodicity have the same release), the release is different from a release of reference signals of at least two terminals in a second scheduling periodicity, and the reference signals of the at least two terminals scheduled in the second scheduling periodicity have the same release (for example, the reference signals of all the terminals scheduled in the second scheduling periodicity have the same release).

Optionally, any terminal scheduled in the first scheduling periodicity and any terminal scheduled in the second scheduling periodicity may support reference signals of one or more releases.

Because the reference signals of the at least two terminals scheduled in the first scheduling periodicity have the same release, in the first scheduling periodicity, the reference signals of the at least two terminals may time-division multiplex, frequency-division multiplex, or code-division multiplex a time-frequency resource. Likewise, the reference signals of the at least two terminals scheduled in the second scheduling periodicity may time-division multiplex, frequency-division multiplex, or code-division multiplex the time-frequency resource.

S702: The network device sends, in the first scheduling periodicity, corresponding reference signals to the at least two terminals scheduled in the first scheduling periodicity.

S703. The at least two terminals receive the corresponding reference signals in the first scheduling periodicity.

For any one of the at least two terminals, it may be assumed that a sequence corresponding to any antenna port scheduled by the terminal is the same as a sequence corresponding to another antenna port in a code division multiplexing group in which the antenna port is located. Alternatively, it may be assumed that in the current scheduling periodicity, there is no antenna port whose corresponding sequence is different from a sequence corresponding to the antenna port.

Figure 15:
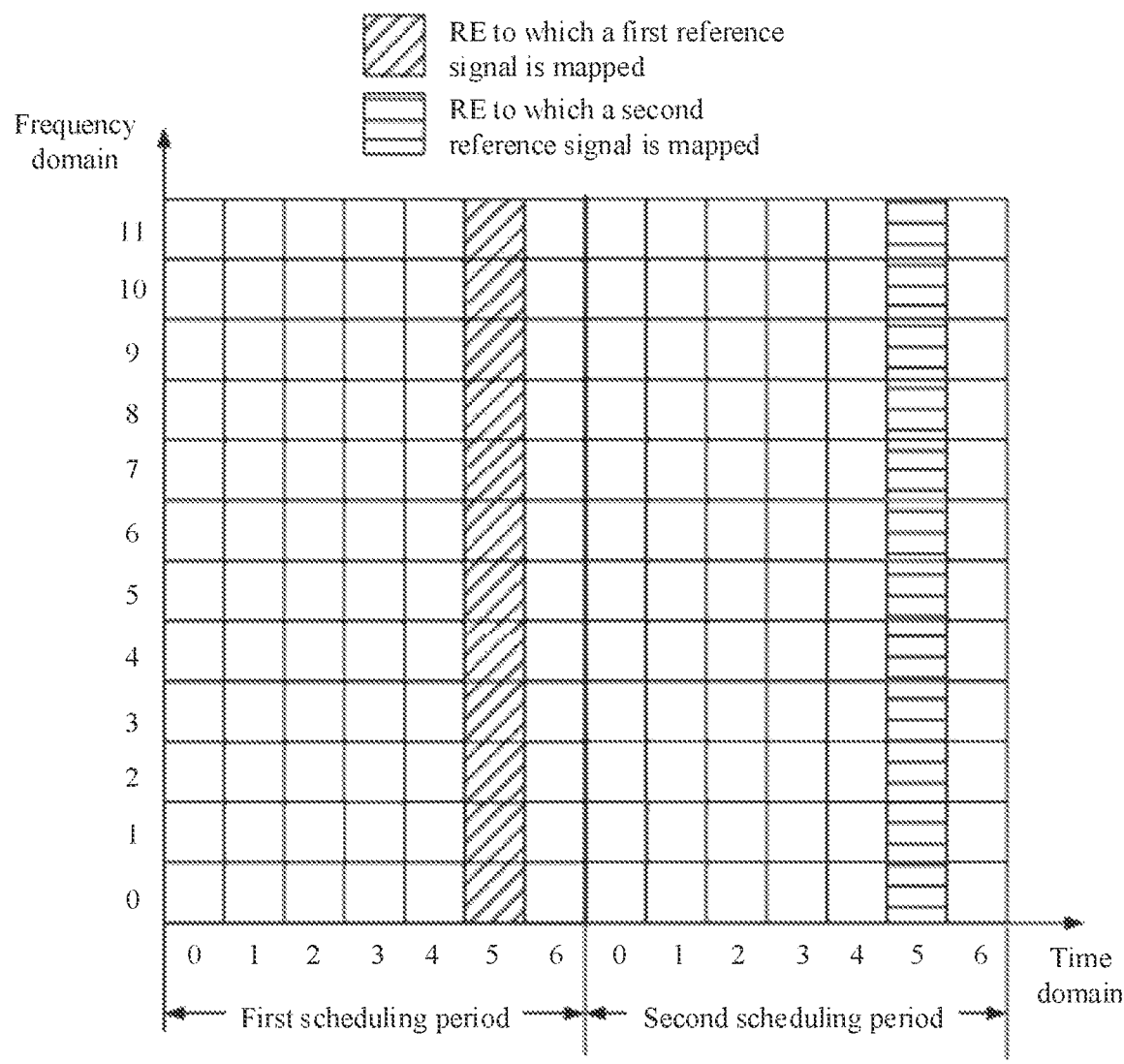
FIG. 15 is a schematic diagram of mapping reference signals of different terminals in different scheduling periodicities to a time-frequency resource according to an embodiment of this application.

FIG. 15 is a schematic diagram of mapping reference signals of different terminals in different scheduling periodicities to a time-frequency resource according to an embodiment of this application. The different terminals herein are specifically terminals that support different releases of reference signals. In FIG. 15, an example in which one scheduling periodicity is one slot is used for description, and a reference signal mapped to one RB is shown.

This embodiment may be understood as the reference signals of the terminals that support different releases time-division-multiplexing a time-frequency resource. Specifically, the time-frequency resource may be time-division-multiplexed by using a scheduling periodicity (for example, a subframe, a slot, or a mini-slot) as a unit. In this embodiment, reference signals of at least two terminals scheduled by the network device in a same scheduling periodicity have a same release, and reference signals transmitted in different scheduling periodicities have different releases, to resolve a compatibility problem of terminals that support different releases of reference signals.

The foregoing mainly describes the solutions provided in the embodiments of this application from a perspective of the method. To implement the foregoing functions, corresponding hardware structures and/or software modules for performing the functions are included. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for particular applications, but it should not be considered that the implementation goes beyond the scope of this application.

In the embodiments of this application, the reference signal configuration apparatus (including the network device or the terminal) or the sequence configuration apparatus (including the network device or the terminal) may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that, in the embodiments of this application, division into modules is merely an example, and is merely a logical function division. In actual implementation, another division manner may be used.

Figure 16:
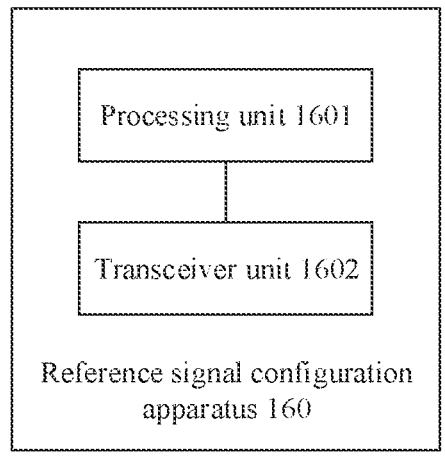
FIG. 16 is a schematic structural diagram of a reference signal configuration apparatus according to an embodiment of this application.

FIG. 16 is a schematic structural diagram of a reference signal configuration apparatus 160 according to an embodiment of this application. The reference signal configuration apparatus 160 may be configured to perform any reference signal configuration method provided above. The reference signal configuration apparatus 160 may include a processing unit 1601 and a transceiver unit 1602. Alternatively, the reference signal configuration apparatus 160 may include a transceiver unit 1602, and optionally, further include a processing unit 1601. Specific descriptions are as follows.

In some embodiments (marked as Embodiment 1 below), the reference signal configuration apparatus 160 may include a processing unit 1601 and a transceiver unit 1602. The processing unit 1601 is configured to generate at least two reference signals, where the at least two reference signals are reference signals corresponding to at least two antenna ports allocated by a network device to a same terminal, the at least two reference signals are reference signals of a same type, the at least two reference signals include a first reference signal and a second reference signal, and a sequence of the first reference signal is different from a sequence of the second reference signal. The transceiver unit 1602 is configured to send the at least two reference signals.

For example, with reference to FIG. 4, the reference signal configuration apparatus 160 may be a transmit end device, the processing unit 1601 may be configured to perform S101, and the transceiver unit 1602 may be configured to perform S103.

Optionally, the sequence of the reference signal is a sequence used to obtain the reference signal, and may also be referred to as a generation sequence of the reference signal or a local sequence of the reference signal.

Optionally, the processing unit 1601 is specifically configured to: generate the at least two reference signals based on M sequences, where the M sequences include the sequence of the first reference signal and the sequence of the second reference signal, M is an integer greater than or equal to 2, and M is a quantity of code division multiplexing groups occupied by the antenna ports allocated by the network device to the terminal or a quantity of antenna ports allocated by the network device to the terminal.

In some embodiments (marked as Embodiment 2 below), the reference signal configuration apparatus 160 may include the transceiver unit 1602, configured to receive at least two reference signals, where the at least two reference signals are reference signals corresponding to at least two antenna ports allocated by a network device to a same terminal, the at least two reference signals are reference signals of a same type, the at least two reference signals include a first reference signal and a second reference signal, and a sequence of the first reference signal is different from a sequence of the second reference signal.

For example, with reference to FIG. 4, the reference signal configuration apparatus 160 may be a receive end device, and the transceiver unit 1602 may be configured to perform S104.

Optionally, the reference signal configuration apparatus 160 further includes the processing unit 1601, configured to: generate the at least two reference signals based on M sequences, where the M sequences include the sequence of the first reference signal and the sequence of the second reference signal, M is an integer greater than or equal to 2, and M is a quantity of code division multiplexing groups occupied by the antenna ports allocated by the network device to the terminal or a quantity of antenna ports allocated by the network device to the terminal. For example, with reference to FIG. 4, the processing unit 1601 may be configured to perform S102.

Based on Embodiment 1 or Embodiment 2, the following provides several optional implementations.

Optionally, for either of the first reference signal and the second reference signal, a sequence of the reference signal is obtained according to a formula $\hat{r}_m(n) = f(n_{CDM\_m})gr(n)$, $\hat{r}_m(n)$ represents an $n^{th}$ element in the sequence of the reference signal, $r(n)$ represents an $n^{th}$ element in a reference sequence, $n \geq 0$, n is an integer, $f(n_{CDM\_m})$ represents a function related to $n_{CDM\_m}$, and $n_{CDM\_m}$ represents an index of a code division multiplexing group to which an antenna port corresponding to the reference signal belongs, an offset value corresponding to the code division multiplexing group, or a scrambling factor corresponding to the code division multiplexing group.

For example, $$f(n_{CDM\_m}) = -1^{\left\lfloor \frac{k \cdot n_{CDM\_m}}{4^{(n_{CDM\_m}+1)mod2}} \right\rfloor}, \quad f(n_{CDM\_m}) = -1^{\left\lfloor \frac{k \cdot n_{CDM\_m}}{4^{n_{CDM\_m}-1}} \right\rfloor},$$

$$f(n_{CDM\_m}) = -1^{\left[ \frac{k \cdot n_{CDM\_m}}{4^{(n_{CDM\_m}+1)mod2}} \right]}, \text{ or } f(n_{CDM\_m}) = -1^{\left[ \frac{k \cdot n_{CDM\_m}}{4^{n_{CDM\_m}-1}} \right]},$$

where k represents an index of a frequency domain unit to which $\hat{r}_m(n)$ is mapped.

For another example, when M=2, $f(c_{CDM\_m}) = -1^{CDM\_m}$. Alternatively, when M=3, $$f(n_{CDM\_m}) = e^{j\frac{2}{3}\pi CDM\_m} \text{ or } f(n_{CDM\_m}) = e^{-j\frac{2}{3}\pi CDM\_m}.$$

M is a quantity of code division multiplexing groups occupied by the antenna ports allocate by the network device to the terminal.

Optionally, an antenna port corresponding to the first reference signal and an antenna port corresponding to the second reference signal belong to different code division multiplexing groups, and the different code division multiplexing groups correspond to different orthogonal cover codes OCCs.

For example, if a system supports two code division multiplexing groups, and the two code division multiplexing groups include a first code division multiplexing group and a second code division multiplexing group, an OCC corresponding to each frequency domain unit in the first code division multiplexing group is a matrix a, and an OCC corresponding to each frequency domain unit in the second code division multiplexing group is −a; or an OCC corresponding to each frequency domain unit in the first code division multiplexing group is a matrix a, an OCC corresponding to one of two adjacent frequency domain units in the second code division multiplexing group is the matrix a, and an OCC corresponding to the other frequency domain unit is −a.

For another example, if a system supports three code division multiplexing groups, and the three code division multiplexing groups include a first code division multiplexing group, a second code division multiplexing group, and a third code division multiplexing group, an OCC corresponding to each frequency domain unit in the first code division multiplexing group is a matrix a, an OCC corresponding to each frequency domain unit in the second code division multiplexing group is a*exp (j*x), and an OCC corresponding to each frequency domain unit in the third code division multiplexing group is a*exp (j*y), where x+y=2π or x+y=−2π, and j is an imaginary unit; or an OCC corresponding to each frequency domain unit in the first code division multiplexing group is a matrix a, an OCC corresponding to one of two adjacent frequency domain units in the second code division multiplexing group is the matrix a, an OCC corresponding to the other frequency domain unit is a*exp (j*x), an OCC corresponding to one of two adjacent frequency domain units in the third code division multiplexing group is the matrix a, and an OCC corresponding to the other frequency domain unit is a*exp (j*y), where x+y=2π, or x+y=−2π, and j is an imaginary unit.

In some embodiments, the reference signal configuration apparatus 160 may include a processing unit 1601 and a transceiver unit 1602. The processing unit 1601 is configured to generate indication information, where the indication information is used to indicate a first release of a reference signal. The transceiver unit 1602 is configured to send the indication information to at least one terminal in a plurality of terminals scheduled in a same scheduling periodicity, where the plurality of terminals all support the first release, and the at least one terminal also supports a release other than the first release.

For example, with reference to FIG. 10, the reference signal configuration apparatus 160 may be a network device, the processing unit 1601 may be configured to perform S401, and the transceiver unit 1602 may be configured to perform S402.

In some embodiments, the reference signal configuration apparatus 160 may include a processing unit 1601 and a transceiver unit 1602. The transceiver unit 1602 is configured to receive indication information, where the indication information is used to indicate a first release of a reference signal. The processing unit 1601 is configured to determine, based on the indication information, that a release of a reference signal transmitted in a current scheduling periodicity is the first release.

For example, with reference to FIG. 10, the reference signal configuration apparatus 160 may be any one of the at least one terminal, the transceiver unit 1602 may be configured to perform S403, and the processing unit 1601 may be configured to perform S404.

In some embodiments, the reference signal configuration apparatus 160 may include a processing unit 1601 and a transceiver unit 1602. The transceiver unit 1602 is configured to receive capability information sent by a terminal, where the capability information is used to indicate whether the terminal supports release switching of a reference signal, and the terminal supports reference signals of at least two releases. Optionally, the processing unit 1601 is configured to determine, based on the capability information, whether to indicate the terminal to perform release switching of the reference signal.

For example, with reference to FIG. 11, the reference signal configuration apparatus 160 may be a network device, the processing unit 1601 may be configured to perform S502, and the transceiver unit 1602 may be configured to perform S503.

In some embodiments, the reference signal configuration apparatus 160 may include a transceiver unit 1602. The transceiver unit 1602 is configured to send capability information, where the capability information indicates whether the terminal supports release switching of a reference signal, so that a network device determines whether to indicate the terminal to perform release switching of the reference signal.

For example, with reference to FIG. 11, the reference signal configuration apparatus 160 may be a terminal, and the transceiver unit 1602 may be configured to perform S501.

In some embodiments, the reference signal configuration apparatus 160 may include a processing unit 1601 and a transceiver unit 1602. The processing unit 1601 is configured to: for a first terminal and a second terminal that are scheduled in a same scheduling periodicity, generate a first reference signal of the first terminal and a second reference signal of the second terminal, where a release of the first reference signal is different from a release of the second reference signal, and the first reference signal and the second reference signal non-code-division multiplex a time-frequency resource. The transceiver unit 1602 is configured to send the first reference signal to the first terminal and sending the second reference signal to the second terminal in the scheduling periodicity.

For example, with reference to FIG. 12, the reference signal configuration apparatus 160 may be a network device, the processing unit 1601 may be configured to perform S601, and the transceiver unit 1602 may be configured to perform S602.

In some embodiments, the reference signal configuration apparatus 160 may include a processing unit 1601 and a transceiver unit 1602. The processing unit 1601 is configured to: for at least two terminals scheduled in a first scheduling periodicity, generate a corresponding reference signal for each terminal, where the reference signals of the at least two terminals scheduled in the first scheduling periodicity have a same release, the release is different from a release of reference signals of at least two terminals in a second scheduling periodicity, and the reference signals of the at least two terminals scheduled in the second scheduling periodicity have the same release. The transceiver unit 1602 is configured to send, in the first scheduling periodicity, corresponding reference signals to the at least two terminals scheduled in the first scheduling periodicity.

For example, with reference to FIG. 14, the reference signal configuration apparatus 160 may be a network device, the processing unit 1601 may be configured to perform S701, and the transceiver unit 1602 may be configured to perform S702.

In some embodiments, the reference signal configuration apparatus 160 may include a processing unit 1601 and a transceiver unit 1602. The processing unit 1601 is configured to generate at least two reference signals, where the at least two reference signals are reference signals corresponding to at least two antenna ports allocated by a network device to a same terminal, the at least two reference signals are reference signals of a same type, the at least two reference signals include a first reference signal and a second reference signal, and a sequence of the first reference signal is different from a sequence of the second reference signal. The transceiver unit 1602 is configured to send the at least two reference signals. Optionally, the sequence of the reference signal is a sequence including elements included in the reference signal.

Optionally, both the sequence of the first reference signal and the sequence of the second reference signal are sequences generated based on a reference signal level, or sequences generated based on a time domain symbol level.

Optionally, the processing unit 1602 is specifically configured to generate the at least two reference signals based on one sequence (which may also be referred to as a mother sequence).

In some embodiments, the reference signal configuration apparatus 160 may include a transceiver unit 1602. The transceiver unit 1602 is configured to receive at least two reference signals, where the at least two reference signals are reference signals corresponding to at least two antenna ports allocated by a network device to a same terminal, the at least two reference signals are reference signals of a same type, the at least two reference signals include a first reference signal and a second reference signal, and a sequence of the first reference signal is different from a sequence of the second reference signal. Optionally, the sequence of the reference signal is a sequence including elements included in the reference signal.

Optionally, the reference signal configuration apparatus 160 further includes a processing unit 1601, configured to generate the at least two reference signals based on one sequence (which may also be referred to as a mother sequence).

For explanations of related content, descriptions of beneficial effects, and the like in any reference signal configuration apparatus 160 provided above, refer to the foregoing corresponding method embodiments. Details are not described herein again.

In an example, with reference to the communications device shown in FIG. 3, the processing unit 1601 may be implemented by using the processor 201 or the processor 207 in FIG. 3. The transceiver unit 1602 may be implemented by using the communications interface 204 in FIG. 3.

Figure 17:
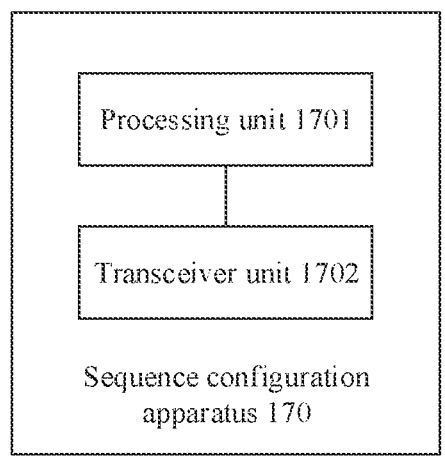
FIG. 17 is a schematic structural diagram of another reference signal configuration apparatus according to an embodiment of this application.

FIG. 17 is a schematic structural diagram of a sequence configuration apparatus 170 according to an embodiment of this application. The sequence configuration apparatus 170 may be configured to perform any sequence configuration method provided above. The sequence configuration apparatus 170 may include a processing unit 1701 and a transceiver unit 1702. Specific descriptions are as follows.

In some embodiments, the processing unit 1701 is configured to generate configuration information, where the configuration information is used to configure a sequence corresponding to each of M code division multiplexing groups that are occupied by at least two antenna ports and that are allocated by a network device to a terminal, and M is an integer greater than or equal to 2. The transceiver unit 1702 is configured to send the configuration information.

For example, with reference to FIG. 8, the sequence configuration apparatus 170 may be a transmit end device, the processing unit 1701 may be configured to perform S201, and the transceiver unit 1702 may be configured to perform S202.

Optionally, the configuration information is specifically used to configure a generation parameter of the sequence corresponding to each code division multiplexing group, and the generation parameter includes an index of the code division multiplexing group, an offset value corresponding to the code division multiplexing group, or a scrambling factor corresponding to the code division multiplexing group.

In some embodiments, the transceiver unit 1702 is configured to receive configuration information, where the configuration information is used to configure a sequence corresponding to each of M code division multiplexing groups that are occupied by at least two antenna ports and that are allocated by a network device to a terminal, and M is an integer greater than or equal to 2. The processing unit 1701 is configured to configure the sequence corresponding to each code division multiplexing group based on the configuration information.

For example, with reference to FIG. 8, the sequence configuration apparatus 170 may be a receive end device, the transceiver unit 1702 may be configured to perform S203, and the processing unit 1701 may be configured to perform S204.

Optionally, the configuration information is specifically used to configure a generation parameter of the sequence corresponding to each code division multiplexing group, and the generation parameter includes an index of the code division multiplexing group, an offset value corresponding to the code division multiplexing group, or a scrambling factor corresponding to the code division multiplexing group. In some embodiments, the processing unit 1701 is configured to generate configuration information, where the configuration information is used to configure a sequence corresponding to each of at least two antenna ports allocated by a network device to a terminal. The transceiver unit 1702 is configured to send the configuration information.

For example, with reference to FIG. 9, the sequence configuration apparatus 170 may be a transmit end device, the processing unit 1701 may be configured to perform S301, and the transceiver unit 1702 may be configured to perform S302.

Optionally, the configuration information is specifically used to configure a generation parameter of the sequence corresponding to each antenna port, and the generation parameter includes an index of the antenna port, an offset value corresponding to the antenna port, or a scrambling factor corresponding to the antenna port.

In some embodiments, the transceiver unit 1702 is configured to receive configuration information, where the configuration information is used to configure a sequence corresponding to each of at least two antenna ports allocated by a network device to a terminal. The processing unit 1701 is configured to configure the sequence corresponding to each antenna port based on the configuration information.

For example, with reference to FIG. 9, the sequence configuration apparatus 170 may be a receive end device, the transceiver unit 1702 may be configured to perform S303, and the processing unit 1701 may be configured to perform S304.

Optionally, the configuration information is specifically used to configure a generation parameter of the sequence corresponding to each antenna port, and the generation parameter includes an index of the antenna port, an offset value corresponding to the antenna port, or a scrambling factor corresponding to the antenna port.

For explanations of related content, descriptions of beneficial effects, and the like in any sequence configuration apparatus 170 provided above, refer to the foregoing corresponding method embodiments. Details are not described herein again.

In an example, with reference to the communications device shown in FIG. 3, the processing unit 1701 may be implemented by using the processor 201 or the processor 207 in FIG. 3. The transceiver unit 1702 may be implemented by using the communications interface 204 in FIG. 3.

The following describes another embodiment of the present invention. For corresponding features in this embodiment, refer to related descriptions in the foregoing embodiments.

Another aspect of the present invention provides a reference signal obtaining method, including:
determining an initialization factor of a reference signal, where a value of the initialization factor may be determined according to the following formulas; and
obtaining the reference signal based on the initialization factor.

Correspondingly, the present invention further provides a communications apparatus, including:
a determining module, configured to determine an initialization factor of a reference signal, and
an obtaining module, configured to obtain the reference signal based on the initialization factor.

Correspondingly, the present invention further provides a communications apparatus, including:
a processor, configured to perform the foregoing reference signal obtaining method.

Correspondingly, the present invention further provides a communications apparatus, including:
a memory, configured to store a computer program; and
a processor, configured to read the computer program stored in the memory, to perform the foregoing reference signal obtaining method.

Correspondingly, the present invention further provides a computer-readable storage medium, where the computer-readable storage medium stores a computer program, and when the computer program runs on a computer, the computer is enabled to perform the foregoing reference signal obtaining method.

Correspondingly, the present invention further provides a computer program product. When the computer program product runs on a computer, the foregoing reference signal obtaining method is enabled to be performed.

Correspondingly, the present invention further provides a communications chip, where the communications chip stores an instruction, and when the instruction runs on a communications apparatus, the communications apparatus is enabled to perform the foregoing reference signal obtaining method.

In a specific implementation process, the initialization factor may be:

$$c_{init\_m} = (2^{19}(N_{symb}^{slot} n_{s,f}^{\mu} + l + 1)(2N_{ID}^{nSCID} + 1) + f(n_{CDM\_m})) \bmod 2^{31} \quad \text{(formula 1)}$$

or $$c_{init\_m} = (2^{(17+nCDM\_m)}(N_{symb}^{slot} n_{s,f}^{\mu} + l + 1)(2N_{ID}^{nSCID} + 1) + f(n_{CDM\_m})) \bmod 2^{31} \quad \text{(formula 2)}$$

More specifically, when the initialization factor is obtained through calculation by using the foregoing formula 1 or formula 2, $$f(n_{CDM\_m}) = 2N_{ID}^{nSCID} + n_{SCID} + n_{CDM\_m} * 2^{17}, \text{ or}$$

$$f(n_{CDM\_m}) = 4N_{ID}^{nSCID} + n_{SCID} * 2^{18} + n_{CDM\_m}, \text{ or}$$

$$f(n_{CDM\_m}) = 8N_{ID}^{nSCID} + n_{SCID} * 2^2 + n_{CDM\_m}, \text{ or}$$

$$f(n_{CDM\_m}) = N_{ID}^{nSCID} + n_{SCID} * 2^{16} + n_{CDM\_m} * 2^{17}, \text{ or}$$

$$f(n_{CDM\_m}) = 8N_{ID}^{nSCID} + n_{SCID} * 2 n_{CDM\_m}, \text{ or}$$

$$f(n_{CDM\_m}) = N_{ID}^{nSCID} + n_{SCID} * 2^{18} + n_{CDM\_m} * 2^{16}.$$

In a specific implementation process, the initialization factor may alternatively be:

$$c_{init\_m} = (2^{(Y)}(N_{symb}^{slot} n_{s,f}^{\mu} + l + 1)(2N_{ID}^{nSCID} + 1) + 2N_{ID}^{nSCID} + n_{SCID} + n_{CDM\_m} * 2^X) \bmod 2^{31} \quad \text{(formula 3)}.$$

Y is any positive integer greater than or equal to $\log_2(n_{CDM\_m}*2^X)+1$, and X is any positive integer greater than or equal to $\log_2(2N_{ID}^{nSCID})$.

In a specific implementation process, the initialization factor may alternatively be:

$$c_{init\_m}(2^{17}(f(n_{CDM\_m}))+2N_{ID}^{nSCID}+n_{SCID}) \bmod 2^{31} \quad \text{(formula 4)}.$$

More specifically, when the initialization factor is obtained through calculation by using the foregoing formula 4, $$f(n_{CDM\_m})=(N_{symb}^{slot}n_{s,f}^{\mu}+l+1+n_{CDM\_m})(2N_{ID}^{nSCID}+1), \text{ or}$$

$$f(n_{CDM\_m})=(N_{symb}^{slot}n_{s,f}^{\mu}+l+1+(l+n_{CDM\_m})) \bmod N_{symb}^{slot}(2N_{ID}^{nSCID}+1).$$

In the foregoing formula, $c_{init\_m}$ is the initialization factor, $n_{CDM\_m}$ represents an index of a code division multiplexing group to which an antenna port corresponding to a reference signal belongs, an offset value corresponding to the code division multiplexing group, a scrambling factor corresponding to the code division multiplexing group, or other information that can be used to identify the code division multiplexing group, $N_{symb}^{slot}$ is a quantity of symbols (symbol) in a slot (slot), $n_{s,f}^{\mu}$ is an index of a subframe or a slot (slot), l is an index of a symbol (symbol), $n_{SCID}$ is a scrambling factor, and $N_{ID}^{nSCID}$ is a sequence scrambling identifier (ID).

In a specific implementation process, a value of $n_{SCID}$ may be, for example, but is not limited to, 0 or 1. In this case, the value of $n_{SCID}$ may be indicated by using one bit (bit) in DCI. A value range of $N_{ID}^{nSCID}$ may be, for example, but is not limited to, 0 to 65535. The parameter may be configured through, for example, but not limited to, RRC signaling. There is a correspondence between $n_{CDM\_m}$ and a DMRS port (port).

For meanings and value ranges of the foregoing parameters, refer to definitions in this specification and the prior art (for example, but not limited to various communications standards such as LTE and 5G standards). For example, in the LTE standard or the 5G standard, $c_{init\_m}$ is an initialization factor of a reference signal sequence, and $N_{symb}^{slot}$ is a quantity of symbols in a slot, for example, but not limited to, a quantity of symbols in a slot that carries the reference signal. For example, in the LTE standard, $N_{symb}^{slot}$ may be equal to 6 or 7. $n_{s,f}^{\mu}$ is an index of a subframe, for example, but not limited to, an index of a subframe that carries the reference signal, or $n_{s,f}^{\mu}$ is an index of a slot, for example, but not limited to, an index of a slot that carries the reference signal, and l is an index of a symbol, for example, but not limited to, an index of a symbol that carries the reference signal. For example, l may be equal to 0 to 5 or 0 to 6 in the LTE standard.

It is not difficult to understand that the foregoing formulas may be replaced with or combined with another formula (for example, but not limited to the formula for generating an initialization factor described above) that has a same function and that is mentioned in this specification.

In a specific implementation process, the reference signal may be obtained with reference to the prior art. For example, the reference signal may be obtained in the following manner.

The reference signal sequence is obtained, and the reference signal sequence may be generated according to the following formula.

$$r(n) = \frac{1}{\sqrt{2}}(1 - 2 \cdot c(2n)) + j\frac{1}{\sqrt{2}}(1 - 2 \cdot c(2n + 1)) \quad \text{(formula 5)}$$

In this case, the reference signal sequence may also be obtained by using a lookup table obtained based on the foregoing formula, where $$c(n)=(x_1(n+N_C)+x_2(n+N_C)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2$$

c(n) is a binary gold sequence, and a length of the binary gold sequence may be, for example, but is not limited to $M_{PN}$, where $n=0, 1, \ldots, M_{PN}-1$, $N_C=1600$, and $$x_1(0) = 1, x_1(n) = 0, n = 1, 2, \ldots, 30$$

$$c_{init\_m} = \sum_{i=0}^{30} x_2(i) * 2^i$$

In a specific implementation process, the reference signal is a DMRS or a CSI-RS.

The obtaining the reference signal may be obtaining the reference signal in various manners, for example, but not limited to, obtaining the reference signal through calculation according to a preset formula, or finding the reference signal through table lookup. More specifically, the preset formula is, for example, but not limited to, a sequence generation formula of the reference signal, and the formula is a formula related to the initialization factor. For example, but not limited to, a parameter in the preset formula includes the initialization factor. In a specific implementation process, for the preset formula, refer to, for example, but not limited to, a reference signal sequence generation formula mentioned in an existing LTE standard or a 5G standard. In addition, as described in this specification, $n_{CDM\_m}$ represents an index of a code division multiplexing group to which an antenna port corresponding to a reference signal belongs, an offset value corresponding to the code division multiplexing group, a scrambling factor corresponding to the code division multiplexing group, or other information that can be used to identify the code division multiplexing group.

If a device for performing the foregoing method is a transmit end device, the foregoing method may further include: sending the reference signal. More specifically, before the reference signal is sent, other processing may be further performed. For example, but not limited to, processing is performed through an OCC code, and then the reference signal is sent on a time-frequency resource corresponding to the reference signal.

If the device for performing the foregoing method is a receive end device, the foregoing method may further include: performing, by the receive end device, data demodulation based on the reference signal and a reference signal from a transmit end device. It is not difficult to understand that in this case, the reference signal is a DMRS. Specifically, the reference signal generated by the receive end device and the reference signal generated by the transmit end device are a same reference signal. In this way, after the reference signal generated by the transmit end device is sent by the transmit end device and transmitted on a channel, the reference signal is received by the receive end device, so that the receive end device can perform data demodulation based on the reference signal that is received from the transmit end device and the reference signal that is obtained by the receive end device based on the initialization factor. For a process of performing data demodulation based on the reference signal that is from the transmit end device and the reference signal that is obtained by the receive end device based on the initialization factor, refer to the prior art. Details are not described in this specification. For example, but not limited to, the receive end device may determine, based on the reference signal that is from the transmit end device and the reference signal that is obtained by the receive end device based on the initialization factor, for example, a channel parameter (for example, but not limited to, an equivalent channel matrix), and perform data demodulation based on the channel parameter. Before data demodulation is performed, other processing may further need to be performed on the reference signal that is from the transmit end device and the reference signal that is obtained by the receive end device based on the initialization factor.

According to another aspect, the transmit end device may be a network device, and the receive end device may be a terminal. In this way, the transmit end device sends the reference signal to the receive end device, and the receive end device performs data demodulation based on the reference signal that is received from the transmit end device and the reference signal that is generated by the receive end device. This corresponds to a downlink communication process.

According to still another aspect, the transmit end device may be a terminal, and the receive end device may be a network device. In this way, the transmit end device sends the reference signal to the receive end device, and the receive end device performs data demodulation based on the reference signal that is received from the transmit end device and the reference signal that is generated by the receive end device. This corresponds to an uplink communication process.

It is not difficult to understand that the communications apparatus may be the transmit end device, or may be the receive end device. In addition, the transmit end device and the receive end device may further include components such as a transceiver module or a transceiver.

For related content of the foregoing components such as the modules, the processor, the memory, and the transceiver, refer to descriptions of other parts in this specification.

To put it simply, the foregoing formula may be:

$$c_{init\_m} = (2^{19}(N_{symb}^{slot}n_{s,f}^{\mu}+l+1)(2N_{ID}^{nSCID}+1)+f(n_{CDM\_m})) \bmod 2^{31}, \text{ or}$$

$$c_{init\_m} = (2^{(17+nCDM\_m)}(N_{symb}^{slot}n_{s,f}^{\mu}+l+1)(2N_{ID}^{nSCID}+1)+f(n_{CDM\_m})) \bmod 2^{31}, \text{ where } f(n_{CDM\_m}) \text{ may be}$$

$$f(n_{CDM\_m}) = 2N_{ID}^{nSCID}+n_{SCID}+n_{CDM\_m}*2^{17} \text{ or}$$

$$f(n_{CDM\_m}) = 4N_{ID}^{nSCID}+n_{SCID}*2^{18}+n_{CDM\_m} \text{ or}$$

$$f(n_{CDM\_m}) = 8N_{ID}^{nSCID}+n_{SCID}*2^2+n_{CDM\_m} \text{ or}$$

$$f(n_{CDM\_m}) = N_{ID}^{nSCID}+n_{SCID}*2^{16}+n_{CDM\_m}*2^{17} \text{ or}$$

$$f(n_{CDM\_m}) = 8N_{ID}^{nSCID}+n_{SCID}+2^{18}n_{CDM\_m} \text{ or}$$

$$f(n_{CDM\_m}) = N_{ID}^{nSCID}+n_{SCID}*2^{18}+n_{CDM\_m}*2^{16}, \text{ or}$$

$$c_{init\_m}(2^{(Y)}(N_{symb}^{slot}n_{s,f}^{\mu}+l+1)(2N_{ID}^{nSCID}+1)+2N_{ID}^{nSCID}+n_{SCID}+n_{CDM\_m}*2^{X}) \bmod 2^{31}$$

where Y is any positive integer greater than or equal to $\log_2(n_{CDM\_m}*2^X)+1$. X is any positive integer greater than or equal to $\log_2(2N_{ID}^{nSCID})$, or $$c_{init\_m}(2^{17}(f(n_{CDM\_m}))+2N_{ID}^{nSCID}+n_{SCID}) \bmod 2^{31}$$

where $f(n_{CDM\_m})$ may be $$f(n_{CDM\_m}) = (N_{symb}^{slot}n_{s,f}^{\mu}+l+1+n_{CDM\_m})(2N_{ID}^{nSCID}+1)$$

$$f(n_{CDM\_m}) = (N_{symb}^{slot}n_{s,f}^{\mu}+1+(l+n_{CDM\_m})) \bmod N_{symb}^{slot}(2N_{ID}^{nSCID}+1)$$

where $N_{symb}^{slot}$ is a quantity of symbols in a slot, $n_{s,f}^{\mu}$ is a subframe or slot index, l is a symbol index, $n_{SCID}$ is a scrambling factor (whose value is 0 or 1), and is indicated by 1-bit DCI, $N_{ID}^{nSCID}$ is a sequence scrambling ID, have a value range from 0 to 65535, and is configured by RRC, and $n_{CDM\_m}$ is an index or ID of a CDM group, has a value range from 0 to 2, and has a correspondence with a DMRS port.

All or some of the foregoing embodiments may be implemented through software, hardware, firmware, or any combination thereof. When a software program is used to implement the embodiments, the embodiments may be implemented completely or partially in a form of a computer program product. The computer program product includes one or more computer instructions. When the computer executive instructions are loaded and executed on the computer, the procedure or functions according to the embodiments of this application are all or partially generated. The computer may be a general-purpose computer, a special-purpose computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid state disk, SSD)), or the like.

Although this application is described with reference to the embodiments, in a process of implementing this application that claims protection, a person skilled in the art may understand and implement another variation of the disclosed embodiments by viewing the accompanying drawings, disclosed content, and the accompanying claims. In the claims, "comprise" (comprising) does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a better effect.

Although this application is described with reference to specific features and the embodiments thereof, it is clear that various modifications and combinations may be made to them without departing from the spirit and scope of this application. Correspondingly, the specification and accompanying drawings are merely example description of this application defined by the accompanying claims, and is considered as any of or all modifications, variations, combinations or equivalents that cover the scope of this application. It is clear that a person skilled in the art can make various modifications and variations to this application without departing from the spirit and scope of this application. This application is intended to cover the modifications and variations of this application provided that they fall within the scope of the claims of this application and their equivalent technologies.

What is claimed is:

1. A method comprising:
    generating at least two demodulation reference signals (DMRSs) corresponding to a terminal device, wherein the at least two DMRSs comprise a first DMRS and a second DMRS that are mapped to same one or more time domain symbols, wherein a first sequence of the first DMRS and a second sequence of the second DMRS satisfy $c_{init\_m}=f(n_{CDM\_m})$, wherein $f(n_{CDM\_m})$ represents a function of $n_{CDM\_m}$, wherein for the first sequence, $n_{CDM\_m}$ represents an index of a code division multiplexing (CDM) group to which an antenna port of the terminal device used for the first DMRS belongs, wherein for the second sequence, $n_{CDM\_m}$ represents an index of a CDM group to which an antenna port of the terminal device used for the second DMRS belongs, and wherein $c_{init\_m}$ represents an initialization factor of a sequence corresponding to the CDM group; and
    transmitting the at least two DMRSs.

2. The method according to claim 1, wherein generating the at least two DMRS comprise:
    generating the at least two DMRSs based on M sequences that comprise the first sequence and the second sequence, where M is a quantity of CDM groups that is greater than or equal to 2 and the CDM groups are associated with antenna ports of the terminal device for the at least two DMRSs.

3. The method according to claim 1, wherein the method further comprises:
    communicating capability information indicating that the terminal device supports release switching of a DMRS and DMRSs of at least two versions of standard releases.

4. The method according to claim 1, wherein the method further comprises:
    communicating indication information indicating a version of standard release of a DMRS.

5. The method according to claim 1, wherein an antenna port corresponding to the first DMRS and an antenna port corresponding to the second DMRS correspond to different CDM groups, and the different CDM groups correspond to different orthogonal cover codes (OCCs).

6. The method according to claim 5, wherein the different OCCs comprise a first OCC represented by a and a second OCC represented by −a, wherein a is a matrix, wherein the first OCC corresponds to each frequency domain unit in the first CDM group or one of two adjacent frequency domain units in the second CDM group, and wherein the second OCC corresponds to each frequency domain unit in the second CDM group or each frequency domain unit in the second CDM group other than the one of the two adjacent frequency domain units in the second CDM group corresponding to the first OCC.

7. The method according to claim 5, wherein a first OCC represented by a, a second OCC represented by a*exp (j*x), and a third OCC represented by a*exp (j*y), wherein a is a matrix, $x+y=2\pi$ or $x+y=-2\pi$, and j is an imaginary unit, wherein the first OCC corresponds to each frequency domain unit in the first CDM group, one of two adjacent frequency domain units in the second CDM group, or one of two adjacent frequency domain units in a third CDM group, wherein the second OCC corresponds to each frequency domain unit in the second CDM group or each frequency domain unit in the second CDM group other than the one of the two adjacent frequency domain units in the second CDM group corresponding to the first OCC, and wherein the third OCC corresponds to each frequency domain unit in the third CDM group or each frequency domain unit in the third CDM group other than the one of the two adjacent frequency domain units in the third CDM group corresponding to the first OCC.

8. A method comprising:
    receiving at least two demodulation reference signals (DMRSs) corresponding to a terminal device, wherein the at least two DMRSs comprise a first DMRS and a second DMRS that are mapped to same one or more time domain symbols, wherein a first sequence of the first DMRS and a second sequence of the second DMRS satisfy $c_{init\_m}=f(n_{CDM\_m})$, wherein $f(n_{CDM\_m})$ represents a function of $n_{CDM\_m}$, wherein for the first sequence, $n_{CDM\_m}$ represents an index of a code division multiplexing (CDM) group to which an antenna port of the terminal device used for the first DMRS belongs, wherein for the second sequence, $n_{CDM\_m}$ represents an index of a CDM group to which an antenna port of the terminal device used for the second DMRS belongs, and wherein $c_{init\_m}$ represents an initialization factor of a sequence corresponding to the CDM group.

9. The method according to claim 8, wherein the method further comprises:
    generating the at least two DMRSs based on M sequences that comprise the first sequence and the second sequence, where M is a quantity of CDM groups that is greater than or equal to 2 and the CDM groups are associated with antenna ports of the terminal device for the at least two DMRSs.

10. The method according to claim 8, wherein the method further comprises:
    communicating capability information indicating that the terminal device supports release switching of a DMRS and DMRSs of at least two versions of standard releases.

11. The method according to claim 8, wherein the method further comprises:
    communicating indication information indicating a version of standard release of a DMRS.

12. The method according to claim 8, wherein an antenna port corresponding to the first DMRS and an antenna port corresponding to the second DMRS correspond to different CDM groups, and the different CDM groups correspond to different orthogonal cover codes (OCCs).

13. The method according to claim 12, wherein the different OCCs comprise a first OCC represented by a and a second OCC represented by −a, wherein a is a matrix, wherein the first OCC corresponds to each frequency domain unit in the first CDM group or one of two adjacent frequency domain units in the second CDM group, and wherein the second OCC corresponds to each frequency domain unit in the second CDM group or
    each frequency domain unit in the second CDM group other than the one of the two adjacent frequency domain units in the second CDM group corresponding to the first OCC.

14. The method according to claim 12, wherein a first OCC represented by a, a second OCC represented by a*exp (j*x), and a third OCC represented by a*exp (j*y), wherein a is a matrix, wherein x+y=2π or x+y=−2π, and j is an imaginary unit, wherein the first OCC corresponds to each frequency domain unit in the first CDM group, one of two adjacent frequency domain units in the second CDM group, or one of two adjacent frequency domain units in a third CDM group, wherein the second OCC corresponds to each frequency domain unit in the second CDM group or each frequency domain unit in the second CDM group other than the one of the two adjacent frequency domain units in the second CDM group corresponding to the first OCC, and wherein the third OCC corresponds to each frequency domain unit in the third CDM group or each frequency domain unit in the third CDM group other than the one of the two adjacent frequency domain units in the third CDM group corresponding to the first OCC.

15. A processing apparatus configured to execute programming instructions stored in a memory to perform operations comprising:

generating at least two demodulation reference signals (DMRSs) corresponding to a terminal device, wherein the at least two DMRSs comprise a first DMRS and a second DMRS that are mapped to same one or more time domain symbols, wherein a first sequence of the first DMRS and a second sequence of the second DMRS satisfy $c_{init\_m} = f(n_{CDM\_m})$ wherein $f(n_{CDM\_m})$ represents a function of $n_{CDM\_m}$, wherein for the first sequence, $n_{CDM\_m}$) represents an index of a code division multiplexing (CDM) group to which an antenna port of the terminal device used for the first DMRS belongs, wherein for the second sequence, $n_{CDM\_m}$ represents an index of a CDM group to which an antenna port of the terminal device used for the second DMRS belongs, and wherein $c_{init\_m}$ represents an initialization factor of a sequence corresponding to the CDM group; and transmitting the at least two DMRSs.

16. The processing apparatus according to claim 15, wherein the operations further comprising:

generating the at least two DMRSs based on M sequences that comprise the first sequence and the second sequence, where M is a quantity of CDM groups that is greater than or equal to 2 and the CDM groups are associated with antenna ports of the terminal device for the at least two DMRSs.

17. The processing apparatus according to claim 15, wherein the operations further comprising:

communicate capability information indicating that the terminal device supports release switching of a DMRS and DMRSs of at least two versions of standard releases.

18. The processing apparatus according to claim 15, wherein the operations further comprising:

communicate indication information indicating a version of standard release of a DMRS.

19. The processing apparatus according to claim 15, wherein an antenna port corresponding to the first DMRS and an antenna port corresponding to the second DMRS correspond to different CDM groups, and the different CDM groups correspond to different orthogonal cover codes (OCCs).

20. The processing apparatus according to claim 19, wherein the different OCCs comprise a first OCC represented by a and a second OCC represented by −a, wherein a is a matrix, wherein the first OCC corresponds to each frequency domain unit in the first CDM group or one of two adjacent frequency domain units in the second CDM group, and wherein the second OCC corresponds to each frequency domain unit in the second CDM group or each frequency domain unit in the second CDM group other than the one of the two adjacent frequency domain units in the second CDM group corresponding to the first OCC.

21. The processing apparatus according to claim 19, wherein a first OCC represented by a, a second OCC represented by a*exp (j*x), and a third OCC represented by a*exp (j*y), wherein a is a matrix, x+y=2π or x+y=−2π, and j is an imaginary unit, wherein the first OCC corresponds to each frequency domain unit in the first CDM group, one of two adjacent frequency domain units in the second CDM group, or one of two adjacent frequency domain units in a third CDM group, wherein the second OCC corresponds to each frequency domain unit in the second CDM group or each frequency domain unit in the second CDM group other than the one of the two adjacent frequency domain units in the second CDM group corresponding to the first OCC, and wherein the third OCC corresponds to each frequency domain unit in the third CDM group or each frequency domain unit in the third CDM group other than the one of the two adjacent frequency domain units in the third CDM group corresponding to the first OCC.

22. The processing apparatus according to claim 15, wherein the processing apparatus comprises one or more processors, a network device, or a terminal device.

23. A processing apparatus configured to execute programming instructions stored in a memory to perform operations comprising:

receiving at least two demodulation reference signals (DMRSs) corresponding to a terminal device, wherein the at least two DMRSs comprise a first DMRS and a second DMRS that are mapped to same one or more time domain symbols, wherein a first sequence of the first DMRS and a second sequence of the second DMRS satisfy $c_{int\_m} = f(n_{CDM\_m})$, wherein $f(n_{CDM\_m})$ represents a function of $n_{CDM\_m}$, wherein for the first sequence, $n_{CDM\_m}$ represents an index of a code division multiplexing (CDM) group to which an antenna port of the terminal device used for the first DMRS belongs, wherein for the second sequence, $n_{CDM\_m}$ represents an index of a CDM group to which an antenna port of the terminal device used for the second DMRS belongs, and wherein $c_{init\_m}$ represents an initialization factor of a sequence corresponding to the CDM group.

24. The processing apparatus according to claim 23, wherein the operations further comprising:

generating the at least two DMRSs based on M sequences that comprise the first sequence and the second sequence, where M is a quantity of CDM groups that is greater than or equal to 2 and the CDM groups are associated with antenna ports of the terminal device for the at least two DMRSs.

25. The processing apparatus according to claim 23, wherein the operations further comprising:

communicate capability information indicating that the terminal device supports release switching of a DMRS and DMRSs of at least two versions of standard releases.

26. The processing apparatus according to claim 23, wherein the operations further comprising:

communicate indication information indicating a version of standard release of a DMRS.

27. The processing apparatus according to claim 23, wherein an antenna port corresponding to the first DMRS and an antenna port corresponding to the second DMRS correspond to different CDM groups, and the different CDM groups correspond to different orthogonal cover codes (OCCs).

28. The processing apparatus according to claim 27, wherein the different OCCs comprise a first OCC represented by a and a second OCC represented by —a, wherein a is a matrix, wherein the first OCC corresponds to each frequency domain unit in the first CDM group or one of two adjacent frequency domain units in the second CDM group, and wherein the second OCC corresponds to each frequency domain unit in the second CDM group or each frequency domain unit in the second CDM group other than the one of the two adjacent frequency domain units in the second CDM group corresponding to the first OCC.

29. The processing apparatus according to claim 27, wherein a first OCC represented by a, a second OCC represented by a*exp (j*x), and a third OCC represented by a*exp (j*y), wherein a is a matrix, x+y=2π or x+y=−2π, and j is an imaginary unit, wherein the first OCC corresponds to each frequency domain unit in the first CDM group,
one of two adjacent frequency domain units in the second CDM group, or one of two adjacent frequency domain units in a third CDM group, wherein the second OCC corresponds to each frequency domain unit in the second CDM group or each frequency domain unit in the second CDM group other than the one of the two adjacent frequency domain units in the second CDM group corresponding to the first OCC, and wherein the third OCC corresponds to each frequency domain unit in the third CDM group or each frequency domain unit in the third CDM group other than the one of the two adjacent frequency domain units in the third CDM group corresponding to the first OCC.

30. The processing apparatus according to claim 23, wherein the processing apparatus comprises one or more processors, a terminal device, or a network device.

31. A non-transitory computer readable storage medium, storing programming instructions executable by at least one processor to perform operations comprising:
generating at least two demodulation reference signals (DMRSs) corresponding to at least two antenna ports indicated to a terminal device, wherein the at least two DMRSs comprise a first DMRS and a second DMRS that are mapped to same one or more time domain symbols, wherein a first sequence of the first DMRS and a second sequence of the second DMRS satisfy $c_{int\_m} = f(n_{CDM\_m})$ wherein $f(n_{CDM\_m})$ represents a function of $n_{CDM\_m}$, $n_{CDM\_m}$ represents an index of a code division multiplexing (CDM) group to which the at least two antenna ports belong, and $c_{init\_m}$ represents an initialization factor of a sequence corresponding to the CDM group; and
transmitting the at least two DMRSs.

32. The non-transitory computer readable storage medium according to claim 31, wherein generating at least two reference signals comprises:
generating the at least two DMRSs based on M sequences that comprise the first sequence and the second sequence, where M is a quantity of CDM groups that is greater than or equal to 2 and the CDM groups are associated with antenna ports of the terminal device for the at least two DMRSs.

33. The non-transitory computer readable storage medium according to claim 31, the operations further comprising:
communicating capability information indicating that the terminal device supports release switching of a DMRS and DMRSs of at least two versions of standard releases.

34. The non-transitory computer readable storage medium according to claim 31, the operations further comprising:
communicating indication information indicating a version of standard release of a DMRS.

35. A non-transitory computer readable storage medium, storing programming instructions executable by at least one processor to perform operations comprising:
receiving at least two demodulation reference signals (DMRSs) corresponding to a terminal device, wherein the at least two DMRSs comprise a first DMRS and a second DMRS that are mapped to same one or more time domain symbols, wherein a first sequence of the first DMRS and a second sequence of the second DMRS satisfy $c_{int\_m} f(n_{CDM\_m})$, wherein $f(n_{CDM\_m})$ represents a function of $n_{CDM\_m}$, wherein for the first sequence, $n_{CDM\_m}$ represents an index of a code division multiplexing (CDM) group to which an antenna port of the terminal device used for the first DMRS belongs, wherein for the second sequence, $n_{CDM\_m}$ represents an index of a CDM group to which an antenna port of the terminal device used for the second DMRS belongs, and wherein $c_{init\_m}$ represents an initialization factor of a sequence corresponding to the CDM group.

36. The non-transitory computer readable storage medium according to claim 35, the operations further comprising:
generating the at least two DMRSs based on M sequences that comprise the first sequence and the second sequence, where M is a quantity of CDM groups that is greater than or equal to 2 and the CDM groups are associated with antenna ports of the terminal device for the at least two DMRSs.

37. The non-transitory computer readable storage medium according to claim 35, the operations further comprising:
communicating capability information indicating that the terminal device supports release switching of a DMRS and DMRSs of at least two versions of standard releases.

38. The non-transitory computer readable storage medium according to claim 35, the operations further comprising:
communicating indication information indicating a version of standard release of a DMRS.

\* \* \* \* \*

UNITED STATES PATENT AND TRADEMARK OFFICE
CERTIFICATE OF CORRECTION

PATENT NO. : 11,973,578 B2
APPLICATION NO. : 17/199050
DATED : April 30, 2024
INVENTOR(S) : Yong Liu et al.

It is certified that error appears in the above-identified patent and that said Letters Patent is hereby corrected as shown below:

In the Claims

Column 61, Line 29, Claim 15, please delete "$c_{init\_m}=f(n_{CDM\_m})$" and insert therefore -- $c_{init\_m}=f(n_{CDM\_m})$, --;

Column 16, Line 31, Claim 15, please delete "$n_{CDM\_m}$)" and insert therefore -- $n_{CDM\_m}$ --;

Column 63, Line 52, Claim 31, please delete "$c_{init\_m}=f(n_{CDM\_m})$" and insert therefore -- $c_{init\_m}=f(n_{CDM\_m})$, --;

Column 64, Line 29, Claim 35, please delete "$c_{init\_m}f(n_{CDM\_m})$," and insert therefore -- $c_{init\_m}=f(n_{CDM\_m})$, --.

Signed and Sealed this
Twenty-seventh Day of August, 2024

Katherine Kelly Vidal
*Director of the United States Patent and Trademark Office*